(12) United States Patent  (10) Patent No.: US 8,597,031 B2
Cohen et al.  (45) Date of Patent: *Dec. 3, 2013

(54) SYSTEMS AND METHODS FOR COMPUTERIZED INTERACTIVE SKILL TRAINING

(75) Inventors: Martin L. Cohen, Malibu, CA (US); Edward G. Brown, Malibu, CA (US)

(73) Assignee: Breakthrough Performancetech, LLC, Los Angeles, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 12/510,868

(22) Filed: Jul. 28, 2009

(65) Prior Publication Data

US 2010/0028846 A1 Feb. 4, 2010

Related U.S. Application Data

(60) Provisional application No. 61/084,181, filed on Jul. 28, 2008.

(51) Int. Cl.
*G09B 3/00* (2006.01)
*G09B 7/00* (2006.01)

(52) U.S. Cl.
USPC ............ 434/323; 434/322; 434/350; 434/362

(58) Field of Classification Search
USPC .................................. 434/350, 362
See application file for complete search history.

(56) References Cited

U.S. PATENT DOCUMENTS

| | | | |
|---|---|---|---|
| 4,015,344 A | 4/1977 | Michaels et al. | |
| 4,459,114 A * | 7/1984 | Barwick | 434/307 R |
| 4,493,655 A | 1/1985 | Groff | |
| 4,608,601 A | 8/1986 | Shreck et al. | |
| 4,643,682 A | 2/1987 | Migler | |
| 4,689,022 A | 8/1987 | Peers et al. | |
| 4,745,468 A | 5/1988 | Von Kohorn | |
| 5,006,987 A | 4/1991 | Harless | |
| 5,056,792 A | 10/1991 | Helweg-Larsen et al. | |
| 5,147,205 A | 9/1992 | Gross et al. | |
| 5,533,110 A | 7/1996 | Pinard et al. | |
| 5,597,312 A * | 1/1997 | Bloom et al. | 434/362 |

(Continued)

FOREIGN PATENT DOCUMENTS

| | | |
|---|---|---|
| GB | 2271262 A | 4/1994 |
| JP | 2000330464 | 11/2000 |

(Continued)

OTHER PUBLICATIONS

PCT International Search Report and Written Opinion, PCT Application No. PCT/US2009/051994, dated Sep. 23, 2009.

(Continued)

*Primary Examiner* — Nikolai A Gishnock
(74) *Attorney, Agent, or Firm* — Knobbe, Martens, Olson & Bear LLP

(57) ABSTRACT

The present invention is directed to interactive training, and in particular, to methods and systems for computerized interactive skill training. An example embodiment provides a method and system for providing skill training using a computerized system. The computerized system receives a selection of a first training subject. Several related training components can be invoked, such as reading, watching, performing, and/or reviewing components. In addition, a scored challenge session is provided, wherein a training challenge is provided to a user via a terminal, optionally in video form.

81 Claims, 22 Drawing Sheets

(56) References Cited

U.S. PATENT DOCUMENTS

| | | |
|---|---|---|
| 5,722,418 A | 3/1998 | Bro |
| 5,980,429 A | 11/1999 | Nashner |
| 6,067,638 A | 5/2000 | Benitz et al. |
| 6,106,298 A | 8/2000 | Pollak |
| 6,113,645 A | 9/2000 | Benitz et al. |
| 6,125,356 A * | 9/2000 | Brockman et al. ............. 705/37 |
| 6,155,834 A | 12/2000 | New, III |
| 6,171,112 B1 | 1/2001 | Clark et al. |
| 6,190,287 B1 | 2/2001 | Nashner |
| 6,236,955 B1 | 5/2001 | Summers |
| 6,296,487 B1 | 10/2001 | Lotecka |
| 6,319,130 B1 | 11/2001 | Ooseki et al. |
| 6,409,514 B1 | 6/2002 | Bull |
| 6,514,079 B1 | 2/2003 | McMenimen et al. |
| 6,516,300 B1 | 2/2003 | Rakshit et al. |
| 6,535,713 B1 | 3/2003 | Houlihan et al. |
| 6,589,055 B2 | 7/2003 | Osborne et al. |
| 6,632,158 B1 | 10/2003 | Nashner |
| 6,648,651 B1 * | 11/2003 | Cadman et al. ............. 434/322 |
| 6,684,027 B1 * | 1/2004 | Rosenberg ............. 386/244 |
| 6,705,869 B2 * | 3/2004 | Schwartz ............. 434/219 |
| 6,722,888 B1 | 4/2004 | Macri et al. |
| 6,736,642 B2 * | 5/2004 | Bajer et al. ............. 434/322 |
| 6,755,659 B2 | 6/2004 | Losasso et al. |
| 6,909,874 B2 | 6/2005 | Holtz et al. |
| 6,913,466 B2 | 7/2005 | Stanfield et al. |
| 6,925,601 B2 | 8/2005 | Moore et al. |
| 6,944,586 B1 | 9/2005 | Harless et al. |
| 6,966,778 B2 | 11/2005 | Macri et al. |
| 6,976,846 B2 | 12/2005 | Dupont et al. |
| 6,988,239 B2 | 1/2006 | Womble et al. |
| 7,016,949 B1 | 3/2006 | Tagawa |
| 7,221,899 B2 | 5/2007 | Ohno et al. |
| 2002/0059376 A1 | 5/2002 | Schwartz |
| 2002/0119434 A1 | 8/2002 | Beams et al. |
| 2003/0059750 A1 | 3/2003 | Bindler et al. |
| 2003/0065524 A1 * | 4/2003 | Giacchetti et al. ............. 705/1 |
| 2003/0127105 A1 | 7/2003 | Fontana |
| 2003/0180699 A1 | 9/2003 | Resor |
| 2004/0014016 A1 * | 1/2004 | Popeck et al. ............. 434/322 |
| 2004/0018477 A1 | 1/2004 | Olsen |
| 2004/0043362 A1 * | 3/2004 | Aughenbaugh et al. ...... 434/118 |
| 2004/0166484 A1 | 8/2004 | Budke et al. |
| 2005/0004789 A1 | 1/2005 | Summers |
| 2005/0026131 A1 | 2/2005 | Elzinga et al. |
| 2005/0054444 A1 | 3/2005 | Okada |
| 2005/0089834 A1 * | 4/2005 | Shapiro ............. 434/323 |
| 2005/0170326 A1 | 8/2005 | Koehler et al. |
| 2006/0048064 A1 | 3/2006 | Vronay |
| 2006/0074689 A1 | 4/2006 | Cosatto et al. |
| 2006/0078863 A1 | 4/2006 | Coleman et al. |
| 2006/0154225 A1 | 7/2006 | Kim |
| 2006/0172275 A1 | 8/2006 | Cohen |
| 2006/0177808 A1 | 8/2006 | Aosawa et al. |
| 2006/0204943 A1 | 9/2006 | Kimball |
| 2007/0015121 A1 | 1/2007 | Johnson et al. |
| 2007/0188502 A1 | 8/2007 | Bishop |
| 2007/0245305 A1 * | 10/2007 | Anderson ............. 717/110 |
| 2007/0245505 A1 | 10/2007 | Abfall et al. |
| 2008/0182231 A1 | 7/2008 | Cohen et al. |
| 2008/0254419 A1 | 10/2008 | Cohen |
| 2008/0254423 A1 | 10/2008 | Cohen |
| 2008/0254424 A1 | 10/2008 | Cohen |
| 2008/0254425 A1 | 10/2008 | Cohen |
| 2008/0254426 A1 | 10/2008 | Cohen |
| 2012/0288845 A1 * | 11/2012 | Kumar GL ............. 434/362 |

FOREIGN PATENT DOCUMENTS

| | | |
|---|---|---|
| JP | 200272843 | 3/2002 |
| JP | 200489601 | 3/2004 |
| JP | 2004240234 | 8/2004 |
| WO | WO 8505715 | 12/1985 |

OTHER PUBLICATIONS

PCT International Search Report and Written Opinion; PCT Application No. PCT/US08/58781, dated Oct. 1, 2008.

The international preliminary report on patentability; PCT Application No. PCT/US2006/003174, dated: Jul. 23, 2008.

Miller, G.A., "The Magical Number Seven, Plus or Minus Two: Some Limits on our Capacity for Processing Information," Harvard University, 1956, first published in *Psychological Review*, 63, 81-97, http://psychclassics.yorku.ca/Miller/.

PCT International preliminary report on patentability; PCT Application No. PCT/US2006/003174, dated: Mar. 31, 2009.

PCT International Search Report and Written Opinion; PCT/US 08/50806; International Filing Date: Jan. 10, 2008; Mailed Jul. 8, 2008.

English translation of Japanese Office Action regarding Japanese Patent Application No. 2007-553313, dated Mar. 12, 2012 and transmitted on Mar. 21, 2012.

\* cited by examiner

HIV Testing Objections – Fears

In order for *The Power of Your Voice* to be most effective, you will need to be able to politely and confidently respond to objections.

When people hear what they don't want to hear, they form excuses or rationalizations in their minds that allow them to reject the message that you are trying to tell them. If you can get them to state these objections, you can then inform them why they are mistaken in their beliefs so the message can be accepted and make a difference in their lives.

It is therefore very important that you are able to get people to open up about their objections. These objections may be false beliefs in myths or personal fears about HIV testing and AIDS. Once they have raised their objection, a knowledgeable and confident response from you can help them to accept the truth.

Practice as much as you like until you are prepared to answer any objection at any time.

*Click Next to see the objections you will learn to answer in this module.*

FIG. 2B

"*I will die quickly*"

Read:

- If the *tests* are *positive*, it of course will be very upsetting, but it *provides* the person with *choices that can extend and* even *save their life*, as well as the lives of others they love.
- In the *old days*, finding out that one had *HIV was a death sentence* with a rapid descent into illness.
- However, *because of available treatments*, there are people who were thought to be dying within months, who have *now lived extensive lives*, and lives that are fulfilling, at relatively *reduced disease levels*.
- I am not saying that *people still* don't *die of AIDS*, but the death rate from HIV is *much higher when* people are *not tested and* remain *untreated*.
- Furthermore, and perhaps most importantly, if an individual *knows they have HIV*, they then have *a choice*.
- This *choice* is not just *to get treatment*, but to *prevent* the *spread* of their illness *to others*.
- Which is truly *a moral responsibility for Africa*, the *Kenyan people*, and people in *this community*.

HIV Testing Fears
Introduction

FIG. 2E

Scored Challenges

You will be presented with a series of opportunities to talk with people an respond to their objections about HIV Testing and AIDS.

You will be scored on the following criteria:

The accuracy of your answers – disd you present all the
The timing of your answers – did you respond immediately?
The confidence of your answers – did you sound knowledgeable?

Be sure to listen carefully to each objection as they will be presented in random order. A score will be presented after each challenge, and a summary total score will be presented at the end of this module.

Good luck and have fun!

Remember, respond as soon as you hear the question.

Click the "Next" button when you are ready to hear the first Challenge.

FIG. 21

"*I will die quickly*"

Which of these points did the learner include in their verbal response?

- ⊘ If tests positive, provides choices that extend and save their life
- ⊘ Old days, HIV was a death sentence
- ⊘ Because of available treatments, now lived extensive lives, reduced disease levels
- ○ People still die of AIDS, much higher when not tested and untreated
- ⊘ Knows they have HIV, have a choice
- ⊘ Choice to get treatment, prevent spread to others
- ○ Moral responsibility for Africa, Kenyan people, this community Replay Previous Next

FIG. 2K

"*I will die quickly*"

How confident did the learner sound when overcoming the challenge?

⊘ Confident (2 points)

○ Somewhat confident (1 point)

○ Not confident (0 points)

FIG. 2M

*"I will die quickly"*

File  Edit  View  Go  Favorite  Help

Back  Forw...  Stop  Refresh  Home  Search  Favorite  Print  Font  Mail

Menu Exit

Date/Time                                07/23/2009  10:41 AM
(MM/DD/YYYY)

Total Time                               00:03:01

Your Feedback Score:
   Accuracy of Response                  5 out of 7
   Timing of response                    2 out of 2
   Confidence of Responce                2 out of 2

[Play Model Answer]    [Print]

HIV Testing Fears
Introduction

Replay  Previous  [Next]

FIG. 2N

Scoring Feedback Summary

Course Name    Global Give Back Circle module 2 (long)
Date/Time    07/23/2009 10:36 AM
(MM/DD/YYYY)

Total Time    00:05:13

Accuracy of Response

"I am afraid of being seen going for a test"    0 out of 4

"I am afraid of needles"    0 out of 3

"I may be rejected by my family"    0 out of 4

"I will die quickly"    5 out of 7

"My partner will not agree to be tested"    0 out of 5

"I will no longer be able to have intimate relationships"    0 out of 3

"My partner will resent asking"    0 out of 7

Timing of Response

FIG. 2P

Scoring Feedback Summary

Course Name     Global Give Back Circle Module 2 (long)
Date/Time                                                                  07/23/2009 10:36 AM Total Time                                                                 00:05:13

Accuracy of Response
- "I am afraid of being seen going for a test"     0 out of 4
- "I am afraid of needles"     0 out of 3
- "I may be rejected by my family"     0 out of 4
- "I will die quickly"     5 out of 7
- "My partner will not agree to be tested"     0 out of 5
- "I will no longer be able to have intimate"     0 out of 3
- "My partner will resent my asking"     0 out of 7

Timing of Response
- "I am afraid of being seen going for a test"     2 out of 2
- "I am afraid of needles"     2 out of 2
- "Imay be rejected by my family"     2 out of 2
- "I will die quickly"     2 out of 2
- "My partner will not agree to be tested"     2 out of 2
- "I will no longer be able to have intimate"     2 out of 2
- "My partner will resent my asking"     2 out of 2

Confidence of Response
- "I am afraid of being seen going for a test"     0 out of 2
- "I am afraid of needles"     0 out of 2
- "I may be rejected by my family"     0 out of 2
- "I will die quickly"     2 out of 2
- "My parnter will not agree to be tested"     0 out of 2
- "I will no longer be able to have intimate"     0 out of 2
- "My partner will resent my asking"     0 out of 2

*FIG. 2Q*

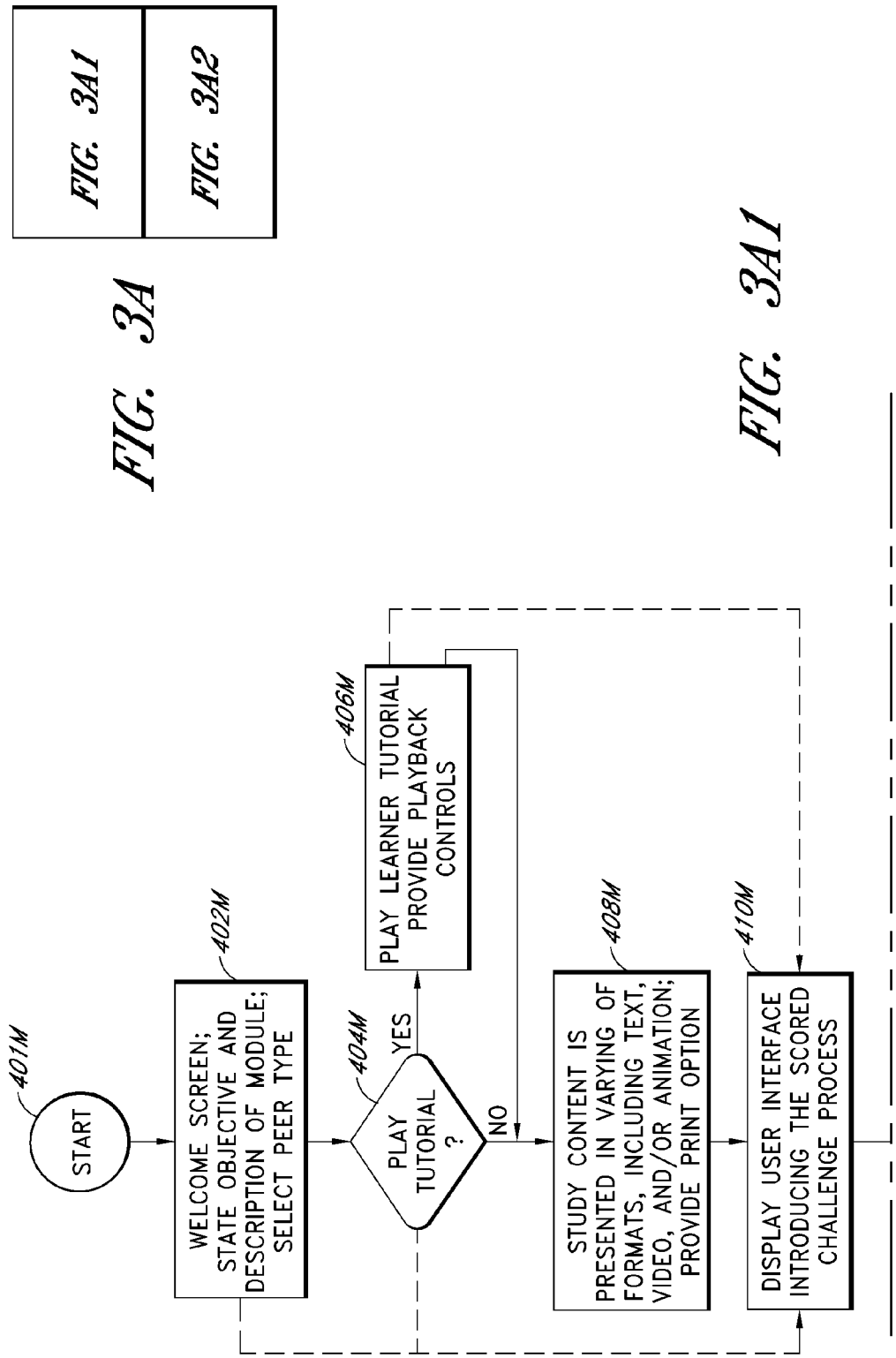

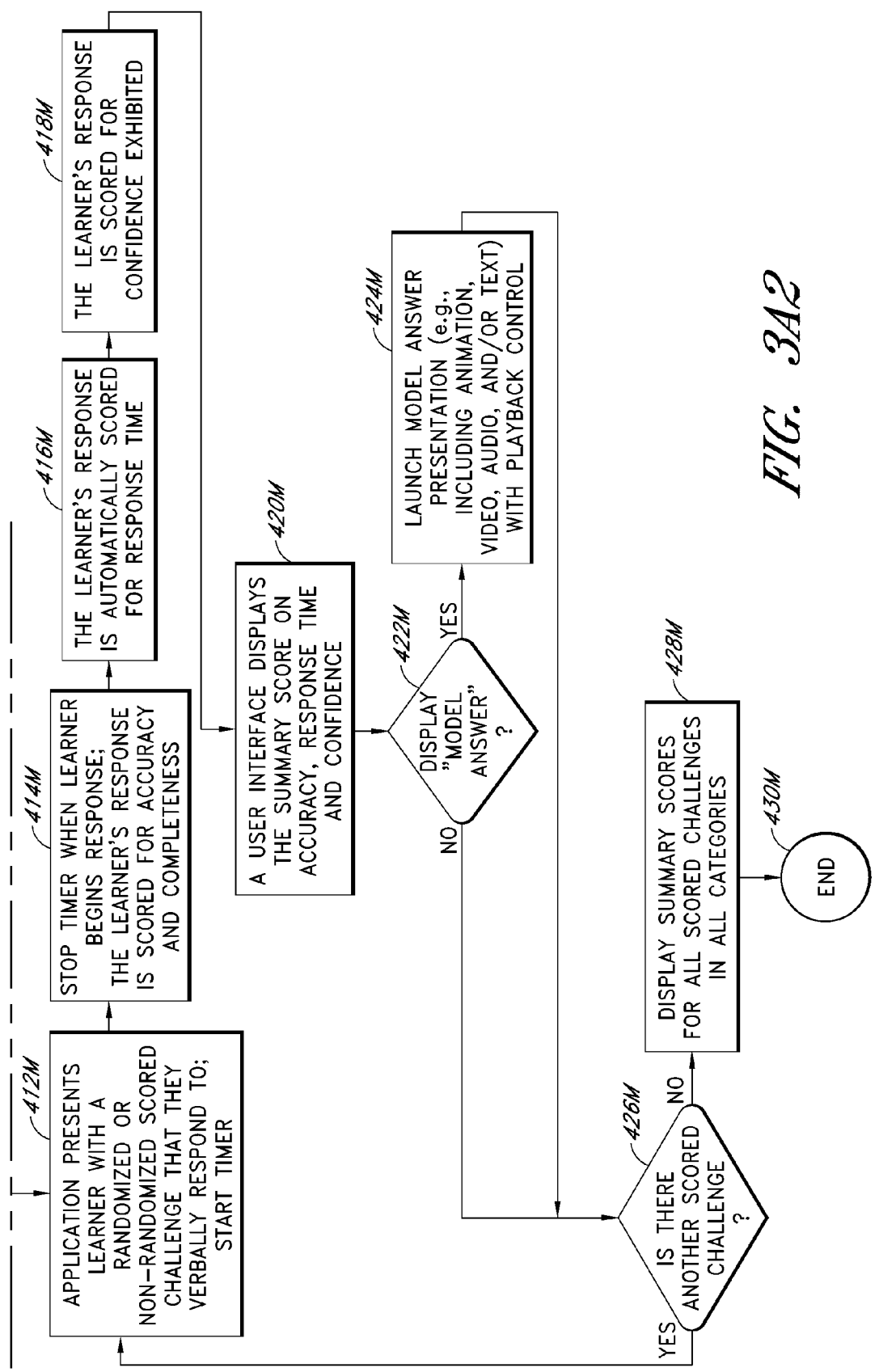
FIG. 3A2

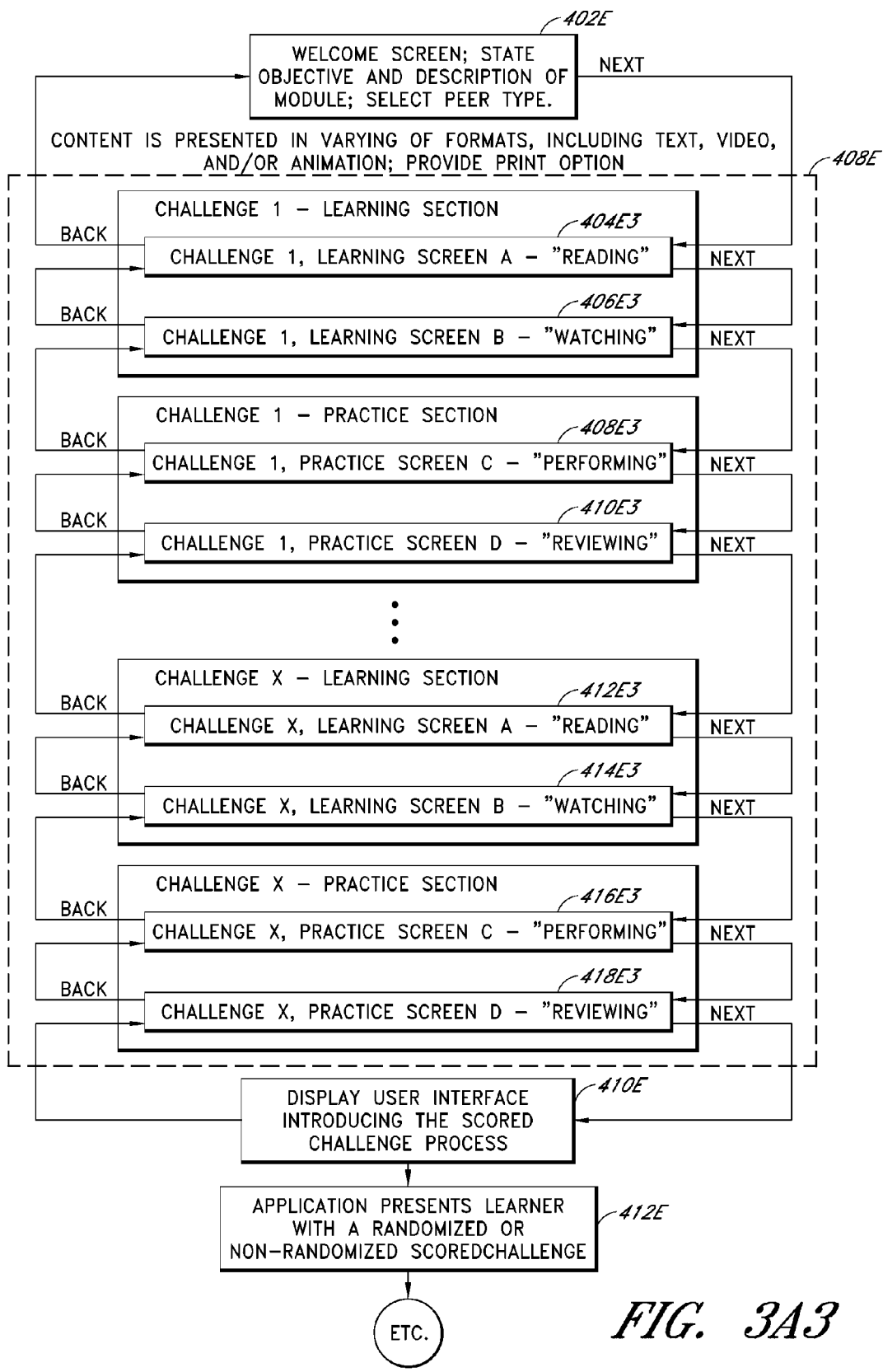
FIG. 3A3

SYSTEMS AND METHODS FOR COMPUTERIZED INTERACTIVE SKILL TRAINING

CROSS-REFERENCE TO RELATED APPLICATIONS

The present application claims priority from U.S. Provisional Patent Application No. 61/084,181, filed Jul. 28, 2008, the content of which is incorporated herein in its entirety.

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is directed to interactive training, and in particular, to methods and systems for computerized interactive skill training.

2. Description of the Related Art

Many conventional skill training techniques and systems tend to train users on how to respond to test questions, typically by multiple choice, true/false, or written sentence completion, rather than providing adequate training on using those skills in a real-world environment. That is, interpersonal verbal responses.

Further, many conventional techniques for testing skills fail to adequately evaluate users' ability to utilize their skills in a real-world environment. That is, verbal interactions.

Still further, conventional training techniques and systems lack the ability to certify/re-certify and assess/re-assess verbal skills and competencies.

While certain conventional techniques (e.g., flash cards, mirroring, video/voice recording of trainees) have attempted to provide training with respect to verbal communication, such conventional techniques fail to engage the trainee in consistent and quality deliberate verbal practice and rehearsal with respect to verbal interactions. As a result, such conventional techniques typically fail to have a lasting effect with respect to verbal communication. Similarly, "single-event" training and/or limited traditional "role-plays/scenarios/modeling" have failed to adequately embed skills in trainees. Still further, such conventional techniques fail to engage both cognitive and psycho-motor functions, and so further fail to adequately embed skills and knowledge.

In view of the conventional techniques and systems as discussed above, there is still a need for an effective and efficient system and method that provides training on using verbal skills in a real-world environment.

SUMMARY OF THE INVENTION

Effective and efficient systems and methods providing consistent and long lasting training on using verbal skills in a real-world environment have been surprisingly attained using computer-based systems and methods described herein.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As discussed below, certain embodiments provide an interactive performance training system that is configured to facilitate knowledge acquisition, marketplace/real world performance and behavioral embedding. In particular, certain embodiments utilize a computer-based system (e.g., including a trainee terminal) that provides deliberate verbal practice and rehearsal to provide behavioral embedding.

An example embodiment includes a training system that engages the user (sometimes referred to as a trainee) in a training process. The example training process is configured to train users in verbal interactions and optionally in fields where a user needs to verbally interact in order to affect others (e.g., sales, management, marketing, education, social relationships, etc.). By way of illustration, the system is configurable to teach a user how to train users to respond to "challenges" (a statement or question by another or a scenario that requires a response). The training system can include multiple training modules, wherein a module can include one or more challenges directed to a specific subject. Optionally, for a given module, corresponding study sessions may be presented for each challenge in a specific logical sequence (although optionally, the challenges in the study session may be randomized). Once the user has completed the study sessions for all the module's challenges, the user may be randomly (where the phrase "randomly" includes pseudo randomly) tested on the challenges, as described below.

The example training process optionally includes a learning section, a practice section (where the combination of the learning and practice sessions are sometimes referred to as a study session), and a test section. Use of the combination of the foregoing sections embeds the knowledge and skills being trained in the user's brain, and facilitates the transfer of such knowledge and skills to the real world, outside of the training environment.

The learning section optionally includes a reading component (e.g., where the user will be textually told/shown what the user is to learn) and watching component (where the user will be shown via a role model video how a response to a challenge is properly done, with an accurate articulation of the relevant elements, with confidence, and without hesitation). Optionally, the reading component displays more significant elements (e.g., key elements) that the user is to learn to respond to a given challenge, where the more significant elements are embedded in phrases included contextual language. For example, the phrases may optionally include complete role model language that can be used in responding to the challenge. Further, optionally the more significant elements are visually emphasized with respect to the contextual language. It should be noted that optionally, the language of a "key element" within a given phrase does not have to be contiguous language. Each phrase is optionally separately displayed (e.g., displayed on a separate line), with a visual emphasis element (e.g., a bullet or the like) displayed at the beginning of each phrase.

The watching component audibly and visually shows the user how to respond to the challenge via a video. Unless the context indicates otherwise, the term "video" refers to an analog or digital movie with an audio track, where the movie includes an actual person and/or an animation. For example, an audio video presentation can include an animated avatar or other character that recites the model language presented in the reading component. In addition, while the avatar is reciting the model language, the key elements may be textually displayed, without the surrounding contextual language. Thus, the avatar acts as an automated coach that demonstrates to the user, in a consistent and accurate manner, an example of how to respond to the challenge. Optionally, the user can instruct the system to select one or both of the following versions of the audiovisual responses provided by the role model avatar:

i. the avatar delivers the full role model text (e.g., including key elements, as well as the contextual text that surrounds and binds those key elements together in a grammatically correct and/or natural sounding script) of the reading user interface;

ii. the avatar only verbalizes the more focused "key element" phrasing.

In particular, the user can choose between the foregoing versions or utilize both versions so as to enhance their learning and neuro-embedding.

The practice section includes a "perform" or "do it" component. In the perform component, a video of an avatar or other character verbally presenting the challenge in a simulation of a real-world scenario. Optionally, this avatar is a different avatar than that which recited the role model language. This is because the avatar in the perform section is not acting as a coach or role model, but is instead acting as a real world person that the user may encounter outside of the training scenario that is "challenging" the user. Thus, the avatar in the watching section is providing the answer to the challenge from the avatar in the perform section. The user is to verbally and audibly respond to the challenge, but optionally no scoring is performed at this juncture. This is to provide a "safe" environment in which the user is to learn and perform, without the tension of being scored.

The practice section further includes a review component. The review component textually displays the key elements, enabling the user to self review her/his performance during the perform component and further enables the user to reinforce what was taught in the reading and watching components.

Optionally, navigation controls are provided via which the user can navigate to a given component user interface for the current challenge and/or optionally for other challenges in the module. This enables users to repeat components as desired and to spend more time on a learning technique that better suits their learning style. For example, if the user's learning technique is more auditory and visual in nature, the user may repeatedly navigate back to and view the watching user interface. If, on the other hand, the user learns better by reading, the user may repeatedly navigate back to and read the reading user interface. Thus, if a user learns better by rehearsing, the user can focus on the performing user interface; or, if the user learns better by recording notes, the user can take notes via a pad of paper or electronically via a notes user interface presented on the user terminal.

In addition, a table of contents is optionally provided at the beginning of a given module. Rather than simply providing a directory of sections or user interfaces, the table of contents begins preparing the user for the training provided by the module. In particular, the table of contents includes a textual display of the challenges contained within the corresponding module, where the user can click on the textual display or associated control, and then automatically proceed to the corresponding challenge. Further, the table of contents also includes an image of a character (in video or optionally still form, where the character may be a real person or a drawn/animated person such as an avatar) for a given challenge, wherein the character recites the challenge and is the same character reciting the same challenge as the character that recites the challenge on the performing user interface and/or within the scored challenges section. In an example embodiment, each character in the table of contents recites its challenge, in the same order in which the characters and/or challenges will be presented in the module, thereby providing a preview of all the module challenges. By letting the user know ahead of time what the user will be challenged on and how they will be challenged, positive tension is created (e.g., positive excitement preceding learning and testing).

Optionally instead, the table of contents provides a directory of sections or user interfaces without the audio and/or video components. Optionally, where a character is presented in the table of contents for a given challenge, it is a different character than the one reciting the given challenge via the performing user interface and/or within the scored challenges section. Further, where characters are presented in the table of contents, they do not all have to recite challenges and do not have to recite the challenges in a predetermined order.

Once the user has completed the module study sessions, and feels confident that he/she has mastered the materials, the user then proceeds to the scored challenges section. The scored challenges section tests the user's ability to articulate what the user has learned in the study and practice sections. Optionally, the user may self assess (e.g., the user will score her/himself) and then will be tested by another with respect to each challenge in the module.

The scored challenges section may present the challenges randomly to more closely reflect the real world. Optionally, this randomization can be turned off and the user and/or management may optionally focus on particular scored challenges that the user needs more practice in (e.g., a determined from past training sections or from real world difficulties experienced by the user) and/or that are relatively more important to the user and/or management. The scored challenges may optionally be presented in a non-random, specific, predictable order, such as in cases where subsequent challenges build on concepts presented in previous challenges. For example, in teaching a user to recite a speech that contains four challenges, these challenges would not be randomized, because the flow of the speech is always in the same sequence.

In an example embodiment, the scored challenges section includes one or more of the following categories:

Accuracy of verbalizing the key elements (this score assesses real-world verbal delivery with respect to correct content);

Speed of initially responding (this score assesses the user's speed of initially responding, and typically reflects the impact of the perceived credibility of the user upon the ultimate recipient of the communication);

Confidence of responses (this score also assesses the credibility that will be conveyed, and with increased confidence the user will experience increased "engagement satisfaction" in the real world for users (for example, job satisfaction, etc.)).

Advantageously, certain embodiments enable objective testing of challenge responses, even though the challenge responses are verbal in nature. The scoring techniques described herein eliminate or greatly reduce subjectivity with respect to scoring the user response accuracy, the speed of initially responding, and the confidence of the response.

Once the user views his/her scores for each challenge, he/she will discover which challenges he/she is strongest in responding to and which challenges he/she is weakest in responding to. Thereafter, the user can go back to the corresponding study sections of the module so that he/she can particularly focus upon the challenges he/she needs to work on the most, and then retake the scored challenges.

An example embodiment provides a training system configured to train a user, comprising: a server; a network interface coupled to the server; a tangible computer-readable medium having computer-executable instructions stored thereon that, if executed by a computing device, cause the computing device to perform a method comprising: receiving an identification of a training module, the module including at least a first set of challenges including a plurality of challenges that include a statement or question regarding a subject that a user is to be trained to verbally respond to; transmitting for presentation on a user terminal a table of contents including an entry for each of the plurality of challenges, where the user can navigate to a selected one of the plurality of challenges via the table of contents, wherein a given entry for a challenge in the table of contents includes text of the corresponding challenge and an audio video presentation, wherein the audio video presentation presents an animated avatar that audibly presents the corresponding challenge, the animated avatar having lip motions at least substantially synchronized with the audibly presented corresponding challenge; wherein the audio video challenge presentations included in the table of contents are automatically presented one at a time in a predetermined order; for each of the plurality of challenges, in response to a user action, transmitting for presentation on the user terminal user interfaces associated with a learning session and user interfaces associated with a practice session, wherein: the learning session includes a reading section configured to train the user in how to respond to the challenge using text, and a watching section, configured to train the user to respond to the challenge using an audio video presentation, wherein the reading section includes a reading user interface configured to present via text and without a video component: the challenge; a plurality of guideline language constructs that provide a model answer to the challenge, wherein the guideline constructs are in the form of text positioned so that each guideline language construct is spaced apart from at least one other guideline language construct, and wherein each of the guideline language constructs includes: a key element which the user is to memorize; and contextual language in which the key element is embedded, wherein computer-executable instructions are configured to cause the key element to be visually distinguished via an attribute not present in the contextual language; wherein the watching section includes a watching user interface configured to present: a textual representation of the key elements previously presented via the reading user interface, wherein the key elements are not embedded in the guideline language constructs; an audio video presentation of a first avatar audibly presenting the guideline language constructs, including the key elements, presented via the reading user interface and/or audibly presenting the key elements without the guideline language constructs, wherein the first avatar has lip motions at least substantially synchronized with the audible guideline language; wherein the practice session user interfaces include: a performing user interface, wherein the performing user interface includes an audio video presentation of a second avatar, wherein the second avatar has a different appearance then the first avatar, wherein the second avatar audibly presents the challenge presented via the reading and watching user interfaces, wherein the user is to verbally provide a response to the challenge, the response including each of the key elements presented via the watching user interface for that challenge; a review user interface configured and arranged to include at least a textual representation of key elements previously presented via the watching user interface; in response to at least one user action, transmitting for presentation on the user terminal user interfaces associated with a scored challenge session configured to test the user with respect to the challenges included in the module, wherein for each challenge on which the user is to be tested the scored challenge user interface includes: the second avatar audibly presenting a randomly selected challenge from the plurality of challenges, wherein the second avatar has lip motions at least substantially synchronized with the audible randomly selected challenge, and wherein the user is to audibly respond to the randomly selected challenge by at least presenting corresponding key elements; a scoring interface for the randomly selected challenge, the scoring interface configured to receive and/or provide at least the following scoring information: how accurately the user audibly presented the key elements corresponding to the randomly selected challenge; how fast the user began responding to the randomly selected challenge; how confident the user seemed when responding to the randomly selected challenge; transmitting for presentation on the user terminal at least one navigation control via which the user can provide navigational instructions that enable the user to navigate to a desired user interface.

An example embodiment provides tangible computer-readable medium having computer-executable instructions stored thereon that, if executed by a computing device, cause the computing device to perform a method comprising: for each of a plurality of challenges in a training module, wherein a challenge is a statement or question that a user is to respond to, transmitting for presentation on a user terminal user interfaces associated with a learning session and user interfaces associated with a practice session, wherein: the learning session includes a reading section configured to train the user in how to respond to the challenge using text, and a watching section, configured to train the user to respond to the challenge using an audio video presentation, wherein the reading section includes a reading user interface configured to present via text: the challenge; a plurality of guideline language constructs that provide a model answer to the challenge, wherein each of the plurality of guideline language constructs includes: a key element; and contextual language in which a corresponding key element is embedded, wherein computer-executable instructions are configured to cause the corresponding key element to be visually distinguished via an attribute not present in the contextual language; wherein the watching section includes a watching user interface configured to present: a textual representation of the key elements previously presented via the reading user interface, wherein the key elements are not embedded in the guideline language constructs; an audio video presentation of a first character audibly presenting the guideline language constructs, including the key elements, and/or audibly presenting the key elements without the guideline language constructs, wherein the first character has lip motions at least substantially synchronized with the audio presentation; wherein the practice session user interfaces include: a performing user interface, wherein the performing user interface includes an audio video presentation of a second character, wherein the second character has a different appearance then the first character, wherein the second character audibly presents the challenge presented via the reading and watching user interfaces, wherein the user is to verbally provide a response to the challenge, the response including key elements presented via the watching user interface for that challenge; a review user interface configured and arranged to include at least a textual representation of key elements previously presented via the watching user interface; in response to at least one user action, transmitting for presentation on the user terminal user interfaces associated with a scored challenge session configured to test the user with respect to challenges included in the module, wherein for a challenge on which the user is to be tested the scored challenge user interface includes: at least one character audibly presenting a randomly selected challenge from the plurality of challenges, wherein the at least one character has lip motions at least substantially synchronized with the audible randomly selected challenge, and wherein the user is to audibly respond to the randomly selected challenge by at least presenting corresponding key elements; a scoring interface for the randomly selected challenge, the scoring interface configured to receive and/or provide at least the following scoring information: how accurately and/or completely the user audibly presented the key elements; transmitting for presentation on the user terminal at least one navigation control via which the user can provide navigational instructions that enable the user to navigate to a desired user interface.

Optionally, a character design user interface including one or more menus of clothing and body parts via which characters can be generated via a user selection of one or more body parts and one or more articles of clothing is provided for display; and optionally a user interface via which a background corresponding to a real world environment can be selected to be displayed in association with at least one generated character is provided for display.

An example embodiment provides a tangible computer-readable medium having computer-executable instructions stored thereon that, if executed by a computing device, cause the computing device to perform a method comprising: for a first challenge in a training module, wherein the first challenge is a statement or question that a user is to respond to, transmitting for presentation on a user terminal user interfaces associated with a learning session and user interfaces associated with a practice session, wherein: the learning session includes a reading section configured to train the user using text in how to respond to the first challenge, and a watching section, configured to train the user using an audio video presentation to respond to the first challenge, wherein the reading section includes a reading user interface configured to present via text: the first challenge; a guideline language construct that provides a model answer to the first challenge, wherein the guideline language construct includes: a key element; and contextual language in which the key element is embedded, wherein the key element is caused to be visually distinguished from the contextual language; wherein the watching section includes a watching user interface configured to present: a textual representation of the key element; an audio video presentation of a first character audibly presenting the guideline language construct, including the key element, and/or audibly presenting the key element without the guideline language construct, wherein the first char-acter has lip motions at least substantially synchronized with the audio presentation; wherein the practice session user interfaces include: a performing user interface, wherein the performing user interface includes an audio video presentation of a second character, wherein the second character audibly presents the first challenge, wherein the user is to verbally provide a response to the first challenge, the response including at least the key element; a review user interface configured and arranged to include at least a textual representation of the key element; in response to at least one user action, transmitting for presentation on the user terminal user interfaces associated with a scored challenge session configured to test the user with respect to at least the first challenge, wherein the scored challenge user interface includes: at least one character visually and audibly presenting the first challenge, wherein the at least one character has lip motions at least substantially synchronized with the audible first challenge, and wherein the user is to audibly respond to the first challenge by at least presenting the key element; a scoring interface, the scoring interface configured to receive and/or provide at least the following scoring information: how accurately and/or completely the user audibly presented the key element; and transmitting for presentation on the user terminal at least one navigation control via which the user can provide navigational instructions that enable the user to navigate to a desired user interface.

An example embodiment provides a computer based method of training, comprising: for a first challenge in a training module, wherein the first challenge is a statement or question that a user is to respond to, electronically transmitting for presentation on a user terminal: a reading user interface configured to present via text: the first challenge; a guideline language construct that provides a model answer to the first challenge, wherein the guideline language construct includes: a key element; and contextual language in which the key element is embedded, wherein the key element is caused to be visually distinguished from the contextual language; a watching user interface configured to present: a textual representation of the key element; an audio video presentation of a first character audibly presenting the guideline language construct, including the key element, and/or audibly presenting the key element without the guideline language construct, wherein the first character has lip motions at least substantially synchronized with the audio presentation; a performing user interface, wherein the performing user interface includes an audio video presentation of a second character, wherein the second character audibly presents the first challenge, wherein the user is to verbally provide a response to the first challenge, the response including at least the key element; a review user interface configured and arranged to include at least a textual representation of the key element; in response to at least one user action, transmitting for presentation on the user terminal user interfaces associated with a scored challenge session configured to test the user with respect to at least the first challenge, wherein the scored challenge user interface includes: at least one character visually and audibly presenting the first challenge, wherein the at least one character has lip motions at least substantially synchronized with the audible first challenge, and wherein the user is to audibly respond to the first challenge by at least presenting the key element; a scoring interface, the scoring interface configured to receive and/or provide at least the following scoring information: how accurately and/or completely the user audibly presented the key element; and transmitting for presentation on the user terminal at least one navigation control via which the user can provide navigational instructions that enable the user to navigate to a desired user interface.

An example embodiment provides a training system configured to train a user, comprising: a server; a network interface coupled to the server; a tangible computer-readable medium having computer-executable instructions stored thereon that, if executed by a computing device, cause the computing device to perform a method comprising: for a first challenge in a training module, wherein the first challenge is a statement or question that a user is to respond to, electronically transmitting for presentation on a user terminal: a reading user interface configured to present via text: the first challenge; a guideline language construct that provides a model answer to the first challenge, wherein the guideline language construct includes: a key element; and contextual language in which the key element is embedded, wherein the key element is caused to be visually distinguished from the contextual language; a watching user interface configured to present: a textual representation of the key element; an audio video presentation of a first character audibly presenting the guideline language construct, including the key element, and/or audibly presenting the key element without the guideline language construct, wherein the first character has lip motions at least substantially synchronized with the audio presentation; a performing user interface, wherein the performing user interface includes an audio video presentation of a second character, wherein the second character audibly presents the first challenge, wherein the user is to verbally provide a response to the first challenge, the response including at least the key element; a review user interface configured and arranged to include at least a textual representation of the key element; in response to at least one user action, transmitting for presentation on the user terminal user interfaces associated with a scored challenge session configured to test the user with respect to at least the first challenge, wherein the scored challenge user interface includes: at least one character visually and audibly presenting the first challenge, wherein the at least one character has lip motions at least substantially synchronized with the audible first challenge, and wherein the user is to audibly respond to the first challenge by at least presenting the key element; a scoring interface, the scoring interface configured to receive and/or provide at least the following scoring information: how accurately and/or completely the user audibly presented the key element; and transmitting for presentation on the user terminal at least one navigation control via which the user can provide navigational instructions that enable the user to navigate to a desired user interface. Optionally, the method further comprises detecting the initiation of a verbal challenge response by the user, wherein the verbal challenge response is made after the first challenge has been presented; optionally identifying a speech disfluency at the beginning of the verbal challenge response, determining how long it took the user to initiate the response relative to the presentation of the first challenge; and generating a score related to how quickly the user initiated the challenge response, wherein the act of determining how long it took the user to initiate the response relative to the presentation of the first challenge does not include the time at which the user articulated the speech disfluency as the initiation of the response.

An example embodiment provides a training system configured to train a user, comprising: an optional server; an optional network interface coupled to the server; a tangible computer-readable medium having computer-executable instructions stored thereon that, if executed by a computing device, cause the computing device to perform a method comprising: for a first challenge in a training module, electronically transmitting for presentation on a user terminal: a first user interface configured to present via text: the first challenge; a guideline language construct that provides an example answer to the first challenge, wherein the guideline language construct includes: a significant element; and contextual language in which the significant element is embedded, wherein the significant element is caused to be visually distinguished from the contextual language; a second user interface configured to present: a textual representation of the significant element; an audio video presentation of a first character audibly presenting the guideline language construct, including the significant element, and/or audibly presenting the significant element without the guideline language construct, wherein the first character optionally has lip motions at least substantially synchronized with the audio presentation; a third user interface, wherein the third user interface includes an audio video presentation of a second character, wherein the second character audibly presents the first challenge, wherein the user is to verbally provide a response to the first challenge, the response including at least the significant element; a fourth user interface configured and arranged to include at least a textual representation of the significant element; in response to at least one user action, optionally transmitting for presentation on the user terminal user interfaces associated with a scored session configured to test the user with respect to at least the first challenge, wherein the scored session user interface includes: at least one character visually and audibly presenting at least one challenge related to or the same as the first challenge; a scoring interface, the scoring interface configured to receive and/or provide at least the following scoring information: how accurately and/or completely the user audibly responded to the first challenge (e.g., using the significant element); and optionally transmitting for presentation on the user terminal at least one navigation control via which the user can provide navigational instructions that enable the user to navigate to a desired user interface.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIG. 3A1-3 illustrate additional example process flows.

DETAILED DESCRIPTION OF PREFERRED EMBODIMENTS

Figure 1:
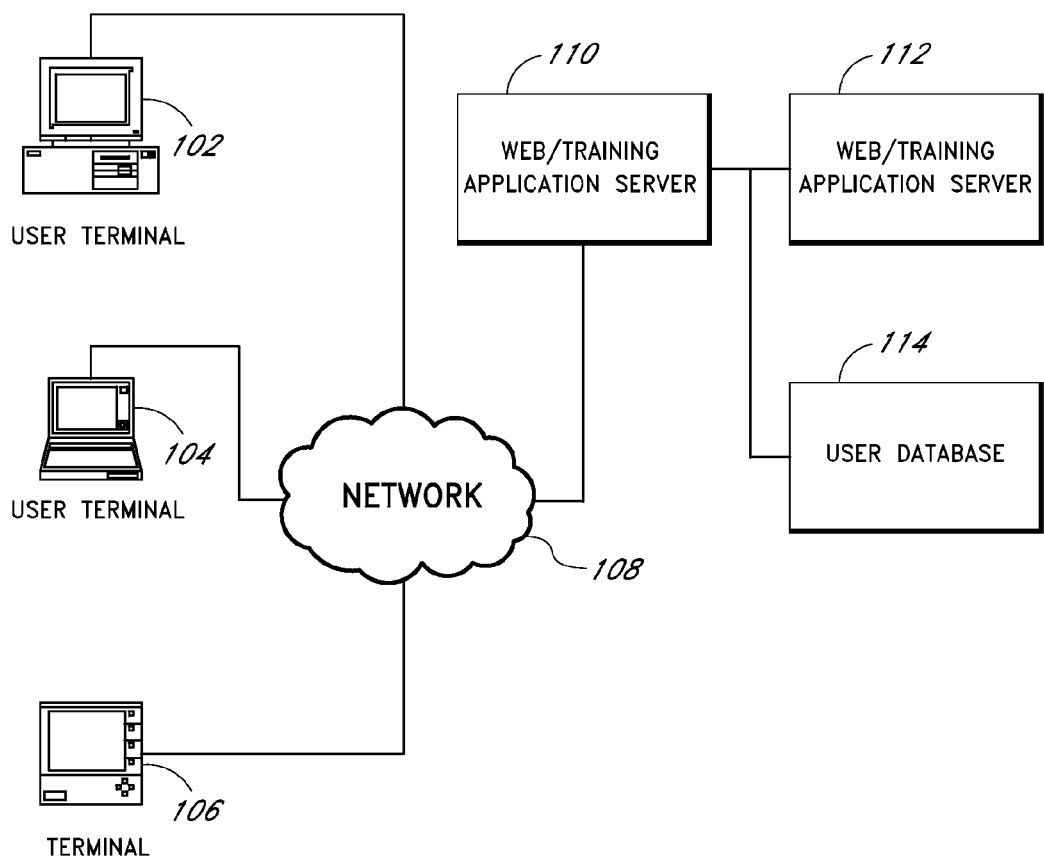
FIG. 1 illustrates an example networked system that can be used with the training system described herein.

The present invention is directed to interactive training, and in particular, to methods and systems for computerized interactive skill training.

The inventors have discovered that one of the greatest deficits with respect to conventional training of users in verbal performance is lack of consistent and quality deliberate verbal practice and rehearsal. Further, conventional approaches using role playing generally fail, because unless one is a professional actor, "role playing, verbal practice and verbal rehearsal" is generally loathed and creates high levels of anxiety in those that need this level of practice and rehearsal, as verbal skills closely define one's self-image. Certain individuals will state that they are always practicing as they are constantly speaking all the time. However, without proper structured training (e.g., via deliberate verbal practice and rehearsal provided by embodiments described herein), these individuals are merely institutionalizing their current performance level. Further, traditional role playing will not work if the individual playing the role model and/or those assessing each other do not have high levels of competency regarding what are and are not correct answers. This is especially true for most or all management levels who rarely verbally rehearse their interactions with employees or other managers.

Unfortunately, conventional approaches that attempt to get people to participate in more verbal practice generally meet with a high level of resistance. Examples of such conventional approaches include flash cards, mirroring, and video/voice recording of trainees, where the user is supposed to articulate what they are expected to articulate in the real world. Such conventional approaches generally fail to provide sufficient levels of high frequency and high quality practice and rehearsal, and further fail to provide adequate "emotional engagement" of the learner (e.g., the learner does not really "try their best" as they would in the real world, but instead simply tries to get through the training and get it over with out expending too much mental effort).

Effective and efficient systems and methods providing consistent and long lasting training on using verbal skills in a real-world environment have been surprisingly attained using computer-based systems, methods, and "recipes"/formulas described herein.

As will be described herein, certain embodiments of the present invention provide an interactive performance training and coaching system that is configured to facilitate knowledge acquisition, marketplace/real world performance and behavioral embedding. In particular, certain embodiments utilize a computer-based system that provide deliberate verbal practice and rehearsal to provide behavioral embedding.

While the term "computer-based" is utilized it should be understood that the training provided by the computer-based system can be delivered to a trainee via the Internet, an intranet, portable memory (e.g., CD-ROM disk, DVD disk, solid state memory, magnetic disk), or fixed, internal memory (e.g., a magnetic disk drive), etc.

Embodiments described herein can be utilized with respect to training users for various situations/applications involving verbal expression and interaction. For example, certain embodiments can be adapted and utilized to train a user to operate in marketplaces, management, industries, and fields of work that involve human interaction, as well as in other social interactions (e.g. with family, friends, speaking engagements, etc.). Further, systems and methods are provided to enable content to be quickly customized for a particular use. For example, the text and audio component can be in any desired language, where an author/designer can "drop" in the desired text and audio for a given user interface in the desired language. Multiple versions of an audio track can be prerecorded and then appropriately selected and assigned to a given character/user interface. Optionally, for example, if there is a number series that might change, various versions of the same audio can be recorded during a single recording session, and then the appropriate one is selected (e.g., the audio recordings may recite "for only $10", "for only $12," etc.), as needed. Therefore, the designer would not have to retain again the person who recorded the original voice recording and/or would not have to record the entire script or major portions therein over again in order to accommodate certain changes to the script. This reduces the cost of creating new, but similar versions and the time to do so. Further, the appearance and characteristics of the characters/avatars in the video component can be easily changed to a desired age, cultural, national, or ethnic group. It is understood that the term "character" as used herein can refer to one or more animated characters or videos of real people, unless the context indicates otherwise.

As discussed above, certain embodiments can be adapted to different types of work and job functions as well as to a variety of personal situations. Further, certain embodiments can be utilized to train a user with respect to some or all of the following: interactions between employees and customers, between the user and internal clients, between managers and employees, between managers and other managers, between teachers and students, between family members, and other social, business, and educational situations. In addition, certain embodiments are applied to protocols, such as those relating to medicine, safety, etc.

Further, utilization of certain embodiments can result in an increase in performance in sales, service, compliance, managing, coaching, and other areas that rely on interpersonal relationships for success. In addition, utilization of certain embodiments enhances the competences of managers and training coaches. Advantageously, certain embodiments optionally provide automated "self-coaching." Certain embodiments enable a user to dynamically adapt the training process to the user's personal learning style and performance characteristics and preferences.

Many of the benefits of systems and methods disclosed herein utilize advanced neuroscience theory and apply such theory to learning and training. It is understood that the benefits may be optional and not all benefits need to be present in a given embodiment.

Systems and processes described herein automate deliberate verbal performance practice, rehearsal, and testing. Optionally, testing is "randomized" to simulate the unpredictability of real-world environments. Further, certain embodiments "teach and test" at the same time, wherein the user is presented with verbal challenges that simulate relevant real-world situations, and to which the user needs to verbally respond.

By utilizing "real-world" verbal answers rather than just multiple-choice or true/false responses, certain embodiments teach and test for true, embedded knowledge and skills, rather than simply "prompted knowledge," as is the case with systems that rely on multiple-choice or true/false questions and responses. This enables entities employing systems and methods disclosed herein to focus learning on learning interactions where individuals/teams are expected to respond without "reference sources", which reflects the vast majority of real human interactions.

Furthermore, by utilizing "real-world" verbal answers rather than just "typed-in answers," which fail to simulate real-world experience, or "automated verbal voice recognition", which has a high failure rate, is slow, and does not offer blended human interaction, the transfer of learned skills is much more successfully translated into the real world.

The inventors have realized that multiple exposures to different, purpose-built scenarios which a trainee will face in real life, in combination with logical and deliberate verbal practice and rehearsal provides continuous learning and engagement that will result in accelerated and compressed experiential learning. Further, such logical and deliberate verbal practice and rehearsal will enhance the trainee's fluency, automaticity, and generalization, so that the knowledge that is expected to be learned and articulated becomes "second nature" and relatively automatic, leaving the trainee's mind free to thoughtfully navigate clues and opportunities in dealing with others. As a result of such fluency and automaticity, the trainee will be able to "generalize" from what they learned and apply it to a new or novel situation, as typically occurs in the real world.

By way of illustration, training provided using systems and methods described herein can improve employee's interactions with customers, with resulting increases in sales, customer satisfaction, and customer loyalty. Further, when embodiments are used to train managers and coaches, there is a resulting enhancement in leadership, management, implementation of administrative functions, and performance coaching. Further, the resulting increase in a trainee's competence will further result in an increase in self-confidence and personal satisfaction in knowing that they are prepared for encounters with consistent best-practice behaviors. This increased self-confidence results in a more satisfied performer having better internal comfort, which in turn results in still higher levels of overall performance and job satisfaction.

In addition, certain embodiments can be used by a trainee training alone and/or with others who act as facilitators. These facilitators can be peers, managers/leaders, trainers, and/or learning professionals. This optional approach advantageously creates the ability for self-study with or without facilitator accountability, dual learning for both participants, and compresses learning time. Further, certain embodiments provide practical and "emotional" simulation, as the user acts as if the character is a real world person, thereby enhancing engagement, attention, focus, and fun (e.g., in the form a "video learning game").

As discussed elsewhere herein, certain embodiments enable the training process and content to be customized, where modules and challenges can be rapidly created. This is achieved through a model where a company/user can "drop in" their own desired text, audio, and/or video content via easy to use interfaces. In this regard, there is "prioritized relevancy". That is, custom modules are optionally built based upon prioritized relevancy so that the training/learning has a substantially immediate practical application in the real-world marketplace. Thus, modules can be "purpose built," which creates focus on the most or more important concepts to the user's employer/organization and/or user. Furthermore, training modules are optionally configured to be story and/or context-based to further facilitate the embedding of the training and to make the training more enjoyable and to reflect real-world situations.

As many modules as deemed desirable may be created for a given training process. This enables multiple challenges/scenarios for similar situations, reflecting the real-world where situations present differently. By way of analogy, in medicine, not all cases of pneumonia present in identical fashion. Therefore, physicians are trained for different symptom presentations through "multiple scenarios."

Certain embodiments solve the problem of training fall-off, the lack of behavioral embedding, and "consistent inconsistency", as such embodiments provide for and encourage continuous learning. This is achieved through frequent, regular (e.g., daily, weekly, monthly, or other scheduled or unscheduled regular or irregular timing) training, deliberate verbal rehearsal/practice, and reinforcement, thus taking advantage of recent understandings provide by neuroscience research.

Further, certain embodiments employ "learning ergonomics", recognizing that if users are comfortable with and/or enjoy the process they are much more likely to continue to utilize the training system. Because the system produces good results that are observable by the user, where the user can see that the training system and process work and have improved the user's performance, the user is much more likely to continue utilizing the training system for this reason as well. Additionally, such embodiments more fully engage participants by providing verbal interactivity using consistent and deliberate verbal practice and rehearsal.

An overview of an example training system will now be described. However, other embodiments may have different configurations, different user interfaces, fewer or additional user interfaces, different scoring techniques, etc.

An example training process can include one or more modules, where each module includes one or more challenges (e.g., up to, but typically no more than 12 challenges, or more than 12 challenges) that focus upon a particular topic. Challenges may include simple and/or complex questions and/or statements, as well as simple and/or complex scenarios, problems, etc. For example, if the training is directed to training a sales associate in how to make sales, a challenge may be a statement or question from a customer regarding a product offering to which the user is to respond to. By way of further example, the challenge may be a request for a statement of policy or procedure asked by manager. A number of modules may be needed to complete the training for a given topic. A given module can optionally include homogenous and related challenges.

A given challenge is associated with multiple user interfaces that involve reading, watching, practicing, and reviewing. An example embodiment contains four interfaces for a given challenge that provide the corresponding functions of engaging the trainee in reading, watching, performing and reviewing, as discussed below, although different interfaces may be used as well. Further, a given user interface may be formatted and sized to fit on single "screen", or may be provided using more than one screen (e.g., two, three, four, etc.). Optionally, two or more of the reading, watching, performing and reviewing interfaces are displayed at the same time via the same screen.

As will be discussed below, once a user has proceeded through the reading, watching, performing and reviewing sections for each of the module's challenges, the user will then be tested and scored on his or her skills and knowledge for that module.

The four interfaces enable different learning styles of different users to be accommodated. Further, a user can work and navigate within the interfaces to enhance neuro-embedding of the training subject matter. Such neuro-embedding is further enhanced by optionally allowing, encouraging, or instructing the user to take notes while accessing some or all of the training sections and user interfaces. These notes are optionally not to be accessed when utilizing the performing interface or the scored challenge interface (e.g., the system locks out and prevents access to stored notes while these interfaces are presented).

Challenges are selectively presented by the training systems via user interfaces, some of which include text, audio, and video formats. As previously discussed, there can be one or many challenges per module (although preferably the number of challenges is selected to prevent a trainee from becoming bored or overwhelmed (e.g., typically 12 or less challenges/module)). Further, there can be one or many modules. Still further, optionally a single module can cover a given concept or a series of modules can be provided that individually serve as building blocks towards providing a comprehensive training solution to meet more complex needs. As previously discussed, modules can be created to enable the training of a variety of learning and verbal skill sets, such as sales, service, management, compliance, social skills, educational skills at all grade levels, public speaking, etc.

In an example embodiment, there are two section types, a study section and a scored challenge section. The study section includes four user interfaces, wherein a "learning" section includes 2 user interfaces and a "practice" section includes two user interfaces. The learning sub-section includes a "reading" user interface and a "watching" user interface. The practice section includes a "performing" user interface and a "reviewing" user interface. Furthermore, the verbal challenges provided in the study and scored challenge sections optionally perfectly align with the textual display of the challenges in the table of contents. The foregoing interfaces help encode information as they impact multiple areas of the brain. Optionally, for a given module, corresponding study sessions may be presented for each challenge in a specific logical, linear sequence (although optionally, the challenges in the study session may be randomized).

In addition, a table of contents is optionally provided at the beginning of a given module. Optionally, rather than simply providing a directory of sections or user interfaces, the table of contents begins preparing the user for the training provided by the module. In particular, the table of contents optionally includes a textual display of the challenges contained within the corresponding module, where the user can click on the textual display or associated control, and then automatically proceed to the corresponding challenge. Further, the table of contents also includes an image of a character (in video or optionally still form, where the character may be a real person or a drawn/animated person) for a given challenge, wherein the character that recites the challenge is the same character as the character that recites the challenge on the practice user interface and/or the performing user interface within the scored challenges section. Optionally, the characters in the table of contents do not recite the challenge. Optionally the characters in the table of contents are different than the characters that recite the challenge in the practice user interface and/or the scored challenges section. Optionally, the characters challenge the users in the first person. Optionally, instead of or in addition to stating challenges, the characters instruct the user what they will have to verbally answer in the practice and/or scored sections as discussed below.

In an example embodiment, when the table of contents is initially presented, optionally first a tableaux of all the characters (or a selected number of characters) is displayed as a group, where the characters are not reciting challenges and the tableaux is presented as a static image. Then, one by one, each character recites its challenge, in the same order in which the characters and/or challenges will be presented in the module.

Optionally, when a given character recites its challenge in the table of contents, the speaking character fills all or more of the screen, and the other characters are removed from the user interface, or optionally the character reciting its challenge is made larger than the non-speaking characters and/or the speaking character is presented in the foreground and the non-speaking characters are moved to the background or are not displayed at all. This efficiently utilizes screen real estate without obscuring the most significant character at any given moment. Optionally, the tableaux of all the characters (or a selected number of characters) is displayed after (instead of, or in addition to before) the audio video presentation of each avatar reciting their corresponding challenge. Thus, the table of contents provides a novel and easy to use interface that not only enables users to navigate, but also prepares and orients the user for the training ahead. One optional benefit of utilizing the audiovisual characters in the table of contents, as compared to the traditional text methodology, is the audiovisual characters work much better in getting the user's attention, which further facilitates learning. In addition, neuroscience research demonstrates that when there is the proper amount of "healthy tension," dopamine is released which enhances the user's attention and subsequent learning.

The table of contents also optionally includes pause, play, fast forward, rewind and/or replay controls with respect to the audio/visual presentations. For example, the table of contents may initially display the characters statically and/or without an audible content. When the user presses a play control for a given challenge, the video and/or audio will then be played or replayed. After the user has experienced the table of contents, the user then proceeds to the first of the interfaces in the first challenge (or optionally, a challenge selected by the user via the table of contents). In addition, while normally a user would proceed to the first interface of the challenge (and then sequentially to the second, third, and fourth user interfaces), optionally the user can navigate via a navigation control directly to any of the challenge user interfaces so that the user can engage the user interfaces in an order desired by the user, and can selectively repeat user interfaces.

The inventors have discovered that using an animation of an entity, such as a person, (sometimes referred to herein as an "avatar"), as opposed to a real person, to recite the challenge offers certain advantages. With respect to avatars, users will focus on learning to a greater degree with avatars than with videos of actual people. This is because users do not "judge" avatars in the same way they judge real people, and so are not distracted by such judgments. Additionally, avatars allow for customized modules to be rapidly developed and deployed, with the appropriate diversity, cultural correctness, and in multiple languages. Where the context so indicates, the term "character" as used herein is intended to refer to either an avatar (an animated person or other animated entity) or a real person or entity. Further, as discussed above, the use of avatars rather than a video of real people can greatly reduce system memory requirements and processor load.

For example, certain embodiments include an avatar generation module that enables avatars and/or the backgrounds to be customized by selecting from menus (e.g., palettes or drop down menus) such items as hair style, hair color, skin color, clothing, facial characteristics (e.g., shape of the eyes, lips, the presence and grooming of facial hair, wrinkles, etc.), etc., to specify an avatar that corresponds to a person the trainee may encounter in real life given their geographical location and job function. Further, the author/designer selecting and building the course content may select and specify a background to be displayed in the video in conjunction with the avatar. For example, if an avatar is supposed to represent a bank customer, a bank interior may be selected and displayed in the background. If the avatar is supposed to represent a customer in a jewelry store, a jewelry interior may be selected and displayed in the background. The author/designer can then store the specifications for the avatar and background, specify what modules, challenges, and user interfaces it is to be used in, and associate audio that the avatar will speak via the user interfaces. In addition, an author/designer can retrieve and modify an existing avatar (e.g., change the clothes of an avatar for a different scene), rather than have to start from scratch. The use of customized avatars, rather than videos of actual persons, also greatly reduces the memory that would otherwise be needed to store many different videos of actual people of different age, cultural, national, or ethnic groups speaking different languages. Further, the load on the system processor(s) is greatly reduced when rendering avatars as opposed to decoding and displaying stored videos of real people. Thus, the use of avatars in the training processes also addresses the technical challenge of quickly and efficiently developing training characters and of displaying a customized character via a training user interface.

Optionally, users can access existing modules and mix and match them to create new modules that contain both the study and scored challenge components.

For example, in order to develop a module for vocabulary, a user (e.g., an educator and/or or student), could select a subset of words (e.g., 10 words) out of a much larger vocabulary list (e.g., 200 words) that they would want to focus upon. In this example, the larger vocabulary list already has been programmed into modules/challenges. As each vocabulary word would represent a challenge, the person who wants to create the custom mix and match module selects, for example, ten vocabulary words from the existing vocabulary word list (accessed from memory and presented by the system), and optionally clicks on the desired words or optionally types in the desired words, and the system automatically assembles these words into challenges within one or more modules. It is understood that the components heretofore discussed regarding the composition of modules can be automatically assembled in this manner.

Optionally, the system is configured so that a user (which may be a data entry person, a programmer, an instructor, a manager, a trainee, or other authorized person) types in the text (e.g., key elements, guideline language, etc.) and/or selects (and optionally edits) preexisting text (e.g., from a menu of preexisting text), to be displayed via the various user interfaces (e.g., the reading interface, the watching user interface, etc.) using one or more text input/text selection user interfaces. The system then automatically populates the corresponding text portions of the user interfaces (e.g., the reading, watching, performing, reviewing and/or scored challenges interfaces). Where the same text is to be displayed on more the one interface (e.g., the key elements), optionally, the user only has to enter the text once (e.g., via key elements input fields), and the system automatically populates each user interface having the common text (e.g., the watching, performing, reviewing, scored challenge user interfaces). Optionally, the system automatically emphasizes (bolds, highlights, italicizes, etc.) certain text with respect to surrounding text. For example, the system may automatically (or in response to user instructions) visually emphasize the key elements when embedded in contextual language and presented via the reading using interface. The user could optionally select from a "bank" of avatars and then populate the corresponding interfaces accordingly.

Optionally, in order to customize what the avatars recite, the user records one or more voices via a microphone coupled to the system or other recording device. The user then selects, via a user interface, a voice recording file and associates it with a selected avatar (e.g., selected from a menu of avatars). The system then synchronizes the voice recordings with the selected avatars, and migrates the result to the appropriate watching, performing, scored challenge, and/or other interfaces. Optionally, manual or automated animation of the avatars is performed with the voices including voice/volume equalization.

While example embodiments of user interfaces will now be described with respect to content, visual appearance, emphasis, positioning, and arrangement, it is understood that different content, appearance, emphasis, positioning, and arrangements may be used.

Optionally, the first interface for a given challenge contains the reading interface. The reading interface begins with a display of the corresponding challenge in text form. Challenges may include simple and/or complex questions and/or statements, as well as simple and/or complex scenarios, problems, etc. Presented below the text-based challenge is a phrase (including one or more words) that orients the user to the learning modality of the reading interface. For example the orienting phrase can recite "Reading," "Read It," "Read," and/or other designations that indicates that the user is to read the text and that there will not be a video component or a voice reciting the challenge or other text.

Beneath the orienting phrase a scripted guideline response to the challenge is textually displayed. The guideline response may include a plurality of phrases, where a given phrase is directed to a specific element, and may be in the form of a complete sentence, or one or more words. Each phrase of the scripted guideline response is separated from each other (e.g., displayed on a different line, displayed one at a time, etc.). Optionally, and preferably, the phrases are presented in segmented sections rather than in "paragraph form," so the concepts presented by the phrases are more emotionally/learning accessible. To further distinguish and emphasize the phrases, there is optionally a "bullet point" or other designator to the left or the right of each of the separated phrases. The "bullet point" is utilized so as to draw the eye and mind to the phrases. The inventors have determined that without this "bullet point", many users do not process or retain the concepts contained in the elements as well.

Embedded within the scripted guideline response phrases are key elements that represent precisely what is to be learned, memorized and articulated. The overall guideline language is to provide context to the user, but is not necessarily to be memorized and/or articulated. The key elements are used to help to encode more important information. The key elements may be visually emphasized with respect to the surrounding phrase text in which they are embedded.

In order to emphasize the key elements with respect to surrounding phrase text, the key elements text appears with one or more different attributes, such as a different type style/font, bolding, italics, colors, and/or other attribute to distinguish the key element from the surrounding guideline context text.

The reading user interface incorporates a "Focusing Funnel" and "content shaping" approach to distil large amounts of information into more manageable "usable information". Preferably, there is a maximum of 9 separate phrases for neuro-embedding purposes, although more phrases can optionally be used. In neuroscience, this is referred to as the "chunking" principle. As previously discussed, the separated phrases or segments may or may not be complete sentences, as sentences may be broken into more than one section for learning and testing purposes.

A given section is scored separately for content in the scored challenges section, which follows the study section. As previously discussed, the overall guideline language provides context to the user, but is not necessarily to be memorized and/or articulated. The key elements include the more essential words to learn in order to drive desired outcomes. Thus, the user is to memorize and later articulate the key elements. The inventors have termed this approach the "Mini-Max Principle", which focuses the trainee on the relatively minimum number of words they need to learn to produce the maximum desirable outcomes. Advantageously, by focusing on the key elements, the user is prevented from perceiving that the training involves mere rote memorization of the exact role model guideline language to be used, and in addition reduces what needs to be learned and articulated to produce desired outcomes.

Thus, the study elements (e.g., the key elements) for a challenge category are optionally packaged or presented together so as to better train the trainee to respond to randomized scored challenges which better mimic real world situations. Additionally, some or all of the elements (e.g., key elements), are kept focused (e.g., unitary, short) to enhance objective scoring and reduce subjective scoring. As discussed herein, within certain interfaces, such as the watching user interface, the key elements may optionally be role modeled, verbalized, optionally with the text of the key elements appearing as they are verbalized, for cognitive and behavioral embedding purposes. The text super-impositions are optionally highlighted as they are displayed.

The user reads the "reading" user interface, and is instructed by the user interface to focus on the key elements. The user may practice articulating the key elements or the complete guideline language at this point. Optionally, the user is permitted to or instructed to also "take notes" on paper and/or via a data entry field displayed on the user terminal (where the user can save the notes in non-volatile computer memory by activating a "save" control). If the notes were stored in computer memory, the notes can optionally be printed and/or later accessed by the trainee. This note taking option is provided in recognition that for many individuals' learning style, literally writing/typing notes enhances the neuro-embedding process. Users may be encouraged to take notes if it fits their learning style. These notes are optionally not to be accessed when utilizing the performing interface or the scored challenge interface (e.g., the system locks out and prevents access to stored notes while these interfaces are presented, and/or the user is instructed not to refer to the notes, whether electronic or handwritten).

The combination of the guideline phrases can serve as a complete script for an acceptable response to the challenges, with the key elements embedded as appropriate within the grammatically correct full script (although optionally, the system informs the user that the user does not need to memorize or recite the guideline phrases verbatim). Users who mainly learn by reading (as opposed to listening or watching) particularly benefit from the reading user interface, as do users who benefit from multiple modalities of learning.

The next challenge interface normally presented is the watching user interface. The watching interface begins with a display of the stated challenge in text form, as similarly discussed above with respect to the reading interface. Presented below the text-based challenge is a phrase that orients the user to the learning modality of this interface. For example, the orienting phrase can include the phrases "Watching," "Watch It," "Watch," "Observe," and/or "Listen," and/or other designations that clarify that the user interface is providing audio or audio visual role modeling of the correct answer. The watching user interface presents the key elements, without the surrounding role model language, in text format to the left of the user interface (or other location based upon design and/or cultural preferences) and further presents one or more characters/avatars which have been programmed to verbalize the entire script (the guideline language including the key elements) from the previous reading user interface. However, optionally, a control is provided via which a user/facilitator/designer can specify that the key elements are to be displayed embedded in the guideline language constructs (surrounding role model language) via the watching user interface. Optionally, as a default, the key elements are not displayed embedded in the guideline language constructs via the watching user interface. Optionally, as a default, the key elements are to be displayed embedded in the guideline language constructs via the watching user interface.

To further distinguish and emphasize the key elements, there is a "bullet point" or other designator to the left or the right of each of the separated key elements. This emphasis further neuro-embeds the key elements in the user's brain.

A character (e.g., an avatar or video of a real person) displayed via the watching user interface acts as a "role model" for the user, where the characters lip motions are substantially synchronized with the audio of the role model language. If an avatar is being used, the avatar's lips, facial expression, and/or gestures may be animated to provide a more realistic simulation, while optionally still clearly an animation rather than a real person. That is, the avatar is optionally designed and configured to ensure that the user understands that the avatar is not a real person for reasons discussed elsewhere herein. For example, optionally the texture of the avatar's "skin" may be made much smoother than a real person's skin, the avatar may appear as a physically idealized person (e.g., with perfectly regular features, perfectly arranged hair), the animated motions (e.g., movement of the lips, shoulders, eyes, etc.) of the avatar may be less fluid than a real person, etc. The character "speaks" the complete scripted guideline response that was previously displayed via the reading user interface, however, the key elements are displayed without the surrounding scripted guideline response in which they were embedded when presented via the reading user interface.

The text version of the key elements serve to provide a reading/visual encoding process for learning the key elements that correlate with the audio/visual presentation by the character, although the character articulates the entire scripted guideline response. Optionally, the character only role models the key elements without the surrounding role model language. Optionally, the watching user interface includes a control via which the user can choose both or only one of the foregoing modalities.

In addition, the watching user interface optionally includes pause, play, fast forward, rewind and/or replay controls with respect to the audio/visual presentations. These controls can be used by the user to pause the audio-visual portion so as to exclusively focus upon the key element text and/or to replay all or a portion of the audio-visual presentation. Further, the pause control can be utilized by the user to perform small bits of rehearsal before listening to the entire presentation and/or to correlate what the user heard with the key element text displayed on the watching user interface. The system optionally includes a closed caption function that the user can enable to display the text corresponding to the words being spoken. Optionally, the user is permitted to or instructed to "take notes" on paper and/or via a data entry field displayed on the user terminal (where the user can save the notes in non-volatile computer memory by activating a "save" control) while viewing the watching user interface. If the notes were stored in computer memory, the notes can optionally be printed and/or later accessed by the trainee. This note taking option is provided in recognition that for many individuals' learning style, literally writing/typing notes enhances the neuro-embedding process. Users may be encouraged to take notes if it fits their learning style. These notes are optionally not to be accessed when utilizing the performing interface or the scored challenge interface (e.g., the system locks out and prevents access to stored notes while these interfaces are presented, and/or the user is instructed not to refer to the notes, whether electronic or handwritten).

The watching user interface particularly benefits learners who mainly learn by watching/listening and/or who just want to focus on the key elements text, as well as those who benefit from and use multiple modalities of learning. Optionally, users may navigate back and forth between the reading and watching as frequently as they desire and may disproportionately utilize one interface or another to reflect their personally preferred learning style.

Once users feel they have learned enough from the reading and watching interfaces, they then proceed to the practice section, which includes the performing and reviewing user interfaces. In the practice section, the user audibly and verbally responds to verbal challenges. Advantageously, such verbal responses, reinforced via performance rehearsal and practice, simulate real-world verbal interactions, and therefore code differently in the brain than "academic" prompted-knowledge answering (e.g., answering multiple or true/false questions). Thus, the watching sub-section engages both cognitive and psycho-motor functions vs. only the cognitive functions of most traditional e-learning. Additionally, it has been shown that verbal recitation helps code knowledge in the reciting person's brain.

Further, the use of preprogrammed characters (e.g., avatars) reciting preprogrammed scripts ensure consistency and focus as compared to using human actors in role playing. Further, the use of computer-based characters enables a user to repeat a practice session as often as desired, without needing another person. In addition, research now demonstrates that although people are loath to and resistant to role playing/verbally rehearsing with actual people, this is not the case with the avatars when used as described herein, which users find non-threatening. However, experiments conducted by the inventors have demonstrated that merely challenging people with avatars will not reliably produce verbal responses from users. By contrast, the process described above provides a methodology that motivates users to consistently practice with the avatars.

Optionally a print function is available for some or all of the user interfaces, although optionally the print function is disabled for some or all of the user interfaces. However, the inventors have realized through experimentation that simply printing out the reading interface and having users attempt to train using the print out, rather than training with the avatar causes an almost immediate decline in real world user performance. Indeed, it has been observed that instead of full verbalizations, users are reduced to responding to challenges by simply reading the role model language, with sub-vocalizations and/or by "mumbling."

By contrast, using the process and system described above, once users develop a comfort level with the key elements by verbally responding to the characters (e.g., avatars), and subsequently mastering the scored challenges when verbally responding to the avatars, the trained behavior surprisingly does indeed transfer to real world humans in real world situations.

One factor that motivates users to speak to the avatars with a full verbalization (rather then failing to provide full verbalization, and/or mumbling as with certain conventional training processes), is that they realize relatively immediately that they will simply not be prepared for the scored challenges which require verbalizations that are rapidly initiated and confidently delivered.

The example third interface associated with the challenge, which is contained within the practice section, is the performing user interface (sometimes referred to herein as the "do it" user interface). The performing user interface optionally begins with a textual display of the stated challenge, as similarly discussed above with respect to the reading and watching user interface. Presented below the text-based challenge is the phrase/word that orients the user to the learning modality of this interface. For example the orienting phrase can recite "Performing," "Performing It," "Perform," "Doing," "Do It" "Do," "State," "State It," "Say It," "Say," "Try It," "Practice It," "Articulate," and/or other designations that clarify that the user is to articulate the correct answer to the challenge.

Below the orientation phrase/word, the "performing" user interface includes a video that presents the challenge visually and audibly via one or more characters (e.g., animated avatars or real people) that articulate the challenge, to "test" the user upon what has been learned during study of the reading and/or watching interfaces (and/or the reviewing interface if the user has already completed the module previously or had jumped to the review user interface prior to accessing the perform user interface).

The character (or characters) used to present the challenge is purposely selected and configured to be a different character than the character who presented the answers to the challenge using role model language on the watching user interface of the study section. This is to reinforce the understanding that the character providing the challenge represents a depiction of the individual(s) in the real world who would actually be presenting the particular challenge (while the avatar presented via the watching user interface is acting as an automated role model).

The user is to respond verbally to the challenge as if responding to a live person. That is, the user is to directly respond to the character(s) as if they are responding to whom the character(s) represent in the real world. Thus, the training system acts as a "verbal simulator".

In particular, upon hearing the verbalized challenge from the character, the user is to respond substantially immediately. In this regard, research and experimentation has demonstrated that users will consistently respond to the characters and to the challenges articulated by the characters, which would not be achieved using conventional techniques. Furthermore, conventional techniques of passively reading or watching training content will not create consistent and deliberate verbal practice and rehearsal as provided by the disclosed system. By way of illustration, research and experimentation by the inventors have demonstrated that when there is a printout of the training text (e.g., the guideline model language) that the user can refer to, deliberate verbal practice and rehearsal diminishes and performance results both during scored challenges and in the real world environment also diminish, sometimes very significantly. Further, research and experimentation by the inventors have demonstrated that merely having the character challenge the user as an independent variable fails to stimulate necessary levels of deliberate verbal practice and rehearsal.

Experimentation has further demonstrated that the example "formula/recipe" discussed above, that includes the reading, watching, performing, and reviewing interfaces, and that informs users that they will have to verbally respond to scored challenges, ensures that that the performing interface, which requires verbalization in response to challenges provided by the avatars, will be consistently implemented and utilized by users.

Optionally, there is purposely no recording and/or voice recognition, as research and experience indicates that such technologies were cumbersome, added little or no value. Nonetheless, optionally, voice recording (optionally with video recording of the user using a web cam or other camera) and/or voice recognition are provided via the training system.

For example, optionally, a user's verbalized responses (optionally with video) are recorded by hitting a "record" button. These recorded responses are immediately (or in a delayed fashion) played back via a playback button and enable the user to be self-assess their performance (e.g., where video is recorded, the user can observe their own eye contact, posture, body language, etc., in assessing their confidence). Optionally the audio/video recoding can be stored in system memory and later accessed and reviewed by a facilitator, such as a trainer, peer, manager, or coach, who can assess the user's performance and provide feedback to the user. The objective in this example embodiment is to provide the user with substantially instant feedback about how the user sounds from a style and/or attitude perspective. Optionally, substantially immediately after the playback, the facilitator/trainer asks questions of the user regarding the user's perception of the user's style and/or attitude. Examples of these questions are:

How do you think you sounded?;

Do you think you can across as confident and knowledgeable?

Would you have been convinced by your response as a customer or prospect?;

How could you have improved?, etc.

Optionally, once the playback of the user's recorded segment is complete, there can be an automatic default to the questions which are "asked" by the training system. That is, the questions are verbalized by a pre-recorded or synthesized voice at substantially the same time as text is displayed. Optionally, each question is "asked" separately. Optionally, two or more questions are asked together. After the response and/or discussion between the user and facilitator, the user/facilitator presses a "proceed" button (or other corresponding control) and the next question is asked, and so on.

Optionally, there is an option for re-recording a user response without saving the initial recorded segment via a control on the trainee and/or facilitator user interface.

Optionally, via a control on the trainee and/or facilitator user interface (e.g., a save recording icon that can be activated by the trainee and/or facilitator), there is an option for saving the recording as a "self-referenced role model" which the user and/or facilitator can later access as an example of a good response.

Optionally, there can be standard questions (e.g., 1, 2, 3, 4, 5, or more questions) with respect to the self-recording option, or these questions can be customized. For example, in order to remove the burden from the facilitator, once the user hears herself, and the system queries the user regarding the user's performance, the same questions can be asked each time (e.g., "How do you think you sounded?", "How could you improve your response?", etc.) or the system instead can ask different questions for different types of challenges. (e.g., for an objection, the system could ask "Do you feel you have overcome the customer's objections?").

In addition, optionally, a user can view the complete role model (e.g., a verbalized challenge, followed by a verbalized correct answer) of the challenge and a correct response, in sequence, at any time in the Study section, by navigating to the Performing user interface and then immediately thereafter, navigating to the Watching user interface, which plays the complete role model (however, the user is optionally instructed not respond verbally to the challenge, as the user is in a "listening" mode).

In an example embodiment the review interface, which is within the practice section, displays the key elements in text form, without the surrounding text, where the key elements should have been learned and articulated in response to the verbal challenge when viewing the performing user interface. The review interface can be used by the user to "self-evaluate" how well the user did when responding to the challenge presented via the performing user interface without being officially scored.

The review user interface optionally begins with a written version of the challenge being addressed. Optionally, positioned below this text-based challenge is a phrase (including one or more words) that orients the user to the learning modality of this interface. For example the orienting phrase can recite "Reviewing," "Review It," "Review" "Assess," "Self-Assess," "Evaluate" and/or other designations that clarify that an audio visual presentation is not being provided by the user interface. Optionally, the user interface informs the user that the user's verbal answer to the challenge should have included the key elements listed below.

Positioned below the orienting phrase/word are the correct answers to the challenge, based upon the key elements (e.g., without surrounding guideline language). These key elements are optionally precisely aligned (e.g., the same or substantially the same) with the key elements provided via the study section user interfaces. The user compares the key elements that appear on the review user interface to self-assess the user's response provided in response to the prior video challenge from the third interface. In addition or instead of the self assessment, the assessment can be performed by others independently (e.g., by a peer, coach, manager, other facilitator, etc.) and/or with the user. The user can then self-determine whether the user is ready to move on to the next challenge in the module and/or whether the user is ready to proceed to the scored challenges section. Optionally, the user is informed that the user should have a certain level of competence (e.g., that the user could correctly score between 70% and 100% with respect to responding to a challenge with the key elements) before proceeding to another challenge or the scored challenges section. If the user is not ready, the user can navigate back to review any challenge within the module, and any component within a given challenge for further review and practice. This enables a user to especially address areas in which they are weak.

Clinical research by the inventors has demonstrated that oftentimes regardless of the first score users receive in a scored challenge for the entire module, the ones that they do best/worst at actually change when they do a second or subsequent scored challenges. This is because what the users thought they mastered individually or on their first attempt may not have yet embedded in their brain and therefore their knowledge decays and/or dilutes. Thus, it is desirable to repeat the scored challenge section for a module until they lock in at least a certain threshold (e.g., 70%) score on each and every challenge within the module.

This purposeful self-evaluation, as compared to automated evaluation using voice recognition, has the following optionally advantages:

Accuracy of evaluation (as compared to the common errors resulting from automated voice recognition);

Speed (which is generally faster than would be achieved via convention voice recognition systems);

Engagement and interactivity by the user, rather than the user passively using automated voice recognition;

Additional learning, because users have to read the right answers again and judge themselves on how they have done, rather than merely glancing at a populated scoring interface provided via automated voice recognition;

Positive reinforcement via self validation and interactivity, rather than the user passively using automated voice recognition.

If, however, automated voice recognition is utilized, optionally the system automatically shows the outcome from the performing user interface on the reviewing user interface (e.g., via bolding, illuminating, and/or emphasizing the key elements the user correctly stated and/or the key elements the user incorrectly stated or did not state at all). With each new attempt at responding to a challenge, optionally the previous automated result disappears and only the most recent result is displayed.

If the user decides that further study and/or practice is needed to reach the desired competence threshold/score, the user may stay within a particular challenge before they move on to another challenge. Optionally, the user purposely is not scored in the practice section as the inventors' research demonstrated that such scoring at this juncture unnecessarily slowed down the training process and learning was diminished. Furthermore, scoring at this juncture inhibited and/or intimidated the users at this early stage of learning. Scoring is instead optionally encapsulated within the scored challenges section of performance drilling.

Optionally, the user is permitted to or instructed to also "take notes" on paper and/or via a data entry field displayed on the user terminal (where the user can save the notes in non-volatile computer memory by activating a "save" control) during the review or other section. If the notes were stored in computer memory, the notes can optionally be printed and/or later accessed by the trainee. This note taking option is provided in recognition that for many individuals' learning style, literally writing/typing notes enhances the neuro-embedding process. Users may be encouraged to take notes if it fits their learning style. These notes are optionally not to be accessed when utilizing the performing interface or the scored challenge interface (e.g., the system locks out and prevents access to stored notes while these interfaces are presented, and/or the user is instructed not to refer to the notes, whether electronic or handwritten).

As similarly discussed above, users may navigate back and forth between the two practice interfaces (performing and reviewing) as frequently as they desire and may disproportionately utilize one interface or another to reflect their personally preferred learning style.

Furthermore, users can navigate freely between the various interfaces in the learning/practice portions, repeating various sections and sub-sections as desired, until they are confident that they have mastered a challenge. This enables the system to adapt to the user's personally preferred learning style and comfort level. Once the user feels satisfied with their performance in any particular challenge, the user can then progress to the additional challenges, if any, contained in the module. If the user does proceed to another challenge within the module, the user will proceed through the sections and subsections and user interfaces (reading, watching, performing and reviewing user interfaces) for that challenge as similarly described above with respect to the previous challenge.

Optionally, once a user believes she/he has mastered the challenges in a given module, the user then proceeds to the scored challenges section. The scored challenges section optionally tests the user's ability to articulate what the user has learned in the learning and practice sections (e.g., with respect to being able to articulate, correctly, in a confident and timely manner the key elements within natural sounding contextual language). Optionally, the user will be tested with respect to each challenge in the module. Optionally, scoring challenges can be performed under the control of a scorer from remote locations (e.g., via a client terminal) as well as at the facility hosting the training system.

In the scored challenges section, characters (e.g., avatars) will repeat the challenges from the study sections. The characters are preferably the same as those in the study session, although optionally the characters are different. The user is expected to respond to the scored challenges using the appropriate key elements, wherein the user is to articulate the key elements with natural sounding contextual, "connecting" language so that the response is narrative, and not merely a recitation of key elements.

Optionally, the primary modality for the scored challenges is a randomized modality as random occurrences of scored challenges more closely reflects the real world. Optionally, this randomization can be turned off and the user and/or management may focus on particular scored challenges that the user needs more practice in (e.g., a determined from past training sections or from real world difficulties experienced by the user) and/or that are relatively more important to the user and/or management. The scored challenges may optionally be presented in a non-random, specific, predictable order, such as in cases where subsequent scored challenges build on concepts presented in previous challenges. For example, in teaching a user to recite a speech that contains four challenges, these challenges would not be randomized, because the flow of the speech is always in the same sequence.

Optionally, the user is permitted to or instructed to also "take notes" on paper and/or via a data entry field displayed on the user terminal (where the user can save the notes in non-volatile computer memory by activating a "save" control) during the scored challenge session. If the notes were stored in computer memory, the notes can optionally be printed and/or later accessed by the trainee. These notes are optionally not to be accessed when utilizing the performing interface (e.g., the system locks out and prevents access to stored notes while the performing interface is presented, and/or the user is instructed not to refer to the notes, whether electronic or handwritten).

In an example embodiment, the scored challenges section optionally includes some or all of the following scoring categories:

Accuracy of verbalizing the key elements (this score assesses user verbal delivery with respect to correct content);

Speed of initially responding (this score assesses the user's speed of initially responding, which typically reflects the impact of the perceived credibility of the user upon the ultimate recipient of the communication);

Confidence of responses (this score also assesses the credibility that will be conveyed, and further reflects that with increased confidence the user will experience increased "engagement satisfaction" in the real world for users (for example, job satisfaction, etc.)).

Advantageously, certain embodiments enable objective testing of challenge responses, even though the challenge responses are verbal in nature. The scoring techniques described herein eliminate or greatly reduce subjectivity with respect to scoring the user response accuracy in verbalizing the key elements in response to a challenge, as well as the scoring of the speed of answering/fluency timing of initially responding.

While there may be some subjectivity with respect to optional scoring the confidence of responses, the subjectivity is greatly reduced or eliminated by limiting the scoring of confidence to very few scoring designations (e.g., no confidence, somewhat confident, and confident). Research and experimentation by the inventors has demonstrated that when such limited scoring designations are used, different people scoring the same trainee with respect to confidence typically provide the same score, making the scoring virtually objective. Users can utilize the scored challenge section by themselves, with a small group, a trainer, a peer, etc. For example, a user can optionally first go through a scored challenge session by himself/herself to perform a self-evaluation that enables the user to know what the user has to go back and work on in the study section. During the self-evaluation phase in the scored challenges, optionally the scores are not permanently stored or transferred to a scoring database, but "disappear" after scored challenges are completed. Thus the user can work within the scored challenges section with confidence and without fear that others will see their scores and/or that their scores will go into their "permanent record". By self scoring, a user is provided with immediate positive reinforcement and also experience the consequences of "errors" to a greater degree then would be achieved using a voice recognition system that includes automated scoring. Therefore, there may be truer "learning through testing" than if the system is overly automated using voice recognition.

Once the user believes he/she is sufficiently competent, the user can ask to undergo a formal scored challenge session with a scorer, where the scores will be recorded in a scoring database for later retrieval and reported to others. Additionally, a trainer/facilitator may require the user to undergo a scored challenge session, regardless of whether the user feels sufficiently competent.

Optionally, the system is configured so to include "pure scoring modules" that align with each of the modules that contain a study section and a scored challenges section. Optionally, these "pure scoring modules" does not include the study section, and instead only contain the scored challenges section for the purposes of generating grades for the "permanent record" or "semi-permanent record". Optionally, for example, the user's management, peers, other facilitator, and/or the user can specify and generate such pure scoring modules. The pure scoring module optionally can serve as a post-study assessment tool that can be used with a manager (or peer) to determine the effectiveness of the study segment or overall level of proficiency at the end of the coursework. In addition or instead, the pure scoring module optionally can be used set a baseline score prior to any study to determine the level of pre-existing proficiency prior to undertaking the course, wherein the baseline score can be used to contrast with the post-study score to show increased proficiency. Optionally, even in the non-pure scoring embodiment discussed above, the user can skip the study section and go straight to the scored challenges.

Optionally, once the user has successfully completed the scored challenges a specified number of times or when the user feels confident, the user then purposefully has real people (e.g., a peer or manager) deliver the challenges to which the user responds. By engaging with a real person (in person, over the phone, via video conference, etc.), rather than an avatar, learning transfer from working with the training system to the real world is further enhanced.

Optionally a mute control is provided for any of the audio discussed herein. The mute control can be utilized, for example, during the scored challenges in the remote mode so that the "tester" can verbalize the challenges over the phone via another device, as well as in person, but score the user on the tester's own terminal.

The first interface (the term "the first" reflects the typical order a user would experience, but this order can be varied by the user and/or a facilitator/scorer) for a given scored challenge has a designation (e.g., "Challenge", "Test" and/or other designation) that indicates that the user will be scored with respect to a challenge via the user interface. Positioned beneath the designation, a character (e.g., an avatar) is displayed that appears to speak the challenge, and the challenge audio is synchronized by the system with challenge audio.

A given challenge presented by the character (or characters) in the scored challenge section preferably (although not necessarily) presents the exact same challenge as presented via the "performing" user interface of the practice section. Further, preferably (although not necessarily) the identical character that appeared in the "performing" user interface is stating the same challenge in exactly the same way in the scored challenge user interface. Still further, preferably (although not necessarily) the identical character that appeared in the table of contents user interface is also the same as the character used in the scored challenge user interface. Thus, the same character is used to state the challenge in the table of contents, the performing user interface, and the scored challenge user interface. The use of the same character across multiple user interfaces provides continuity and provides users with a feeling of "learning safety" as the users know they are not being "tricked" about what they have to master. However, optionally, a different character can be used to state the challenge using different words and/or in a different manner in each of the user interfaces.

Once the character states the challenge, the user is to substantially immediately verbally respond to the challenge (e.g., with a substantive response in less than 5 seconds or other desired, adjustable time frame after the challenge is delivered) by incorporating the corresponding key elements (preferably with "connecting" language so that the response is narrative, and not merely a recitation of bullet points). The response is to be delivered with confidence.

Optionally, a timer automatically appears and begins counting once the character completes the delivery of the challenge. The user, a peer (e.g., a fellow trainee), and/or "manager" "scorer" clicks on the timer as soon as the substantive response begins (or optionally, the system includes a voice recognition system that detects and determines when the user has begun responding), and the timer stops counting and optionally displays how long it took for the user to begin responding substantively (e.g., rather then stopping the timer upon an initial speech disfluency of "um," "ah", etc.). The timer may be a count up timer that displays the number of elapsed seconds and/or optionally the timer may be in the form of a color coded timer (e.g., a ball) that is green when it begins counting up, and changes to amber and then red as the time reaches certain thresholds (e.g., 3 second and 5 seconds respectively). Optionally, a timing score is initially automatically populated by the system that reflects the timing of the user's response (e.g., how long it took the user to begin responding to the challenge with a fluid, relevant response). For example, if the user response meets an "immediate" threshold (e.g., the user began responding within 2 seconds), the user may be assigned a first number of points (e.g., 2 points). If the user response meets a "delayed" threshold (e.g., the user began responding within 3 or 4 seconds), the user may be assigned a second number of points (e.g., 1 point). If the user began responding after the "delayed" threshold (e.g., after 4 seconds), the user may be assigned a third number of points (e.g., 0 points). Optionally, a human scorer can override the automatic score manually (e.g., in the case where the scorer forgot to stop the timer).

Once the user completes the scored challenge response, the user, peer and/or manager scores the user's response based upon the user's presentation of the key elements. The scoring can be entered via a scoring user interface, wherein a scoring icon, such as a checkbox, appears along with each of the key elements (displayed in text form), where the scoring icons can replace the bullet points that were displayed during the study/practice portions. The scorer clicks on each scoring icon to indicate whether the user correctly recited the corresponding key element. The system records the indications and substantially immediately or at a later time calculates a score. For example, the score may indicate the number of elements the user got right or wrong, the percentage of elements the user got right or wrong, and/or may be a letter grade or title based on the percentage of correct answers, etc. Other scoring user interfaces can be used as well. The system automatically calculates a score. For example, the score points awarded to the user may optionally be the same as the number of key elements the user correctly recited (or a multiple or normalization thereof), or a value based on the ratio of correct answers to the number of all key elements for that challenge.

Once key elements correctness has been scored, the person scoring then scores the speed of the user in initiating a substantive response, and the user's confidence level in responding to the challenge (assuming that confidence is to be scored). Several scoring designation options are presented with respect to confidence (e.g., no confidence, somewhat confident, and confident), and the scoring person selects the appropriate designation by clicking on the designation or a scoring icon to the left of the appropriate confidence level designation choice. For example, a first number of points (e.g., 2 points) may be assigned if the user sounded confident, a second number of points (e.g., 1 points) may be assigned if the user sounded somewhat confident, and a third number of points (e.g., 0 points) may be assigned if the user did not sound confident.

Scoring can optionally be automatically performed via voice recognition. For example, the system can convert the user's verbal challenge response to machine readable characters, compare the same to text corresponding to a known correct, reference version of the key elements, and determine which key elements the user correctly recited. In addition, as similarly described above, the system can detect when the user began responding to the challenge after the challenge was stated, and score accordingly. In addition, the system can, via voice recognition, determine if the user is hesitating, using fillers or speech disfluencies ("um," "ah", etc.), based at least in part on such determination and/or on a human provided score, provide a confidence score and/or in determining when the user initiated a substantive verbal response.

The user and/or scorer is then presented with an immediate feedback score with respect to the user's response to the particular challenge, wherein the score incorporates accuracy of response, speed of initiating the response (if scored), and/or confidence of response (if scored). The score can be displayed on the screen via which the score was entered or on a separate screen. To provide context to the score, the interface upon which the score is presented includes a written recitation of the challenge, optionally positioned with the score. The score may include a cumulative score for the three scoring categories and/or the score for each scoring category separately presented with a label identifying the scoring category (e.g., accuracy of response, timing of response and confidence of response). The score may be displayed in terms of points and/or in terms of descriptive text (e.g., "1 point—somewhat confident"). The scores may optionally be stored in memory in response to a user/scorer instruction, or optionally the scores are not retained in memory once the user logs out. Optionally, a print control is provided via which the user/scorer can instruct the system to print out the scores. Optionally, an output module exports or otherwise packages the scores, such as by delivery via e-mail, data file, or otherwise The scoring user interface includes a control via which the user/scorer can instruct the system to play the character-based audio/visual role model of the correct response (e.g., previously presented via the study section watching user interface). This may be the same video as presented via the watching user interface or it may be a different video with different characters or the same characters. Optionally, closed captioning is presented providing a text of the audio. Optionally, the user interface may include controls for pausing, fast forwarding, rewinding, as well as replaying the audio/video of the role model response.

Optionally, each individual challenge is provided with a corresponding score or set of scores substantially immediately after the user has completed the scored challenge section.

When the user has completed all scored challenges for a given module, the system consolidates the scores and optionally substantially immediately provides for display an optional overall scoring summary interface which consolidates the formal, recorded scores from the three categories of accuracy of responses, timing of responses (if scored) and/or confidence of responses (if scored). Within each of the three scoring categories each challenge is listed along with the corresponding user score. Optionally, timing information is provided as well via the scoring user interface. For example, the individual time and/or total times spent by a user on the scored challenge user interfaces may tracked and reported Optionally, the timing information is the summation of the scored challenge timer values for the module.

Optionally, users are encouraged (e.g., via instructions provided by the system for display) to participate in scored challenges by themselves before performing them with another person (e.g., a peer or manager scorer) to thereby lower the user's performance anxiety and raise the user's engagement in the training process. Further, by performing the scored challenges alone, the user's distaste and/or fear of role playing/verbal practice is reduced or eliminated.

As similarly discussed above, the scored challenge section utilizes "real-world" verbal answers rather than just multiple-choice or true/false responses, and thus teaches and tests for true, embedded knowledge and skills, rather than simply "prompted knowledge," as is the case with systems that rely on multiple-choice or true/false questions and responses. Further, by verbally responding to the challenged posed by the characters, the user is better able to transfer the learned skills to the real world. Still further, verbalization ensures that the user/learner will be able to deliver a performance as required in the real world. For example, if a customer asks a question, the performance of actively verbalizing the answer is what is relevant to the customer; if the sales representative only knows the answer but is not able to adequately verbalize the answer to the customer then there is littlie or no value in that knowledge in and of itself. Therefore, the verbalization is not only a test of knowledge of the correct response (as a multiple-choice or true false test would reveal) but also serves as a test of the learner's ability to actually deliver that response in a simulated real-world situation. Not only does the "knowledge" aspect transfer to the real world, the "ability to deliver the correct answer" also transfers to the real world—where simple knowledge alone is usually not enough.

Optionally, the system is configured so that self-scoring is prevented from being reported to others. Further, the system optionally deletes any such self-scoring scores from memory when the user logs out so that others cannot access the scores. This approach to maintaining the privacy of self scoring provides a safe environment for verbal practice, where the user does not have to worry about others seeing their low initial scores or number of repeated attempts to achieve a successful score.

However, the system is optionally configured so that "scoring that counts" (e.g., scoring performed by a manager for reporting purposes) can be transferred via a learning management system or other scoring capturing mechanism.

With respect to scored challenges, there are optionally different available modalities, including a baseline scored challenges and non-baseline scored challenges. With respect to baseline scored challenges, a user is supposed to know the subject matter contained within particular modules, and be able to respond to the challenges therein, prior to viewing the study section. Therefore, the user participates in scored challenges optionally without first participating in the study section.

By obtaining a baseline scored challenges score, two optional goals are achieved. First, the user and/or the user's organization can accurately assess what the user already knows (e.g., from work experience or other types of training) and the user's ability to perform as compared with what people (e.g., managers) "report" and/or think the user's capability levels are. Thus, functionally, this system can validate or invalidate the views of others regarding the user. Using the baseline modality, the user is able to assess their progress, which is usually quite rapid. For example, research by the inventors has demonstrated that average baseline scores of 0% to 30% rise to 70% to 100% after approximately 30 minutes of training regarding a module subject. Second, the baseline scores motivate the user to improve on their baseline score, especially if the user's thinks the he/she already knows what he/she needs to know.

In the non-baseline scored challenges mode, the user participates in the study first. This modality may typically be employed where the user has not been previously trained and/or is not knowledgeable about what the module or challenge subject matter, although it can be used whenever desired.

With respect to implementing scored challenges, the following optional routine has been demonstrably effective. The user participates in the study on his or her own and participates in scored challenges on his or her own. Research has shown that two to three randomized scored challenge runthroughs are typically needed by many trainees regarding a subject before scores approach or reach a threshold of 70% to 100%. Once this scoring threshold is achieved, the user is to be scored by others. For example, the scoring can be performed by peers and/or "management". When scored by others, preferably and optionally, the user will respond to the actual person performing the scoring rather than to the characters presented on the training terminal display. This approach further creates a rapid "learning transfer" of knowledge gained via the training system to the real world with high levels of comfort. Optionally, the system automatically detects when the user has reached a satisfactory threshold during self-training, and transmits a notification (e.g., via email or other communication) to a specified entity indicating that the user is ready for a scored challenge session with a human scorer.

Further, as modules and challenges are configured to address real-world relevancy, optionally users are encouraged and expected to utilize what they have learned and mastered in the real world substantially immediately (e.g., within the same day or shortly thereafter) after they have completed their scored challenges at the 70 to 100% success level.

The training process for a given subject can be monitored and quickly adapted/modified based on feedback from users. For example, the user feedback can be from users regarding how often have they tried to implement the trained skills in the real world, the results of such implementation, and what were the resistances and objections that they experienced that they had difficulty responding to and/or were heretofore not programmed into the training process. Based upon the responses, the modules/challenges are modified and/or new ones are built as desired or as necessary.

In an example embodiment, the time cost for scoring a module with approximately five challenges is typically between 3 and 5 minutes per person (although it may take less or more time).

Advantageously, the process is configured to inhibit or reduce inaccurate reporting with respect to self-scoring by optionally having a responsible person associated with the user (e.g., a manager) ask, or administrator the scored challenge sessions. In particular, users who have received high self-scores, but are not performing in the marketplace, may be selected to be tested via such a responsible person. Experience has demonstrated that when this approach is used with a trainee that is not performing in the real-world, inaccurate reporting is generally not repeated by most trainees.

Optionally, the system is configured so that organizations, groups of users, and/or individual users can rapidly create their own modules, challenges, and scored challenges section, such as by assembling their own custom modules from pre-existing individual learning objects stored in a challenge repository. By way of example, this enables school systems, schools, teachers and/or students to build their own customized study modules and challenges for their own purposes. This includes, by way of example, studying for vocabulary, spelling, math, etc.

Optionally, the system includes usage tracking and reporting capabilities. For example, certain embodiments are configured to track and report to users and/or "managers" the length of time that users spend within the different interfaces and modules. This enables users and/or managers to learn the best ways to use the training system and process, and also the best ways to study based upon their own learning styles.

Example training applications and uses for embodiments include but are not limited to the following examples.

Sales

The systems and training processes described herein can be generally configured for and applied to selling, influencing, and/or motivating others to change their behaviors, attitudes, and/or to changing cultures. Thus, the training systems and processes can be effective in a variety of work and non-work environments, such as with respect to business, non-profit, charitable, educational, government, military, religious, and other organizations. Additionally, when so configured, use of the training systems and processes can positively impact any social interaction, including parent-child, teacher-student, etc.

With respect to sales, an example of embodiment of the training system is optionally configured to include modules and challenges directed to some or all of the following (and in particular, where speed to market is a significant issue): specific product/service/concept selling (e.g., creating an interest, answering questions, overcoming objections, and closing), campaign-based product/service/concept selling (e.g., leveraging marketing campaigns; mastery of verbal interactions for the campaign, whether they be proactively initiated or reactive to queries), window of opportunity-based product/service/concept selling, window of opportunity-based communication regarding details (rates, feature changes, etc.) of a given product/service/concept, capitalizing on competitive intelligence windows of opportunity regarding products/services/concepts, as well as on other opportunities, cross-selling/cross-referring (e.g., based upon needs-analysis process outcomes, logically related products/services/concepts, cluebased cross-selling, specific life event management-based cross-selling, cross-departmental/cross-divisional selling, pre-positioning transfers and/or calls from others within an organization, "warm handovers"), capitalizing on a needs-analysis process (e.g., if/then scenarios that link "symptoms" discovered during the process to the proper diagnoses and treatment recommendations, increased granularity of needs-analysis process, etc.), and/or other processes that relate to sales, in addition to client/employee/member/etc. on-boarding (or other variants) initially and thereafter, positively differentiating the trainee and/or the trainee's organization, appropriate up-selling, explaining and "selling" segmentation/re-segmentation, down-selling where appropriate, allocating assets, mastering generic objections, mastering generic closing, mastering inbound and/or outbound telephone skills, prospecting (lead follow-up, referral-based prospecting; includes the ability to effectively contact referrals, data mining-based prospecting, social prospecting, telephone and/or in-person cold calling), sophisticated selling techniques, converting service-related calls, including complaints, into sales opportunities/sales, mastering sales follow-up and follow-through, regardless of the information to be communicated, and/or addressing a need for rapid deployment of sales information. "Selling" also means influencing students, organizations, groups of people, nations, etc.

Retentions:

The training systems and processes can be adapted to training users with respect to retaining desirable clients, employees, members, etc., including retaining individuals who are leaving, data mining-based propensity modeling retentions, analyzing reasons for attrition and responding appropriately, reducing the odds of full or partial attrition by selling appropriate, "sticky" products/services/concepts.

Service

The training systems and processes can be adapted to training service personnel with respect to performing servicing before or after a sale with respect to external clients and/or internal clients (employees), members, etc. For example, with respect to providing service, users can be trained to articulate key service protocols, "behavioralize" and implement service protocols (including, but not limited to, by way of example, some or all of the following: greetings, taking ownership, teamwork, and ending conversations), institutionalize "magic moments", institutionalize "delighting the individual/group", institutionalize the overall individual and/or group experience and their likelihood to refer to others, deal with busy periods, including "floor management", deal with other circumstances so as to enhance or maximize perception of service excellence even during challenging situations, master follow-up and follow-through, regardless of the information to be communicated, address any needs for rapid information deployment, etc.

Service-Problem Resolution

The training systems and processes can be adapted to train users with respect to positive/best-case resolution of service problems or challenges, appropriately responding to service problems, dealing with hostile individuals/groups, dealing with individuals/groups who threaten, converting service problems into sales opportunities/sales once a satisfactory resolution has been achieved (e.g., providing solutions via products/services/concepts to prevent/minimize service problems in the first place), etc.

Leadership Management, and Coaching

The training systems and processes can be adapted to train users with respect to leading, managing, and coaching in any given setting, including mastery of leadership, management, and/or coaching communications (e.g., including the ability to appropriately influence downstream organizations, includes situation specific challenges and opportunities), mastery of protocols and implementation of leadership, management, and/or coaching models (e.g., motivating, goal-setting, creating appropriate expectations, planning, following up and following through, positive reinforcement, creating accountability and holding people accountable, and implementing consequences as necessary), mastery of advanced leadership, management, and/or coaching skills, conflict management, and influence management. Further, many of the concepts discussed above with respect to sales, retentions, service, and service-problem resolutions are also applied to leadership, managing and coaching.

Assessment and Certification

The training systems and processes can be adapted to train users with respect to analyzing skills competencies initially and continually, certifying to expected standards, general and targeted reassessments/recertification, diagnostics on levels of embedding and performance gaps that need focus, etc.

Recruiting

The training systems and processes can be adapted to train users with respect to recruiting, such as individual and/or organizational recruiting (e.g., where an assessment of existing knowledge and/or the capacity to rapidly learn and verbalize that knowledge is necessary), to assess, in person and/or remotely, a recruit's capacities, etc.

Technology Systems/CRM Utilization

The training systems and processes can be adapted to train users with respect to solving the problem of underutilization of existing technology systems (e.g., customer relationship management (CRM) systems), as well as to initial new deployments, upgrades, increasing utilization of technology systems/CRM, increasing data-based clue identification through technology systems/CRM and capitalizing on these data-based clues, etc. The training systems and processes can be used to motivate the use and/or relaunch the use of such technology systems.

Compliance

The training systems and processes can be adapted to train users with respect to regulations, protocols, and behaviors, whether they be business-related or ethics-related, mastering certification behaviors (rather than merely testing to satisfy regulations, verbalizing), responding to questions, overcoming objections, and closing with respect to compliance-related situations, etc.

Safety

The training systems and processes can be adapted to train users with respect to safety-related compliance, mastering protocols for safety-related situations, verbalizing, responding to questions, overcoming objections, closing safety-related situations, etc.

Administration

The training systems and processes can be adapted to train users with respect to mastering and implementing administrative protocols.

Communications that Require Behavioral Outcomes

The training systems and processes can be adapted to train users with respect to extremely rapid speed to market of communications, with a built-in assurance that required behavioral outcomes are mastered vs. merely communicated.

Best Practices Implementation

The training systems and processes can be adapted to train users with respect to communicating best practices that have not been implemented and to converting codified best practices into actionable and utilized best practices.

Time Management

The training systems and processes can be adapted to train users with respect to avoiding time-management deficits, mastering time-management protocols and the embedding of those protocols.

Specific and General Education

The training systems and processes can be adapted to train users with respect to education, such as with respect to academic subjects (e.g., vocabulary, math, science, reading, spelling, history, etc.), while optionally reducing training costs.

Furthermore, the training system can be utilized for simple to complex scenarios and/or protocols that may involve one or more characters simulating situations where the user would be engaging with one or more individuals in the real world. Additionally, the training system can be utilized to train users with respect to performing financial analyses and other analyses, locating errors of co-mission and errors of omission, knowing how to behaviorally capitalize on opportunities, learning how to listen and interpret what has been stated by others, among many other uses.

Example embodiments will now be described with respect to the figures.

Certain embodiments provide highly automated training, optionally without the participation of a human trainer during substantial portions, or optionally any portion of a training and/or test process. The following processes can optionally be executed via system components (e.g., a server and terminal(s), or a stand alone terminal hosting the training system software) illustrated in FIG. 1.

As similarly described above, optionally, upon accessing a training module and prior to beginning the training within a challenge, the system presents a module table of contents. The example table of contents contains a text display of the challenges contained within the module. Optionally, the table of contents also contains character(s) that provide audio/visual challenges that are identical to (or similar to) those provided via the performing interfaces and within the scored challenges.

As similarly discussed above, a study session can include an audible verbalization of the text (e.g., a script), and/or a video or animated figure wholly or partially synchronized with the verbalization. The study session is interactive (although optionally it may have less or no interactivity) and is used to enhance the user's ability to learn concepts and information, and to acquire skills. Optionally, the user can repeat all or portions of the study session one or more time to better ensure that the skills and/or information have been learned.

An example embodiment of a study session includes the following components (although fewer, additional, and/or different components can be used, and optionally the components can be utilized in a different order):

1) Reading
2) Watching
3) Performing
4) Reviewing

Optionally, each component is associated with its own user interface(s) which differ from the user interfaces of the other components.

Example embodiments of the components will now be described.

Reading Component

Optionally, the Reading component displays the complete text/script (or instead, a selected portion thereof) corresponding to a model answer (e.g., that includes some or all of the key elements that are to be taught/trained). Thus, the displayed text optionally corresponds exactly with the audio portion of a model answer that will be presented to the user (e.g., during the Watching component).

Optionally, even when all or substantially all of the model answer text is presented, certain portions of the text, such as some or all of the key elements, are highlighted/emphasized relative to other portions of the text. For example, the highlighting/emphasis can be provided via one or more of the following:

bolding;
displaying each key element (or other information to be highlighted) on its own line(s);
using bullets/numbers in front of key element (e.g., with the key elements or other information to be highlighted) visually segmented from surrounding text)
using a different color than for surrounding text;
using a different font;
using different size characters;
flashing.

Thus, by way of illustration, the displaying of text corresponding to a key element can include the combination of the following emphasis techniques: bolding; bullets; font; size, color, and displaying a key element on its own line(s).

By displaying the key elements with the surrounding text, the key elements are placed in context, facilitating the user's understanding of the key elements and how they fit in context of the more complete role model script. By highlighting the key elements with respect to the surrounding text, the content is more digestible and the user can better focus on the more important content (which the user will be tested on), while still providing alignment with the model answer. This is in contrast to many conventional approaches which display training content via lengthy paragraphs (which many users find overwhelming or off-putting).

Optionally, the same or similar bullet point separations "carry through" the corresponding user interfaces in the other components and optionally to the testing phase.

Watching Component

The watching components displays an audio/video (e.g., of a real person or an animated person/avatar, as similarly described above) providing a role model response. The video includes a visual component and a synchronized audio component (so that the person's lips are synchronized with the speaker's lips). Optionally, the speaker verbalizes the same script/text as that displayed during the Reading component and/or just the key elements.

Optionally, substantially immediately upon the user accessing the Watching user interface, all the key elements for the challenge are presented at the same time. Optionally, instead, while the speaker is verbalizing the text, optionally text corresponding to the verbalization is visually displayed in a synchronized manner (e.g., where the text is displayed as the character articulates the corresponding language). However, optionally, the synchronization is not to match the speaker's lips, but is to correspond with the context of the content of the verbalization. For example, the displayed text is optionally not a word-for-word match with what the speaker is saying.

The text is visually displayed to train the user and to reinforce the information and skills learned during the Reading component, and in particular, the more significant information and skills (e.g., the key elements). Thus, for example, rather than displaying all the text that was displayed during the Reading component, only the key elements (or other selected portions), are displayed. Optionally, the key element text is the same or substantially the same as the key element text displayed during the reading component. Optionally, some or all of the emphasis techniques used in the Reading component are used in the Watching component. For example, a key element can be displayed in bolded, bulletized form, optionally using the same color.

Optionally, the user can mouth or say the role model answer along with the character presented by the audio video presentation.

The foregoing technique of displaying the key elements without the surrounding text enhances the user's ability to focus on the key elements without having to learn in a purely robotic manner. That is, a user does not have to memorize by rote a particular role model answer, but instead learns the key concepts, which they can then express in a manner more natural and comfortable to the user. In addition, the user is not distracted by attempting to memorize the surrounding text, which could be lengthy and involved. Further, the complete text is not displayed to reduce "screen clutter" which would otherwise make the screen hard to read and/or reduce learning.

In particular, rather than utilizing rote memory (word-for-word memorization), which is very difficult, also often results in a failure to internalize the concepts/skills be trained, and makes users less motivated to learn, continue learning, and apply what they have learned (because people tend to want to be themselves and not ape the words of another), using training techniques described herein the user utilizes context memory. Context memory involves memorizing/learning the key elements, but enables the user to verbalize the key elements into sentences/paragraphs using the user's "own words", style and personality in a form that is appropriate to any real world interaction that may arise. Thus, users can flexibly articulate and apply what they have learned.

Optionally, a challenge may be purposely limited in scope. For example, a given challenge may be limited to seven bullet points of information (although fewer or additional items of information can be used, such as 3, 4, 5, 6, 8, 9, or 10 items). Neuroscience has demonstrated that such chunking is advantageous, and in particular that chunks should preferably be limited to no more than about 5 to 9 "lines of data" to better facilitate learning, based upon the neuroscience principle of "chunking". Of course, in certain instances, certain challenge responses may include less than 5 to 7 lines, and indeed, some may include only one line of data.

Optionally, the chunk of bullet points (e.g., nine or less) are sized and formatted so that all the bullet points can be displayed on the user terminal display at the same time, and while the video is playing with a character role modeling the corresponding answers. Thus, the user can focus on the key elements, although the character in the audio video presentation is speaking in complete sentences and/or optionally where the character in the audio video presentation is only articulating the key elements.

Once the user has watched the audio video presentation, the user is instructed to activate a "next" control/or equivalent to proceed to the Performing Component, wherein the user will be instructed to verbally respond in the first person to challenges (e.g., presented via a video (real or animated)).

Performing Component

The performing component optionally includes an audio/visual presentation as well. However, the speaker (whether real or an animation) is optionally different than the speaker in the Watching component. This is to emulate as in the real world, where a different person (e.g., a customer) will provide the challenge than the person answering the challenge (e.g., the customer service person).

The user is to respond verbally as if they are responding to a live person.

That is, the user is to directly respond to the character(s) as if they are responding to whom the character represents in the real world.

The user is to respond substantially immediately upon hearing the verbal challenge from the character. In this regard, research has demonstrated that users will consistently respond to the characters when employed as described herein.

Optionally, as similarly discussed above, the system does not perform trainee voice recording and/or voice recognition, as research has indicated they are cumbersome, and added little of value, although optionally, the system does provide voice recording and/or voice recognition.

For example, with respect to voice recording, optionally, a user's verbalized responses are recorded in audio only or audio/video format by hitting a "record" button. These recorded responses are immediately (or in a delayed fashion) played back via a playback button. The objective in this example embodiment is to provide the user with substantially instant feedback about how the user sounds from a style and/or attitude perspective. Optionally, substantially immediately after the playback, the facilitator/trainer asks questions of the user regarding the user's perception of the user's style and/or attitude. As discussed above, examples of these questions are:

How do you think you sounded?;
Do you think you can across as confident and knowledgeable?
Would you have been convinced by your response as a customer or prospect?;
How could you have improved?, etc.

Optionally, once the playback of the user's recorded segment is complete, there can be an automatic default to the questions which are "asked" by the training system. That is, the questions are verbalized by a pre-recorded or synthesized voice at substantially the same time as text is displayed. Optionally, each question is "asked" separately. Optionally, two or more questions are asked together. After the response and/or discussion between the user and facilitator, the user/facilitator presses a "proceed" button (or other corresponding control) and the next question is asked, and so on.

Optionally, there is an option for re-recording a user response without saving the initial recorded segment via a control on the trainee and/or facilitator user interface.

Optionally, via a control on the trainee and/or facilitator user interface (e.g., a save recording icon that can be activated by the trainee and/or facilitator), there is an option for saving the recording as a "self-referenced role model" which the user and/or facilitator can later access as an example of a good response.

Optionally, there can be standard questions (e.g., 1, 2, 3, 4, 5, or more questions) with respect to the self-recording option, or these questions can be customized. For example, in order to remove the burden from the facilitator/trainer, once the user hears herself, and the system queries the user regarding the user's performance, the same questions can be asked each time (e.g., "How do you think you sounded?", "How could you improve your response?", etc.) or the system instead can ask different questions for different types of challenges. (e.g., for an objection, the system could ask "Do you feel you have overcome the customer's objections?").

Optionally, a trainer/facilitator is online and/or present when the user/trainee is undergoing all or portions (e.g., study and/or scored challenges sections) of the training via the system. For example, the trainer may be sitting alongside the trainee, looking at the same terminal screen and/or the trainer may be viewing the screen of a separate trainer terminal which presents similar or the same user interfaces as viewed by the trainee, optionally with additional trainer information (e.g., training answers). Optionally, the trainer provides the trainee with instructions on how to utilize the training system and/or provides real time or delayed scoring of the trainee's training session, as described in greater detail below.

Challenges and the interfaces within challenges are selected (e.g., by the user) in a non-randomized fashion, so that the challenges reflect what the user's organization wants the user to master (improve their performance on) and/or what the user wants to master (although optionally the challenges are randomized). As similarly discussed above, optionally challenges can be repeated, wherein different challenges are repeated different numbers of times. Optionally, the selection of the challenges to be repeated and/or the repeat rate are purposely random or pseudo random to mimic the real world experience and to prevent rote memorization.

The user is instructed to substantially immediately respond to the challenge, verbally in the first person (e.g., using the key elements).

Reviewing Component

Optionally, no scoring is performed during the reviewing component. This creates a "safe environment" where the user can freely practice without worrying about formal scoring that will be used by a manager to evaluate the user's performance. Further, by eliminating scoring, the delay associated with scoring related tasks (e.g., moving the cursor and clicking on various scores (accuracy of Key Elements, speed of response, confidence levels) can likewise be eliminated or reduced. Such delays can be off putting and problematic with respect to learning and practice. Optionally, even without scoring and as similarly described below, substantially immediate feedback is provided to the user and the user can be scored during a later testing portion. Optionally, there is scoring, such as automated/verbal recognition scoring and/or optionally "verbal scoring" from a peer/others and/or recorded scoring from a peer/others.

In the Reviewing component, a review user interface is displayed which contains the same text that appeared on the corresponding Watch component role model screen (e.g., the key elements, optionally emphasized using the emphasis utilized in the Reading and Watch component). Optionally, the Reviewing component user interface includes self assessment fields which enable a user to self-assess their performance on their challenge responses (or enable another designated person to perform the assessment). Rather than providing scoring, an example embodiment presents the correct answer. This enables a user to know substantially immediately how the user performed. Optionally, scoring controls are provided (as similarly described elsewhere herein), but the scores are not considered formal scores (e.g., a score reviewed by another to determine if the user has successfully learned the training information/skills and mastered the ability to verbally articulate and utilize the information and skills).

Thus, the Reading component provides the key elements as well as the relevant context. The Watching component role models the skills and information being taught in conjunction with text corresponding to the key elements. The user then practices the taught skills during the Performing component. The user can then assess her/his own performance without being formally scored via a user interface that presents the challenge answer (e.g., the key points). Optionally, another user (e.g., a trainer or other person listening to the user) can assess the user's performance. The user can read aloud the challenge answers to further ingrain the information/skills by verbalizing the key elements with the contextual language or without the contextual language. Optionally, to further embed the information/skills being taught, the user can also handwrite (e.g., on paper or a pen computer) or type (e.g., using a computer or typewriter) the key elements as they are presented and/or other text or verbal communication (e.g., a word for word copy of the key elements or other communications, or a paraphrase of the same).

The user can repeat one or more of the components as desired (e.g., until the user is satisfied, via the self assessment or otherwise, that they have mastered the skills and information being taught), before proceeding to the testing portion (e.g., where formal scoring takes place).

Optionally, each challenge is associated with its own study session (e.g., including the foregoing four components). This enables a user to train and practice as desired (e.g., by repeating one or more of the components for that particular challenge, and spending a desired amount of time on a given component until the user is satisfied, via the self assessment or otherwise, that they have mastered the skills and information being taught) on a given challenge, before proceeding to another challenge, and prior to proceeding to a test session regarding the challenges (e.g., a scoring portion including randomized challenges as similarly discussed elsewhere herein), where the user will be formally scored.

The foregoing training components can optionally be utilized by a trainee without a trainer, thereby saving the time and/or expense associated with a trainer. Further, the computer-based automated training system will not grow impatient or behave inconsistently. Further, it provides a less tense environment for the trainee (because another person is not present that is sitting in judgment with respect to the trainee) and because the trainee can repeat portions of the training components as desired.

With respect to the above components, they can be conceptually characterized as Learning sections and Practice sections. For example, the Reading and Watching components can be considered a Learning section, and the Performing and Reviewing components can be considered a practice section.

Example, optional training navigation will now be described. Certain component user interfaces include a replay control (e.g., a button), that when activated causes training media, such as audio and/or video, to be replayed (along with synchronized text, where applicable). A "back" control (sometime referred to as a "previous" control) enables the user to navigate to a previously presented user interface (e.g., the immediately proceeding user interface). A "next" control enables the user to navigate forward to the user interface (e.g., the next user interface). A print control is also optionally provided.

Examples of user navigation will now be described to further illustrate an example embodiment. While reference may be made to using a "next" or "back" control, in addition or instead, a menu may be provided (e.g., listing the training components) which the user can use to navigate. Other navigation techniques may be used as well (e.g., via reading, watching, performing, reviewing icons for direct access to those user interfaces).

The reference to "next" and "back" controls are representative of how the system conceptually operates, but do not necessarily reflect "next" or "back" buttons as other control mechanisms may be utilized.

In this example, a trainee is initially studying a Reading component user interface (including key element text and context text). The trainee then clicks on a "next" control, and the training system presents a Watching component user interface (presenting a video of a presenter role modeling, optionally using the same language as textually presenting via the Reading user interface, with the key elements presented textually as well). In this example, the trainee then wants to read the complete sentence structure that the role model speaks, and so activates the "back" control. The system then displays the prior Reading user interface.

In this example, rather than repeating the Watching component, the trainee feels ready for the challenges, and so wants to proceed to the Performing component. Therefore, the trainee clicks twice on the "next" control (or selects the Performing component from a menu and/or icon selection) to skip the Watching component and proceeds to the Performing component. The trainee is presented with the challenges.

The trainee then activates the "next" control, and a Reviewing component user interface is provided by the system. The Reviewing user interface presents the challenge answers via which the trainee can assess her/his performance and/or to review the information/skills being trained. Optionally, in addition or instead, others can assess the user's performance. Optionally the user interface includes scoring controls/fields via which the trainee can score herself, and the system will calculate the score if there is a score to be calculated (e.g., by adding the number of correct answers and optionally calculating the percentage of correct responses), and display the score to the trainee.

In this example, the trainee was not satisfied with the results of the self assessment, and so activates the "back" control, and the Performing component user interface again presents a challenge (e.g., the same challenge as previously presented or a selected challenge applicable to the information/skills being taught).

The trainee can go back and forth to the various components as desired. Further, optionally a menu (listing the user interfaces), tabs (wherein there is a tab for a corresponding user interface), link, and/or other controls are provided via which the user can navigate directly to any module user interface, without have to pass through an intervening user interface.

In another illustrative example, if the trainee knows that the trainee performed poorly with respect to the challenges, rather than proceeding to the Reviewing component, the trainee can click the replay control to repeat the challenge.

The trainee can also return to the Reading, Watching, or Reviewing user interfaces to review the information/skills being taught. For example, the trainee can read aloud (or silently) the information presented on the Review user interface or on the Reading user interface, and read aloud (or silently) the elements presented on the Watching user interface (or say the role model answer along with the speaker in the Watching video).

By way of further example, if the trainee wants to hear a complete role play (e.g., a verbalized challenge, followed by a verbalized correct answer) the trainee can go back and forth between the Performing component user interface and the Watching component user interface.

Optionally, a navigational control bar is provided. For example, the control bar can be a horizontal bar at or towards the bottom of the initial user interface (or at the top of the user interface, or vertical navigation bar at left or right side of the user interface).

The control bar can include a plurality of "dashes" or sub-bars. A given "dash" can correspond to the study or the practice sections for a particular Challenge.

Once a user is "within" a "dash" (e.g., corresponding to a study of practice section), the user can utilize the "back" or "next" controls to navigate within a challenge or go forwards or backwards to other challenges. Optionally, the navigation controls can be provided on each user interface so that the user can navigate directly from one user interface to another interface (e.g., directly to the reading, watching, performing, or reviewing user interfaces), without having to navigate "through" intervening user interface.

As previously discussed, a navigation menu is optionally provided. For example, the menu can be provided on left, right, top, bottom portion of a user interface, via a drop down/up menu, or otherwise. The menu can list the available challenges and/or the associated challenge sections (e.g., study, practice) and components (e.g., Reading, Watching, Performing, Reviewing, scored testing), a "home" selection (e.g., to jump to the opening user interface), and an "exit" selection. The user can select which challenge the user wants to begin with and/or go to, which section, and/or which component. In addition, the user can select the "home" item to proceed to the opening user interface, or the "exit" item to exit the training module (e.g., when the user has completed the module or otherwise).

The foregoing navigational flexibility provides the trainee with much more freedom to adapt the training in a manner most or more suitable to the trainee as compared with a human trainer or coach who may not have the time or tolerance to do all of the foregoing as needed by the student. Further, unlike many a human trainer, the training system will not forget the answers, get tired, frustrated, convey an "attitude," look at a watch, get bored, or provide a different role modeled answer when the trainee asks. Thus, the training system can be flexibly used to address each individual's unique learning style.

As previously discussed, in order to further enhance neuro-embedding of the training, optionally, a "notes" field is presented on the trainee terminal in association with each or some of the user interfaces, wherein the trainee can enter notes, which will then be saved in computer memory. The notes can optionally be printed and/or later accessed by the trainee. Optionally, users may elect or be encouraged to take notes if taking notes fits their learning style. These notes are optionally not to be accessed when utilizing the performing interface or the scored challenge interface (e.g., the system locks out and prevents access to stored notes while these interfaces are presented, and/or the user is instructed not to refer to the notes, whether electronic or handwritten).

Optionally, time testing can be employed. For example, the time to complete any of the above components can be timed. Users can time (e.g., via a system timer displayed to the user) how long it takes them to initially master each challenge, all of the challenges, and getting randomized scored challenges.

Optionally, the same speaker (e.g., a human or an animation) can be used for different challenges (although optionally different speakers can be used for different challenges). One reason to use the same speaker for different challenges, is that if a different speaker were used for each challenge, then trainees might subconsciously and/or consciously sense what the challenge will be. Whereas, in the real world, the degree of uncertainty as to a customer is going to challenge you with/ask you is very high. Additionally, this teaches the user to carefully listen in general to what is said, rather than assuming they know what other people are going to say.

For example, if there were four challenges—A, B, C, D and two characters, character 1 and character 2, character 1 might enunciate Challenges B and D in the testing portion (e.g., that provides scored randomized challenges) and character 2 might enunciate challenges A and C.

Therefore, the participant would not know and could not anticipate what would be coming out of the speaker's mouth. In the same regard, optionally the same speaker is used for all the challenges.

While the above components, including the randomized scored challenges, can be utilized by a trainee operating solo (e.g., with a facilitator, such as a trainer or other trainee/peer), optionally another user, such as a trainee can participate to provide "dual learning" (e.g., where another user acts as a trainer and learns the subject matter by facilitating the trainee's training session). Optionally, an individual working with the user during training (which can be another trainee/peer, tester, trainer, etc.) can be remotely located from the trainee and interacting with the user via a remote terminal, and the system still provides dual learning. Additionally, the trainee and one or more other terminals are synchronized so that the trainee and the other party or parties (which can be another trainee, tester, trainer, etc.) can view each others' screens (or selected portions thereof) at the same time. Further, terminals at two or more remote locations can be similarly synchronized. Optionally, the screens of the terminals are synchronized, but they do not necessarily provide the same views, or views of each other's screens. For example, the user/learner might have their score displayed in a read-only format so they can see what score is being assigned to them by their partner. Meanwhile, the teacher/mentor has a screen that has full controls allowing the scores to be entered only at that console. Thus, optionally the two screens are synchronized on the same learning content, but the displays are different, and not simply "views of each others' screens."

Another example of screen synchronization will now be described with respect to the actual challenge screen. The user may have the challenge video fill their screen—whereby an avatar appears large and lifelike. Meanwhile, the teacher/mentor could have other displays on their screen, such as past history of the student, current progress charts, other navigational controls—with the video of the avatar is reduced in size relative to the user's display (e.g., where the video is in a window displayed in a corner of the teach/mentor terminal screen), to consume less console screen real estate. Again, both consoles are synchronized in the same lesson, but displaying different views into the same learning session.

For example, as described above, optionally scoring is not performed during the above components, yet trainees are interactively challenged. This enables two participants/trainees to alternate "back and forth" with respect to learning and practicing within a given individual challenge and/or with all challenges.

By way of further example, individuals can "study alone" and directly respond to challenges (e.g., scored and/or unscored challenges) provided by a video character (e.g., by talking to the character as if it was a real person), but thereafter pair up with other participants/facilitators who can sit beside the individual, and the individual can direct the responses to that participant/facilitator.

Example study user interfaces will now be described with reference to the figures. Some or all of the illustrated user interfaces may include a menu item (towards the top of the user interface), which when selected, expands into a drop down menu. An exit control is also optionally provided. Horizontal navigation bars are positioned towards the bottom of the user interface. In addition, an audio on/off control, a replay control, a previous control, and a next control are provided where appropriate (e.g., where an audio or audio visual presentation is provided). In addition, certain user interfaces include some or all of the following controls (e.g., via one or more icons): Minimize window, Maximize window, and Exit program. Optionally, some or all of the illustrated user interfaces include a print control which enables printing of some or all of a given user interface.

Figure 2A:
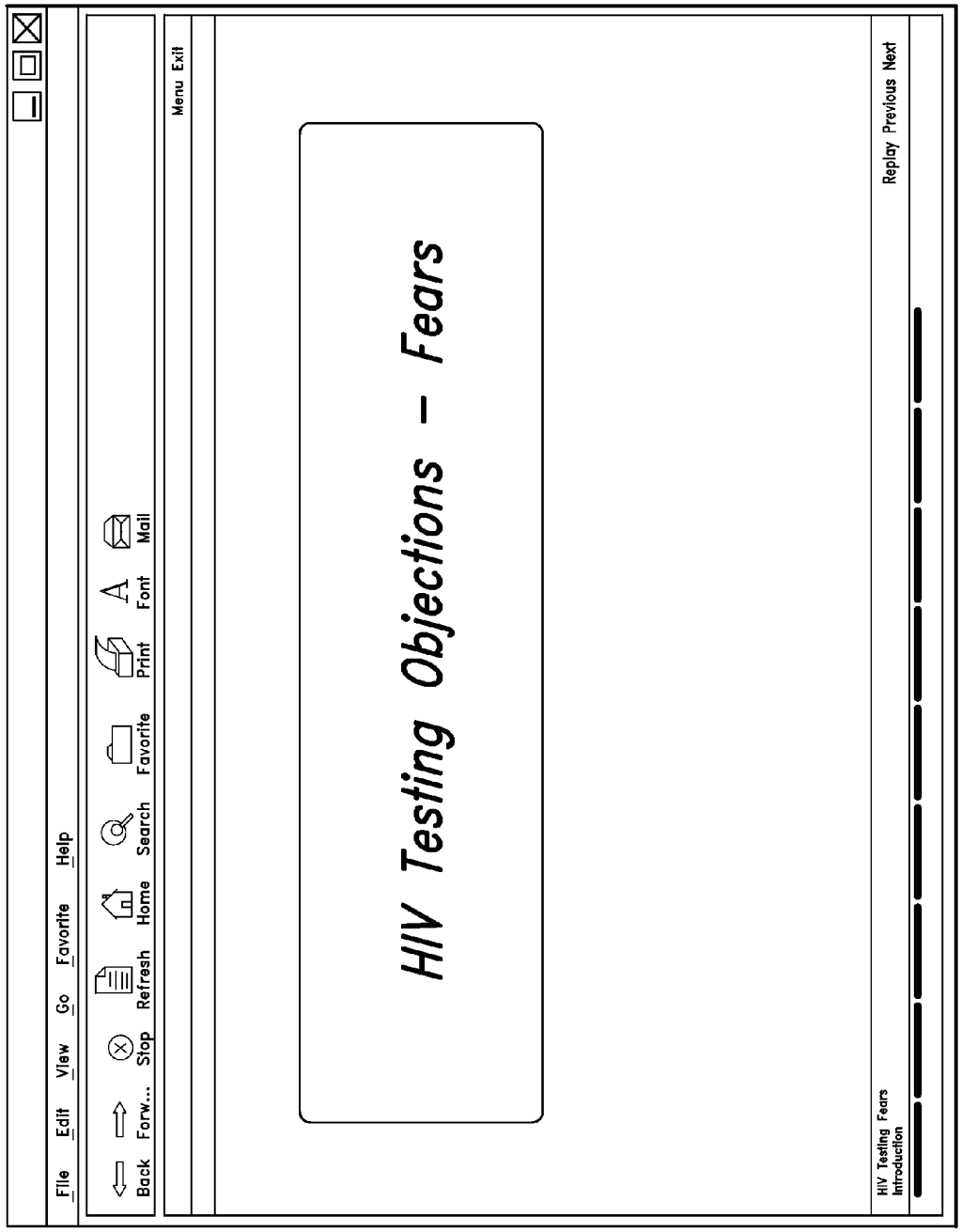
FIGS. 2A-R illustrate example study user interfaces.

Referring to FIG. 2A, a module welcome user interface is presented, providing a title that indicates the general subject matter (e.g., HIV Testing Objections), and the specific types of challenges the user will be trained to respond to (e.g., Fears).

FIG. 2B illustrates an example introduction user interface, describing the purpose of the training with respect to the relevant subject matter, the typical motivation behind real people who provide challenges related to the subject matter, and why the training is beneficial in overcoming the challenges. In addition, the user interface encourages the user to practice until the user feels prepared to answer a challenge (e.g., an objection) in real world situations.

Figure 2C:
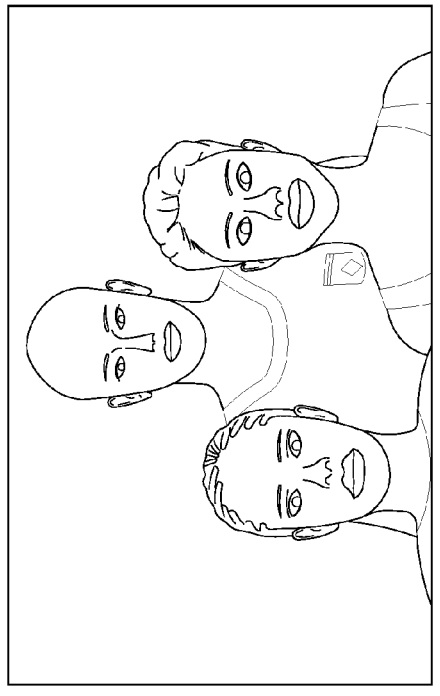

FIG. 2C illustrates an example table of contents, including, as a header, the title from the module welcome user interface. In addition, the module challenges are listed, wherein the user is to be trained with respect to each of the challenges. A tableau of the characters/avatars that will be reciting the challenges is presented. Play, pause, and a mute/volume control is provided.

Figure 2D:
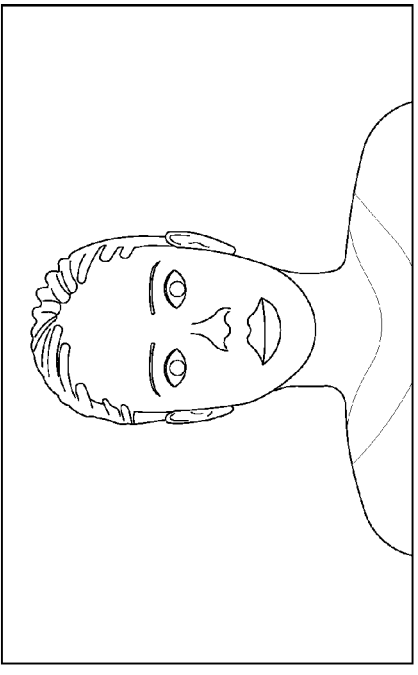

FIG. 2D illustrates the table of contents of FIG. 2C, but with a video of one of the characters articulating a challenge listed in the table of contents. The character is optionally the same character reciting the same challenge as in the performing user interface and/or within the scored challenges section. Optionally each character in the table of contents recites its challenge, optionally in the same order in which the characters and/or challenges will be presented in the module, thereby providing a preview of all the module challenges. By letting the user know ahead of time what the user will be challenged on, positive tension is created.

Referring now to FIG. 2E, an example Reading component user interface is illustrated. In this example, a role model script is textually provided (in this case, a health worker responding to a statement regarding fear of taking an HIV test). Within the script text, the text corresponding to key elements is emphasized via bolding and italics. In this example, each role model language phrase (also sometimes referred to as a construct) is visually separated from the other role model language phrases by being bulletized and positioned on a separate line(s).

Figure 2F:
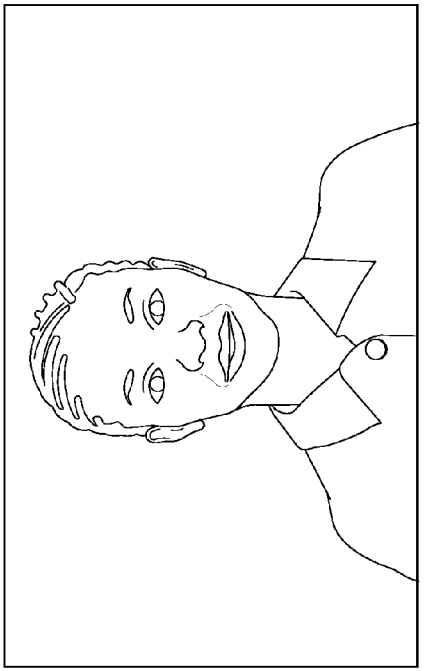

Referring now to FIG. 2F, an example Watching component user interface is illustrated. In this example, an animated character articulates the script provided textually in the Reading component user interface illustrated in FIG. 2E. In addition, a truncated script, including bulletized key elements, is textually provided. Optionally instead, the full script from the Reading component interface is displayed, which provides role model language. In addition, optionally instructions are provided (not shown) regarding what the user will be expected to do with respect to the Performing component, and on how to proceed to the Performing component user interface (e.g., "Now it is time to see if you can answer this question verbally from memory if another person presents you with a challenge. Click Next to practice your answer").

Figure 2G:
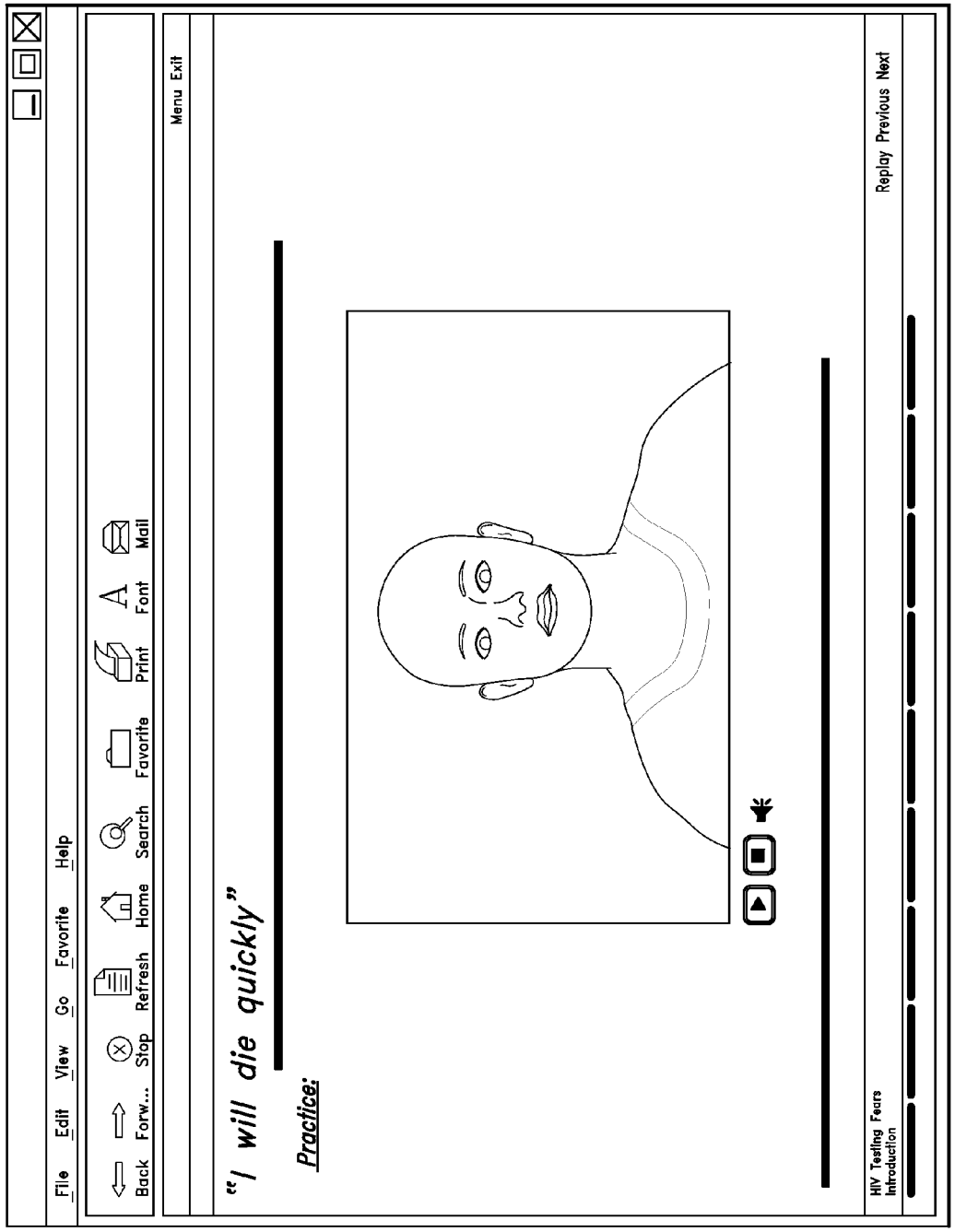

Referring now to FIG. 2G, an example Performing component user interface is illustrated. In this example, an animated character (different than the one utilized in the Watching user interface) acting the part of a real person that enunciates a challenge (e.g., selected by the user). The user is instructed to respond to the challenge in the first person (e.g., using sentences/phrases that include the key elements), although optionally, the user is not required to respond in the first person.

Figure 2H:
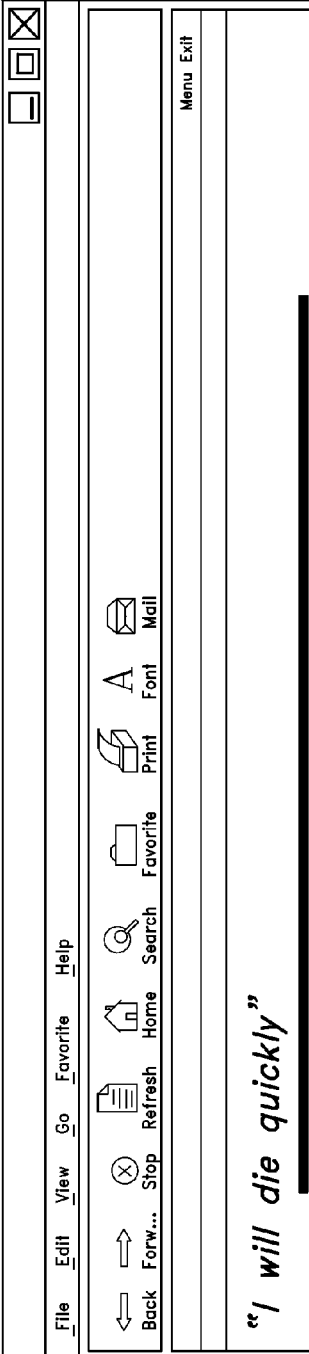

Referring now to FIG. 2H, an example Reviewing component user interface is illustrated. This user interface textually provides (in bullet format) the key elements which the user should have stated in verbally responding to the animated character in the Performing component. The user can perform a self-evaluation of the user's response provided during the Performing component using the displayed key elements.

Referring now to FIG. 2I, an example scored challenges instructions user interface is illustrated. In this example, the user is informed that the user will be presented with a series of opportunities to talk with "people" (e.g., one or more characters), and that user is to respond using the key elements (with associated contextual language). In addition, the user is informed regarding the scoring criteria (e.g., accuracy/completeness of answers, timing to initiate answers, confidence of answers), and that a score will later be presented.

Figure 2J:
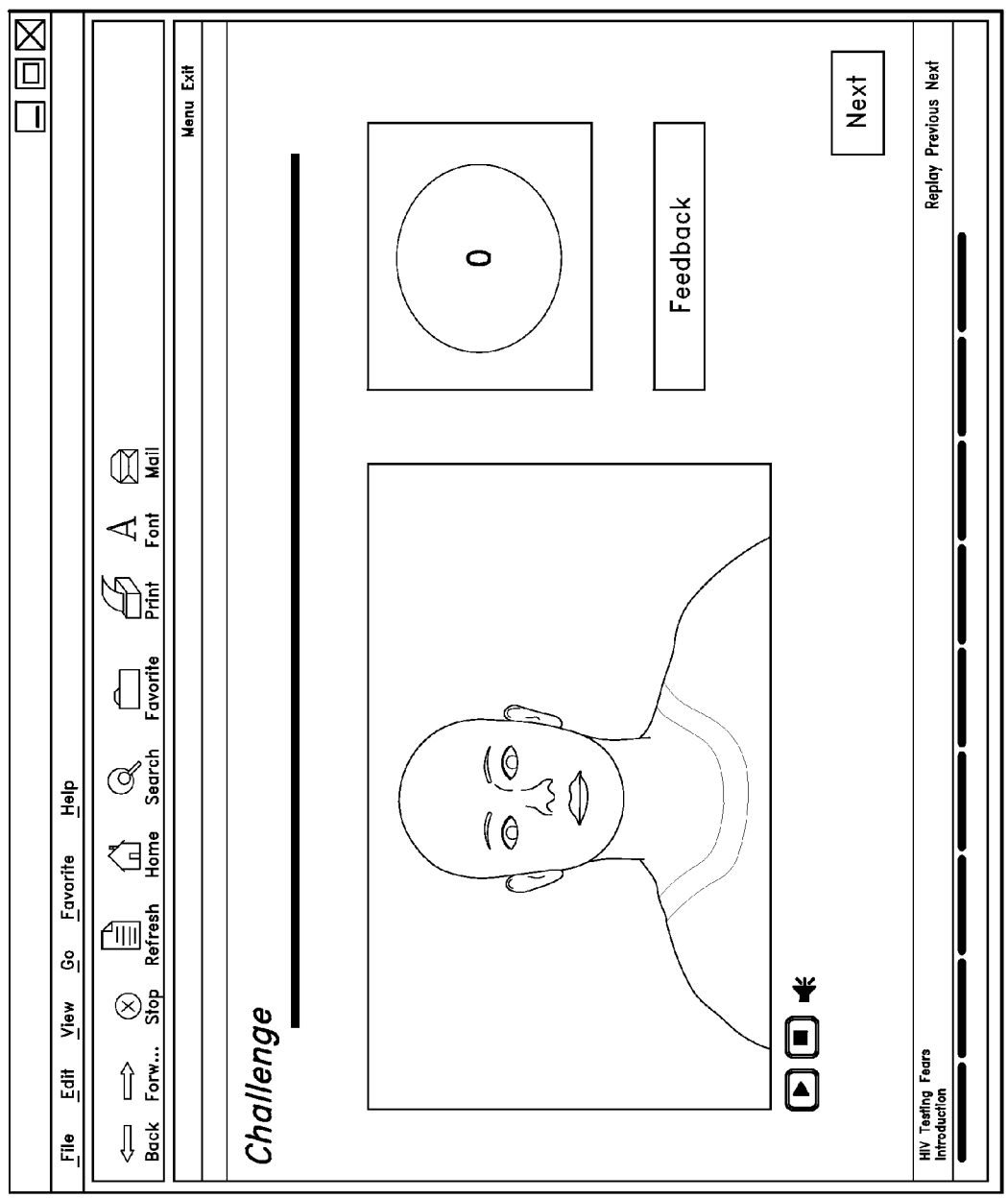

Referring now to FIG. 2J, an example scored challenge user interface is presented. In this example, an animated character (in this example, the same as the one utilized in the Performing user interface and in the same as the illustrated table of contents) enunciates the challenge. The user is instructed to respond to the challenge in the first person, although optionally, the user is not required to respond in the first person. A count up timer displays the number of elapsed seconds from the challenge is presented until the user substantively initially responds. The illustrated timer is also in the form of a color coded ball that is green when it begins counting up, and changes to amber (indicating the answer is somewhat delayed) and then red (indicating the answer is very delayed) as the time reaches certain thresholds (e.g., 3 second and 5 seconds respectively). A scorer (which can be the user, another person, or the system) stops the timer once the user begins to provide a relevant, substantive response to the challenge.

Referring now to FIG. 2K, an example scored challenge user interface is presented for scoring the accuracy and completeness of the user's response to the challenge presented via the interface illustrated in FIG. 2J. A checkbox is displayed along with each of the key elements. The scorer clicks on each scoring icon to indicate whether the user correctly recited the corresponding key element. The system records the indications which are used to calculate a score.

Figure 2L:
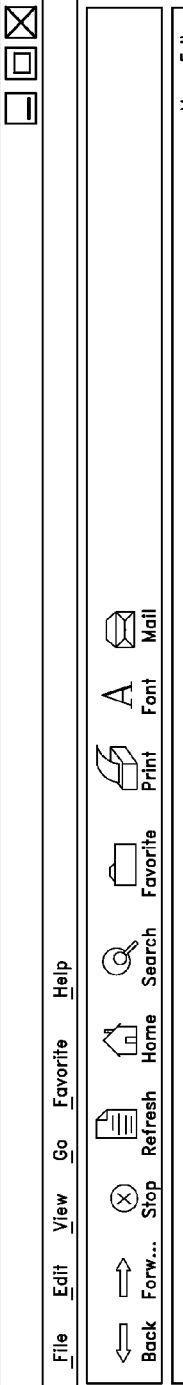
Figure 20:
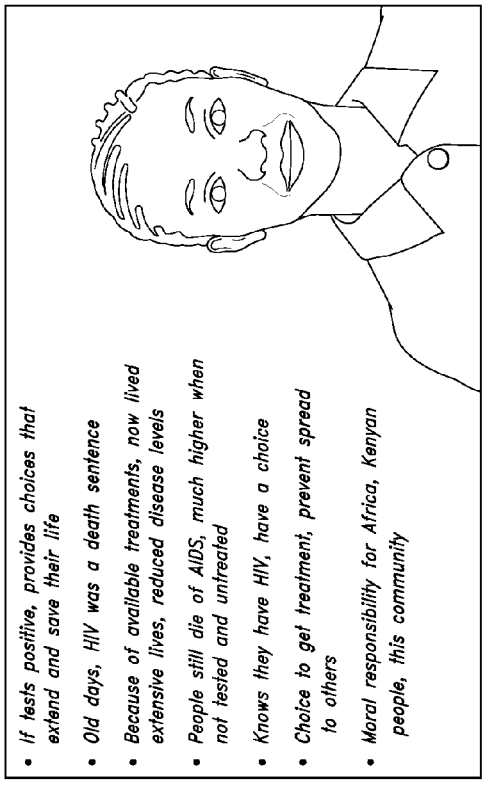

Referring now to FIG. 2L, an example scored challenge user interface is presented for scoring how quickly the user initiated a response to the challenge presented via the interface illustrated in FIG. 2J. Optionally, a timing score is initially automatically populated by the system using the timer value, which in turn reflects how long it took the user to begin responding to the challenge. Optionally, a user/tester can override the populated value.

Referring now to FIG. 2M, an example scored challenge user interface is presented for scoring how confidently the user responded to the challenge presented via the interface illustrated in FIG. 2J. As discussed above, while there may be some subjectivity with respect to scoring the confidence of responses, the subjectivity is greatly reduced or eliminated by limiting the scoring of confidence to very few scoring designations (e.g., no confidence, somewhat confident, and confident), as illustrated.

Referring now to FIG. 2N, an example scored challenge user interface is presented for reporting the user's score with respect to the user's response to the challenge presented via the interface illustrated in FIG. 2J. This user interface presents a scoring summary which consolidates the scores with respect to accuracy of response, time until initiating the response and/or confidence of response. Optionally, timing information is provided as well via the scoring user interface. For example, the time spent by a user on the scored challenge user interface may be tracked and reported. A "play model answer" control is provided, which, when activated will cause a model answer to the challenge to be presented via a video and text. A print control is provided via which the scores can be printed.

Referring now to FIG. 2O, the model answer video play back is illustrated. This may be this same video and text as presented via the watching user interface illustrated in FIG. 2E. In this example, the animated character articulates the script provided textually in the Reading component user interface illustrated in FIG. 2E. In addition, the key elements are textually provided, where the textual version of the key elements is presented in synchronization with the articulated script.

Referring now to FIGS. 2P, 2Q, an example scored challenge summary user interface is presented for reporting the user's score with respect to the user's responses to all the module challenges the user has been tested on. When the user has completed the scored challenges for a given module, the system consolidates the scores and optionally substantially immediately provides for display an optional overall scoring summary interface which consolidates the recorded scores from the three categories of accuracy of responses, timing of initiating relevant, substantive responses (if scored) and/or confidence of responses (if scored). Within each of the three scoring categories each challenge is listed along with the corresponding user score. This enables users and others to identify where strength and weaknesses are in general, and for each challenge specifically. Optionally, timing information is provided as well via the scoring user interface. For example, the individual time and/or total times spent by a user on the scored challenge user interfaces may tracked and reported Optionally, the timing information is the summation of the scored challenge timer values for the module. A print control is provided via which the scores can be printed.

Figure 2R:
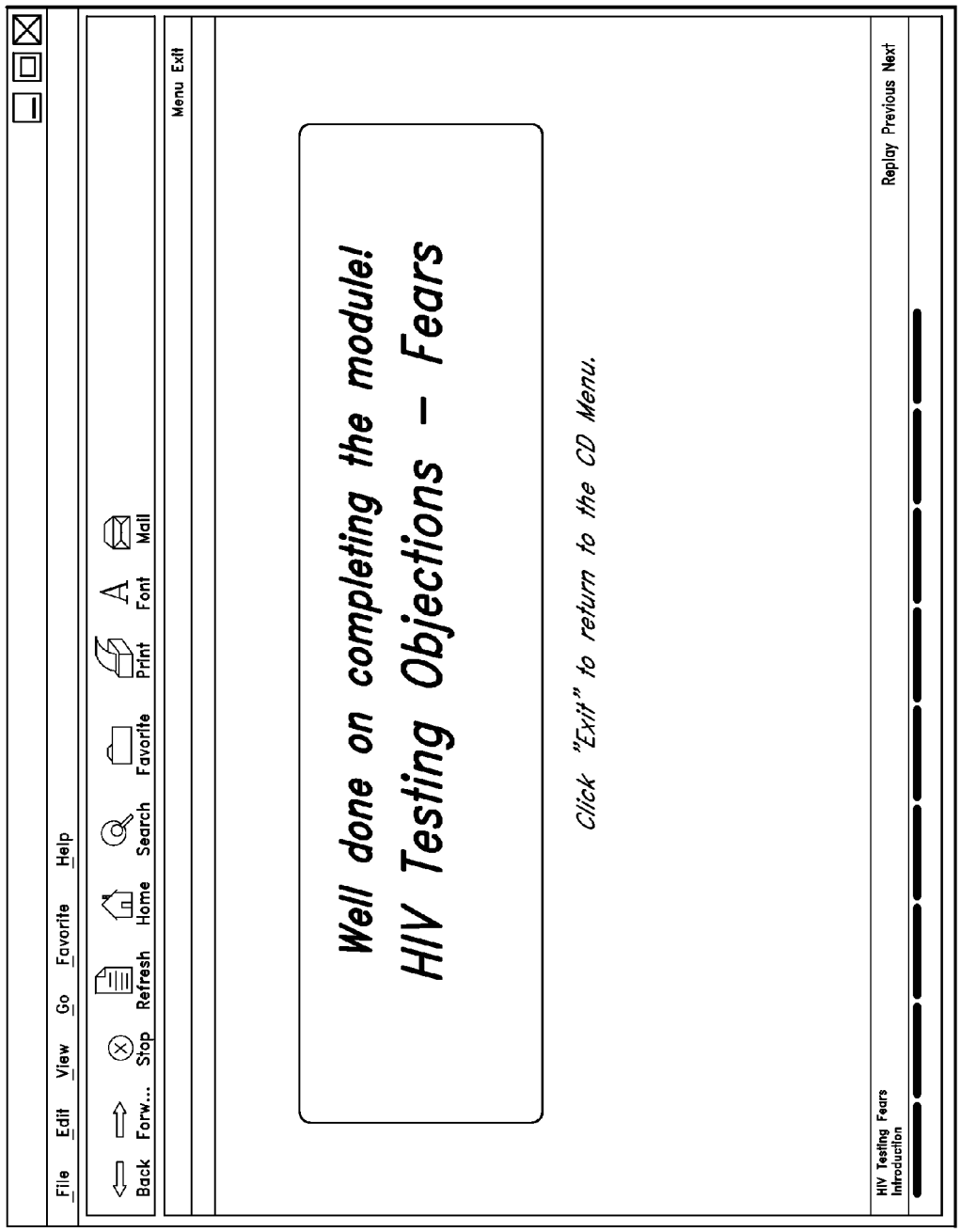

Referring now to FIG. 2R, a congratulations user interface is illustrated which informs the user that the user has completed the module.

Referring now to FIG. 3A1-2, an example "performance drilling" training session process is illustrated, wherein a user/trainee is drilled in responding accurately, with little or no hesitation, and with confidence to challenges/statements made by others (e.g., customers/prospects). Reference will be made to certain example user interfaces.

At state 401M, the process begins, and the trainee and/or trainer log into the training system. At state 402M, the system displays a welcome screen. The system receives a selection of a training module from a menu of training modules. For example, the different training modules may relate to different subject matter, such as different products and services. Optionally, the system provides a description of the corresponding training objectives and a description of the training module. A user interface is displayed via which the trainee and/or trainer optionally selects a peer type.

After viewing the welcome user interface at state 402M, the user is optionally asked if they would like to view a tutorial at state 404M. Optionally, this can be accomplished buy buttons to "Play Tutorial" or "Skip Tutorial" or some other mechanism. If the user activates controls to view the tutorial, they proceed to state 406M. After the tutorial is viewed, they proceed onto the next screen—which is 408M in this example. If the user elects to not view the tutorial, then state 406M is bypassed and the user proceeds directly to state 408M—which is the study session in this example. For example, a user may want to skip (or a trainer, manager, or other facilitator may want the user to skip) the tutorial process that describes how to run the lesson. This might occur, for example, where the trainer will explain the process on the fly, or where the user has run many modules before and does not need to review the tutorial on how to run the module contents, as the learner is already familiar with the learning interface. If this is the case, the tutorial at state 406M can be bypassed with the user proceeding directly to the study state at 408M. The user/learner and/or trainer may want to skip not only the tutorial but also want to skip the study section in its entirety and proceed directly to the scored challenges at state 410M. This enables a user to receive a baseline challenge score that is reflective of the user's knowledge and skills prior to the study. Then, once the user undergoes the study perhaps in a subsequent learning session, the user can undergo the scored challenge process a second time, and the "before" and "after" scores can be compared to determine the user's improvement as a result of the study. Further, the ability to skip directly to the scored challenge process enables a trainer or supervisor to test the user without having to proceed through a study session to test existing knowledge. Optionally, the user can navigate directly from other states (and corresponding user interfaces) to state 410M. Thus, for example, the user can review the tutorial at state 406M, and then proceed directly to state 410M, while skipping the study at state 408M. Further, the user can optionally participate in the tutorial at state 406M, and then skip the study. Thus, the user can participate in the tutorial and the study, only the tutorial, or only the study, prior to proceeding to state 410M.

At state 406M, a user interface is optionally presented via which the trainee/trainer can instruct the system to display a tutorial for the learner/trainee (such regarding the user interfaces discussed above). If an instruction is provided to launch the tutorial, the process proceeds to state 406M and the tutorial is launched (e.g., including text, audio, animation and/or video). Otherwise, the process proceeds to state 408M.

At state 408M the module content (e.g., including text, audio, animation and/or video) is played. State 408M will be discussed in greater detail below with respect to FIG. 3A-3. As similarly discussed above, optionally, the user can skip state 408M and proceed directly to state 410M. Once the study session has been completed, the trainee is informed that the tested portion of the training session is about to begin. As discussed below, the test portion, also referred to as the scored challenges section, includes a scene having one or more people (real or animated) playing an appropriate role, such as that of a customer, prospect, a family member, or other person as appropriate for the skill being trained.

Scoring

At state 410M, a user interface is displayed introducing/describing the challenge process. At state 412M, the system presents the trainee/learner with a challenge to which the trainee is instructed to verbally respond to, and optionally a timer (which may be in the form of a timer ball or clock) is started automatically with the presentation of the challenge, or optionally the timer can be started by the trainer or trainee. A scene having one or more people (real or animated) playing an appropriate role, such as that of a customer, prospect, a family member, or other person as appropriate for the skill being trained, recites one or more challenges. The video recording of the character(s) (real or animated) playing the role(s) articulate the challenge, wherein the challenge is relevant to the field and skill being trained.

The challenges may be based upon the product/service/solution descriptions (e.g., key elements) presented in the study section. The presentation of the challenges (optionally corresponding to the study information/elements) are optionally randomized or non-randomized. The user is instructed to verbally respond to the challenges as soon as the user hears the challenges. The trainer or trainee stops the timer to indicate how quickly the trainee began providing a verbal response, wherein the time is stored in memory. The trainee continues responding even after the timer is stopped. At state 414M, the trainee's response is scored for accuracy and/or completeness, optionally by the trainer or trainee, using an accuracy and/or completeness scoring user interface. At state 416M, the trainee's response is scored with respect to how quickly the trainee initially responded. Optionally, such scoring is automatically performed once the trainer indicates that the trainee has initiated their response (or optionally, has correctly responded). Optionally, the scoring can automatically be performed using voice recognition. At state 418M, the trainer and/or trainee scores the trainee with respect to the confidence exhibited by the trainee in responding using a confidence scoring user interface. The example embodiment scores by category and sub-category. Therefore, it provides substantially instant feedback on a sub-category basis, and total feedback for the "full" category (e.g., including the summation of scores for the sub-categories). This substantially instant evaluation enables the pinpointing of areas where improvement is needed, optionally including improvement in the ability to articulate the correct answers/content, as well as the assessment of the ability to respond with little or no hesitancy, and style/confidence.

At state 420M, a summary scoring page is displayed, providing the scores with respect to accuracy, little or no hesitancy (related to the time it took the user to begin substantively responding), and confidence for the most recent challenge. At state 422M, a user interface is provided via which the trainer/trainee can specify whether a model answer to the challenge is to be presented. If an instruction is received to provide the model answer, the process proceeds to state 424M. A user interface optionally including an animated character or video of a person speaking a model answer to a challenge is presented, although audio, without a video/animated component can be used. In order to further facilitate learning and embedding of knowledge and skills, the model answer provided at state 424M is optionally the same as provided during the Watching component (e.g., with the same wording, text displayed, and avatar) that is performed at state 408M, as further discussed below. Optionally, the spoken communication is also provided textually to further reinforce the teaching of the presented information and wording style. A "replay" control is optionally provided, which when activated, causes the animated or video character to repeat the model answer (e.g., audibly with the textual reinforcement displayed). A "proceed" control is optionally provided via which the user (and/or trainer) can instruct the system to proceed to the next segment.

At state 426M, a determination is made as to whether there are additional challenges to be presented to the trainee. If additional challenges remain, the process proceeds back to state 412M, otherwise the process proceeds to state 428M. The scores and/or a summary thereof (e.g., a grade score or overall point score) is calculated and optionally presented with respect to the challenges presented during the process. At state 430M, the process ends.

FIG. 3A-3 illustrates certain states of FIG. 3A1-2 in greater detail and with certain states omitted for greater clarity. As previously discussed, at state 402E, the system displays a welcome screen. The system receives a selection of a training module from a menu of training modules. Optionally the system provides a description of the corresponding training objectives and a description of the training module. Optionally, a user interface is displayed via which the trainee and/or trainer (if any) optionally selects a peer type (if a peer is being used). The user can then proceed to state 408E, by activating the "next" control. In particular, activating the "next" control will cause the process to proceed to state 404E3, and a Reading component user interface for a first challenge ("Challenge 1") is presented. When the user is ready, the user can activate the "next" control again to proceed to state 406E3, and a Watching component user interface for the first challenge ("Challenge 1") is presented. When the user is ready (e.g., has completed watching the audio video presentation of a person articulating a model answer), the user can activate the "next" control again to proceed to state 408E3, and a Performing component user interface for the first challenge ("Challenge 1") is presented. Once the user is ready or has completed the performance portion (e.g., has responded to Challenge 1), the user can activate the "next" control again to proceed to state 4010E3, and a Reviewing component user interface for the first challenge ("Challenge 1") is presented, enabling the user's performance to be self-assessed or assessed by another person.

The foregoing process can be repeated as desired for one or more additional challenges. In the illustrated embodiment, the user continues on to the study for Challenge X (e.g., Reading component 412E3, Watching component 414E3, Performing component 416E3, and Reviewing component 418E3).

In the foregoing example, the user can proceed backwards and forwards through the process and user interfaces by activating the "back" control or the "next" control one or more times at any state. Optionally, the user can navigate to the beginning of a given challenge study via a menu selection or other navigation device.

As similarly discussed above, when the user is on the last screen of the last
challenge, (the Reviewing component of the last challenge), and selects the "next" control, the interface optionally transitions out of the Study section (optionally without notice) and into the testing section, also referred to herein as the Scored Challenges section, at state 410E. A user interface is displayed introducing/describing the scored challenge process. At state 412E, the system presents the trainee/learner with a challenge to which the trainee is instructed to verbally respond to. The process can continue as similarly described above with respect to FIG. 3A1-2. Optionally, the user can return to the study section corresponding to the user's weaknesses (e.g., as reflected by the scored challenge scoring outcomes). For example, the user can return to the study section corresponding to a scored challenge that the user failed to adequately address. This enables the user to focus further study on the user's weak points, rather than having to also review information/skills the user has mastered.

Optionally, via a user interface control, the trainer (if any) and/or the user can instruct the system to repeat a selected challenge or module. Optionally, the training system automatically repeats the scored challenge and/or module if the trainee's score falls below a threshold defined by the system, the trainer, the trainee's employer, the trainee and/or other designated person. For example, optionally a scored challenge and/or module is repeated if the trainee received less than a perfect score to thereby better drill the trainee to be able to provide correct answers that include the appropriate significant elements, without hesitation and in a confident manner.

Optionally, during a training session, the system automatically presents the trainee with one or more scored challenges that the trainee had successfully mastered (e.g., as determined by the trainee's score) in one or more previous training sessions. Such "surprise drilling sections" help test and reinforce the trainee's retention of information and skills obtained during training.

As discussed above, with respect to certain user interfaces, a challenge is presented via an audio video recording of the character(s) (real or animated) playing the role(s) of a real person the trainee might encounter in real life and, where the characters articulate one or more "challenges" (e.g., questions, statements, or information). During the learning phase, the challenges will typically be presented in a predetermined order, although optionally the challenges are randomly or pseudo randomly presented, or the challenges may be selectively presented in response to a trainee or trainer input. In the scoring phase the challenges will typically be randomly or pseudo randomly presented, although optionally the challenges may be presented in a predetermined order to the trainee, or the challenges may be selectively presented in response to a trainee or trainer input. The challenges are verbalized and/or acted out by a real or animated person/actor. The person or people in the scene may or may not be lipped-synced to a verbalization of the script. The person or people in the scene may be of different ethnicities as selected by the employer, the facilitator, the training system provider, or other entity. The speech patterns and/or accents of the person or people in the scene may be selected by the employer, the facilitator, the training system provider or other entity. Optionally, the recorded voices of the characters delivering the challenges are purposely selected/configured to be difficult to understand to better simulate the types of voices the user may encounter in real world situations. The foregoing selection may be made from a menu presented on a terminal (e.g., a menu listing one or more ethnicities and/or accents) and stored in memory.

As discussed above, the trainee is expected to respond with the appropriate element(s) taught during the study session. Optionally, a timer (e.g., a countdown timer) is displayed to the trainee when a challenge is provided. In an example embodiment, the trainee provides the response verbally, but may also do so by typing/writing in the response, by selecting the response from a multiple choice offering, or otherwise. The system automatically and/or in response to a trainer or user instruction, presents the correct answer to the trainer.

The trainee will then be graded/scored based on one or more of the following components. The appropriateness/correctness of the element(s) (e.g., the key elements) provided by the trainee in response to a scored challenge, the trainee's speed in initially responding to the scored challenge, the trainee's confidence and/or style when providing the element(s) when responding to the scored challenge, or any combination thereof. Thus, in an example embodiment, a trainee that provides an appropriate element, but that was too slow or too fast in providing the appropriate element so that it would appear to a real customer as being unnatural, and/or appeared to be/sounded nervous when providing that element, will not receive a "perfect" score for that element. In addition, optionally the trainee will be graded on how closely the text of the element(s) recited by the trainee matches that provided to the trainee on the answer screens, which matches the key elements on the study screens.

Optionally, a countdown timer is set to a certain value during a challenge response period and the trainee has to initiate the challenge response before the timer reaches a certain point (e.g., 0 seconds). The current countdown time can be displayed to trainee in a "seconds" format, and/or in other formats related to how much time is remaining (e.g., green for a first amount of time, yellow for a second amount of time, and red for a third amount of time). Optionally, a count-up time is provided, which starts at 0 seconds, and counts up until the trainee begins substantively responding to the challenge, at which point the timer is stopped and displays (e.g., in seconds) how long it took for the trainee to begin to respond. Optionally, the trainee's score is based on the timer value at the time the trainee provided the response. Optionally, a potential score is displayed which is decremented as the timer counts down, and the trainee is assigned the score displayed when the trainee provides the response. Optionally, the trainee, a system operator/author/designer and/or the facilitator can set the initial countdown time and/or the rate of the score reduction. Optionally, the trainee and/or facilitator can reset or change the timer value in real-time or otherwise.

Optionally, key elements for correct answers will be in the "correct order/sequence". That is, what the client and/or training implementer believes or has identified as the preferred presentation sequence. Optionally, the user is graded on the correctness of the sequence of their answer as well.

By way of illustration, if a bank employee is being trained to recommend appropriate banking services, an actor (real or simulated) may play a bank customer or prospect. The trainee observes the scene, and recites the appropriate element(s) (e.g., key elements) at the appropriate time in response to questions asked by or information offered by the bank customer or prospect which may relate to banking services. For example, if the trainee is being trained to recommend and/or offer information regarding a checking account for minors, the actor may ask questions regarding why a minor needs a checking account, the costs associated with a checking account, and the risks associated with a minor having a checking account. The trainee is expected to respond to the customer questions/information with the element(s) (e.g., the key elements) taught during the study session. Optionally, the trainee is not permitted to refer to notes or other materials (e.g., printed materials, such as books or course handouts) during the testing phase. The trainee's response may be observed (e.g., listened to and/or viewed) in substantially real-time by the trainer. Optionally, the trainee's response is recorded (e.g., a video and/or audio recording) by the terminal or other system for later playback by a trainer and/or the trainee, and/or for later scoring, and/or for voice recognition which can be used to reveal how well the user is doing with respect to the reviewing and scored challenges user interfaces.

The score may be entered by the trainer into a scoring field presented via the trainer terminal and/or certain scores may be entered automatically by the system. In an example embodiment, the scores are entered and stored in computer memory substantially immediately after the trainee provides a verbal challenge response (e.g., within 0.2 seconds or less, 0.5 seconds, 1 second, 15 seconds, 30 seconds, or 60 seconds, etc.). Optionally, several scoring fields are provided so that the trainer can enter scores for different aspects of the trainee's provision of the element. For example, there may be a "correct element" field, a "time to initiate of response" field, a "level of confidence" field, a "naturalness of response" field, etc. Optionally, the field may enable the trainer to enter (or select) a number score (e.g., 1-5), a letter score (e.g., A-F), a phrase (e.g., excellent, good, fair, poor), or other score. Optionally, scoring icons (e.g., circular scoring icons) are provided on the answer screens. The facilitator will click on a scoring icon to provide the trainee a point (or other score) for identifying a key element. When the facilitator clicks on a scoring icon, the icon, optionally originally white, will optionally turn green to signify the user has correctly identified a key element. Other colors/indicators can be used as well. If the facilitator clicks on these scoring icons in error, they have the option of re-clicking on the scoring icon(s) (or otherwise correcting the scoring error). This will optionally return the icon to white and no points will be calculated.

Optionally, the system automatically scores one or more aspects of the trainee's performance. For example, the system can determine (e.g., via sound received via a microphone coupled to the trainee terminal, wherein input received via the microphone is translated into a digital value) if the user correctly stated all the relevant key elements, identify those key elements the user failed to state or stated incorrectly, and generate a corresponding score. By way of further example, the system can determine/measure how long it takes the trainee to begin providing an element after a "challenge" (optionally as identified to the training system via associated metadata), and score the speed of initiating of the trainee's response and/or provide the actual elapsed time between the challenge and the trainee's response and/or present the elapsed time to the trainer. The scoring of the correctness/completeness of the response, the immediacy of response, and the user's confidence, rather than solely providing a blended score of the three, aids the user/trainer in better understanding more precisely the precise learning and performance deficits of the trainee. The trainer can also provide textual/verbal comments (or optionally select predefined comments presented to the trainer via a user interface) regarding the trainees confidence and the naturalness of the trainees response. For example, the trainer's user interface can include a text field via which the trainer can enter comments.

Optionally, scoring can be by each sub-category or for a total category. If for a total category, a final combined score from sub-categories is presented (e.g., automatically presented or in response to a trainer command).

Optionally, a best to worst rank order scoring (or worst to best rank order scoring) by sub-categories will be presented. This will allow the user/facilitator to know where to focus subsequent training based upon strengths and weaknesses. Optionally, the specific sub-category that should be studied/repeated is displayed. Optionally, the user/facilitator can limit the scoring report so that only the scores for those sub-categories that the user needs further training on (e.g., as determined by the system based on the failure of the user to score at least a certain specified threshold) are reported to the user/facilitator.

Optionally, during the tested portion of the training session, different challenges will be repeated a different number of times. Optionally, the selection of the challenges to be repeated and/or the repeat rate are random or pseudo random. Optionally, the more significant or otherwise selected challenges are weighted so that they are or tend to be repeated more often than those challenges that are considered less significant. This weighting promotes the testing of more significant and/or more difficult to acquire skills/information. Optionally, the system is configured (e.g., by the trainee, facilitator or author/designer) to repeat a single scored challenge a specified number of times to thereby focus the trainee on that scored challenge.

Optionally, after the trainee has provided an answer (e.g., after the answer has been scored and/or after the trainee has completed a module or tested training portion thereof), the trainee is presented with a model answer, with the corresponding element displayed and/or verbalized. When verbalized, optionally the verbalization is provided with a natural, confident sounding voice that the user should be able to emulate. Optionally, the key elements provided in the answers are bolded, highlighted, underlined, or otherwise visually emphasized as compared to the sentence/phrase structure in which they are incorporated. The key elements provided in the model answer are optionally role modeled, verbalized, with the text of the key elements appearing in a super-imposed manner as they are verbalized, for cognitive and behavioral embedding purposes. The text super-impositions are optionally highlighted as they are displayed.

Optionally, the model answer is automatically presented and/or is presented in response to a trainee instruction (e.g., issued via a user interface presented via the trainee terminal). Optionally, first the key element is displayed, and then the model answer is provided (e.g., textually and/or verbalized) with the key element still displayed. Where there is more than one element, optionally the key elements are introduced one at a time, until all the relevant key elements are displayed. The revealed key elements correspond to the model answer. Optionally, the trainee can take notes while the key element and model answer are presented.

Optionally, the more significant elements are weighted (e.g., by a person crafting the training) so that the more significant elements are or tend to be repeated more often than those elements that are considered less significant. The weightings can be stored in computer readable memory and optionally automatically applied by the system. Optionally, a trainer/administrator can manually instruct, via a user interface control, that one or more selected challenges are to be repeated (e.g., in a non-randomized fashion).

Optionally, if the user scores at least a predetermined or other threshold (e.g., "four out of five" "two out of three", "eight out of nine" or other threshold) with respect to a certain score (e.g., a key elements score, explained in greater detail below), then an automatic linkage is provided to another category (e.g., the Product/Service Usage category) so that the linked to category will next be tested. Likewise, if the user score meets a certain threshold (e.g., "four out of five") in the Product/Service Usage category, there would be an automatic linkage to still another category (e.g., the Product/Service Objections category). Optionally, if the user fails to meet a designated threshold, additional and/or repeated challenges within the current category are presented to further drill the user in the current category until the user's score improves to meet the threshold (or another specified threshold).

Optionally, if the user did not score at least a specified threshold (e.g., "four out of five") in a category, the user needs to repeat the related study and scored challenges sections until the user scores the specified threshold before they are able to proceed to the next category.

By way of example, if a user successfully responds to Product/Service Usage challenges, the user is then automatically (or in response to a user action) presented with "dealing with angry customers/customer complaints" challenges. If, the user successfully responds to the "dealing with angry customers/customer complaints", the user then automatically proceeds to "waiving fees or service charges" challenges. Upon successfully responded to the "waiving fees or service charges" challenges, the user is then automatically (or in response to a user action), presented with "offering upgraded service" challenges, and from there to "background on the company" challenges, and so forth.

Optionally the scores for two or more aspects of trainee's provision of a key element (which will sometimes be referred to as an "answer") may be combined into a single score (e.g., as an average score, which is optionally weighted). For example, if the trainee received a score of 5 for verbalizing the key elements, a score of 2 for speed of initiating the response, and a score of 3 for the trainee's confidence, an average score of 3.33 may be calculated and assigned to the trainee's answer. Different aspects of the trainee's provision of an element can be assigned corresponding different weightings. By way of example, the combined score can be calculated using the following weighted average formula (although other formulas may be used as well).

TotalMaximumScore((W$_1$Score$_1$/MaximumPossible$_1$)+W$_{n-1}$(Score$_{n-1}$/MaximumPossible$_{n-1}$)+W$_n$(Score$_n$/MaximumPossible$_n$))

Where TotalMaximumScore is the maximum score that can be awarded for the answer, W is the weighting for a corresponding aspect of the answer, Score is the score awarded for a corresponding aspect, and MaximumPossible is the maximum possible score that can be assigned for the corresponding aspect.

For example, using the above formula, if the correctness of the trainee's answer is assigned a weighting of 0.5, and timing of initiating response and confidence are each assigned a weighting of 0.25, then if the trainee received a score of 5 out of 5 for appropriateness/correctness of the element, a score of 2 out of 5 for the speed with which the user initiated a response to the challenge, and a score of 3 out of 5 for the trainee's confidence, the system calculates and assigns to a the trainee's answer a score of 3.75 out of a maximum of 5.

A total score can be assigned for multiple answers provided by the trainee using an average, a weighted average, or other calculation based on the scores received for individual answers and/or aspects thereof. Optionally, the score for a given answer and the current total is automatically calculated in substantially real time as the trainee submits answers (or fails to submit answers), with the running total displayed via the trainer terminal and/or the trainee terminal. Optionally, at the end of a training session, the training system provides the scores to the trainer and/or the trainee via an electronic and/or hardcopy report generated by the system.

As similarly discussed above, challenges can relate to comparisons, such as comparisons of product/services, people, places, etc. By way of illustration, the comparisons can include comparisons of products/services offered by the user's employer, comparisons of products/services offered by the user's employer with products/services of another company or other entity, and/or products and services of two or more other entities other than the user's employer. For example, a challenge can be a question regarding two different products or services, such as:

"What is the difference between a credit card and a debit card?"

"How does an adjustable rate mortgage loan compare with a fixed rate mortgage loan?"

"How does your higher price vacuum cleaner compare with your economy model?"

"How does the sports version of this car compare with the standard version?"

"How does your product compare with that of your competitors?"

"Why is your product more expensive than that of your competitor?"

"How does the service compare at the following three hotel chains?"

In this example, the system presents a user interface to the trainee that informs the trainee regarding the subject matter of the training session. For example, the system can be used to train a sales and/or service person in a particular industry (e.g., banking, finance, travel agency, automobile sales person, telephony, utilities, etc), train a person on how to relate in a personal situation (e.g., with a spouse, child, sibling, parent, girlfriend/boyfriend, etc.), train a person with respect to academic knowledge, or for other purposes.

Thus, by way of illustration, a trainee may be informed that the training session provides training with respect to credit cards for minors. By way of further illustration, the training may be intended to train a user in how to respond to a more open-ended question. For example, a question or comment may relate to a customer's or prospect's marital status, health, a trip, a residence, and/or a child. The system can train the trainee how to respond to such questions or comments, which can take the following example forms:

"I am getting a divorce (or other life event), what should I do?";

"I am getting married this summer and a need a loan to pay for the wedding";

"We are planning to take a cruise, do you have any recommendations on how to finance it?";

"We are planning to remodel our house, what type of loans do you offer?";

"How should we be saving money for our child's future education?"

The training optionally trains the user to overcome objections to a course of action proposed by the trainee to a customer/prospect. By way of still further example, the training may be intended to train the user in how to handle a customer that comes in with a service complaint (e.g., "The product does not work as described" or "Why weren't my funds transferred as instructed?").

The training system optionally provides academic training related to subject matter taught in an a school or employer classroom setting, or otherwise (e.g. "Who are the first five Presidents of the United States; "List, in order, the 10 steps that need to be taken in order to approve a loan request"; "Who should you first attempt to contact in the event there has been a work accident", etc.). By way of further example, the training can be related to math, history, English, a foreign language, computer science, engineering, medicine, psychology, proper procedures at a place of employment, etc. Thus, for example, the training is not necessarily related to interaction with or challenges from another person, such as a customer, prospect, or family member. The academic training can be used to reinforce training previously provided to the trainee.

By way of example, the challenges may include one or more of the following elements and/or other elements:

facts regarding the subject matter at hand that the trainee will be expected to know and provide to a customer/prospect;

questions the trainee will be expected to ask of a person (e.g., of a customer/prospect, wherein the trainee is a customer service person, in order to determine that customer's needs and/or wants);

social conversation intended to put another person at ease and/or to establish a sense of trust.

Before presenting the actual training user interfaces, the system optionally provides text, audio, and/or video instructions to the user that explain the purpose of the selected training module, how the user is to interact with the training program, the scoring process, and/or other information.

In this example, the trainee is also informed of the different stages of a training session. For example, the trainee is informed that study screens (also referred to as user interfaces) will be available, wherein the trainee is provided with key or other elements that the trainee will be expected to know and utilize during the "tested" portion of training session. The trainee is further informed that after the study screen(s), the tested portion will begin. The study screens/user interfaces optionally include text, an audible verbalization of the text, and/or a video or animated figure synchronized with the verbalization.

Several of the study screen(s) are intended to familiarize the trainee with the elements and optionally, only the key elements that are to be tested to educate the trainee and/or so that the trainee will not feel that they are unfairly tested. The training will be in the form of challenges that the trainee is asked to respond to. To overcome or successfully respond to these challenges, there are certain elements (e.g., key elements) that the trainee has to state. Several of the study screen(s) will provide the trainee with the key elements necessary in responding to the challenges. In an example embodiment, clients (e.g., employers of trainees) have the option of deciding on the key elements the trainees should be tested upon and/or the operators/creators/designers of the training system will make these decisions. This enables expectations to be aligned with the training being provided to users.

Optionally, one or more of the study screens may be automatically or manually (e.g., by the trainer, user, and/or a system operator/author/designer) turned off for one or more training sessions for a given user. For example, if the user has already viewed a given study screen, a bypass control (e.g., a button or link) is optionally provided on the trainee and/or trainer user interface prior to displaying the study screen(s), which, when activated causes the study screen(s) to be skipped. A facilitator may elect to activate the bypass button because the user should already know what the study key elements are based upon prior training. Thus, the user can proceed directly to the scored challenges session.

There may be other reasons for bypassing or not presenting a given study screen. For example, not presenting the study screen(s) provides advanced real-world "stress testing", where when dealing with a person/persons who verbalize a challenge, the recipient of the challenge typically does not have an opportunity to refer to "Study" materials. Not presenting the study screen (e.g., at pre-determined times or randomly) can be part of a "surprise attack" session, which makes the drilling more exciting, and keeps a trainee more alert. In addition, turning off the study screen(s) prior to a scored session enables the system to "pre-test" users' knowledge base before they are able to observe study key element screens. Thus, turning off study screens can serve as a motivator to the user if their score is sub-par, as well as to establish performance baselines. The performance baseline scoring can be compared with scoring after the user has viewed the study screens to provide the user/trainer/company with "before and after" evidence of progress.

For example, with respect to product descriptions and product usage, there may be five key elements for product descriptions and five key elements for product usage, but many more elements, benefits and features listed based upon a company's brochures, Web sites and other product informational sources, let alone internal communications.

By way of example, the challenges may include one or more of the following elements and/or other elements:

Challenges (e.g., questions, assertions, statements of facts or alleged facts) by customers, prospects, employees, managers, family members, other people, etc.

facts regarding the subject matter at hand that the trainee will be expected to know and provide to a customer/prospect;

questions the trainee will be expected to ask of a person (e.g., of a customer/prospect, wherein the trainee is a customer service person, in order to determine that customer's needs and/or wants);

social conversation intended to put another person at ease and/or to establish a sense of trust;

and/or other challenges, including other challenges discussed herein.

Optionally, because of the digital nature of the information "reservoirs", the system enables a company to alter/adapt/change key elements based upon real world realities. For example, if it is discovered that the five existing key elements to answering a particular challenge are not as effective as a different set of key elements in the real world (even a change in a single key element), then the key elements for this particular objection are changed accordingly to match experiential realities.

Speed to market

Some Challenges may be time limited with respect to the real world

It may be advantageous in certain instances to emphasize or only train users with respect to certain more important elements (e.g., key elements) as it is recognized that most users will only be able to memorize verbalizations for a limited number of elements, and receivers of information will only be able to process a limited number of elements/messages. Notwithstanding the foregoing, other elements may optionally be mentioned on the study screens.

Optionally, different challenges are repeated different numbers of times. Optionally, the selection of the challenges to be repeated and/or the repeat rate are purposely random or pseudo random to mimic the real world experience and to prevent rote memorization. Optionally, the more significant elements are weighted (e.g., by a person crafting the training) so that the more significant elements are or tend to be repeated more often than those elements that are considered less significant. The weightings can be stored in computer readable memory and optionally automatically applied by the system. Optionally, the trainer can manually instruct, via a user interface control, that one or more select challenges are to be repeated (e.g., in a non-randomized fashion).

Challenges/Key Elements

The challenges may be presented as displayed text, as part of a role playing scenario (e.g., where the user is presented with a scenario involving an animation or person playing an appropriate role, which presents the opportunity for the trainee to state/provide the elements), with the elements presented audibly, textually (optionally in an overlay over the video portion), and/or otherwise.

The elements may be those considered by the trainee's management to be more significant or key so that the trainee is not overly burdened with having to remember all related elements (which can optionally be accessed instead during a real-life interaction via a computer or otherwise, after the trainee has built credibility and trust with an actual customer or prospect, wherein the credibility and trust is the result, at least in part of the trainee's ability to respond without having to read from a list, manual, brochure, etc).

Optionally, the trainee's management or other authorized personnel can specify, select, or modify the elements as desired. By optionally placing the burden on the trainee's management/employer to identify the more significant elements, they are encouraged to better understand and identify what is expected from employees performing a given job function.

Certain example embodiments teach and train a user to utilize information and skills in a simulated real-world environment. For example, a user provides verbalized responses that engender relatively instant feedback. Users are optionally trained to provide information, respond to objections, and/or ask questions as appropriate, automatically or almost automatically, without undesirable pauses. Optionally, users are scored based on their retention of the information, and their ability to provide the information to others in a natural, confident manner. Thus, certain embodiments aid users in internalizing and behaviorally embedding information and skills learned during training. Furthermore, certain embodiments of the invention serve as a coaching and self-coaching tool.

Example embodiments will now be described with reference to still additional figures. Throughout the description herein, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networks of interactive televisions or of telephones, and other protocols may be used as well.

In addition, unless otherwise indicated, the functions described herein are preferably performed by executable code and instructions stored in computer readable memory and running on one or more general-purpose computers. However, the present invention can also be implemented using special purpose computers, other processor based systems, state machines, and/or hardwired electronic circuits. Further, with respect to the example processes described herein, not all the process states need to be reached, nor do the states have to be performed in the illustrated order. Further, certain process states that are described as being serially performed can be performed in parallel.

Similarly, while certain examples herein may refer to a user's personal computer system or terminal, other terminals, including other computer or electronic systems, can be used as well, such as, without limitation, an interactive television, a networked-enabled personal digital assistant (PDA), other IP (Internet Protocol) device, a cellular telephone or other wireless terminal, a networked game console, a networked MP3 or other audio device, a networked entertainment device, and so on.

Further, the description herein may refer to a user pressing or clicking a key, button, or mouse to provide a user input or response, the user input can also be provided using other apparatus and techniques, such as, without limitation, voice input, touch screen input, light pen input, touch pad input, and so on. Similarly, while the description herein may refer to certain messages or questions being presented visually to a user via a computer screen, the messages or questions can be provided using other techniques, such as via audible or spoken prompts.

One example embodiment utilizes a computerized training system to enhance a trainee's listening comprehension using some or all of the processes discussed above. For example, the training can be delivered via a terminal, such as a stand-alone personal computer, a networked television, a personal digital assistant, a wireless phone, an interactive personal media player, other entertainment system, etc. The training program may be loaded into the user terminal via a computer readable medium, such as a CD ROM, DVD, magnetic media, solid state memory, or otherwise, or downloaded over a network to the personal computer.

By way of further example, the training program can be hosted on a server and interact with the user over a network, such as the Internet or a private network, via a client computer system or other terminal. For example, the client system can be a personal computer, a computer terminal, a networked television, a personal digital assistant, a wireless phone, an interactive personal media player, or other entertainment system. A browser or other user interface on the client system can be utilized to access the server, to present training media, and to receive user inputs.

The example training system presents a scenario, such as that discussed above, to a user via a terminal, such as a personal computer or interactive television. The scenario can be a pre-recorded audio and/or video scenario including one or more segments. The scenario can involve a single actor or multiple actors (e.g., a human actor or an animated character) reading a script relevant to the field and skill being trained. For example, the actors may be simulating an interaction between a bank teller or loan officer and a customer. By way of further example, the simulated interaction can instead be for in-person and phone sales or communications. By way of still further example, the actors may be simulating an interaction between a parent and a child. Optionally, rather than using a person to read a script, the pre-recorded scenario can involve a real-life unscripted interaction.

FIG. 1 illustrates an example networked training system including a Web/application server 110, used to host the training application program and serve Web pages, a scenario database 112, that stores prerecorded scenario segments, and a user database 114 that stores user identifiers, passwords, training routines for corresponding users (which can specify which training categories/scenarios are to be presented to a given user and in what order), training scores, recordings of training sessions, and user responses provided during training sessions. The training system is coupled to one or more trainee user terminals 102, 104, and a trainer terminal 106 via a network 108, which can be the Internet or other network. The server 110 and/or one or more of the terminals 102, 104, and 106, can include a voice recognition system configured to recognize and convert human speech received via a microphone or otherwise to computer understandable characters. Optionally, the server 110 and/or one or more of the terminals 102, 104, and 106, are configured to determine from such converted human speech when a user has begun speaking (e.g., providing a challenge response), and/or whether the user has provided correct answers (e.g., by comparing a challenge response from the user to reference or model challenge response and/or to corresponding key elements). The speech recognition is configured to distinguish between substantive speech and disfluencies (e.g., "um," "ah", etc.). Thus, for example, when measuring the time from the end of a challenge until the user begins responding, the system will not identify a disfluency as the beginning of a response. Other forms of initial "hesitation" speech, such as "well, you see", are also not identified as the beginning of a response. Optionally, a file is stored in system memory of words and/or phrases that if uttered before a substantive response, are not identified as the beginning of a response.

Optionally, the system includes an ear piece/headphone apparatus which can be utilized for more private/quiet training. For example, in order to prevent the vocalization by the characters are not heard by other, the user can listen via the headset, with the system speakers muted or eliminated. Additionally, optionally an operating or a non-operating microphone is coupled to the headset so that others that are in earshot of a user (for example, customer, prospects, siblings, etc.) perceive that the user is speaking to an actual telephone by telephone or otherwise, rather than engaging in training. This has proven effective in environments where the user is training with others present, and further solves the problem of potential embarrassment for the user and or/for confusion for others who are unfamiliar with the training system. Of course, optionally, users can utilize the headset even in environments where others are not present and or where they would be seen or heard using the system. Additionally, if the user works in a call center as their job function, wearing a headset simulates the user's real world environment.

Thus, as discussed above, certain embodiments teach and train a user to utilize information and skills in a simulated real-world environment. The user optionally undergoes extensive testing, where their performance is scored based on their retention of the information, and their ability to verbally provide the information to others correctly, with little hesitation, and confidently. Thus, the training system aids users in internalizing and behaviorally embedding information and skills learned during training. Users are optionally trained to provide information, respond to objections, and/or ask questions, etc., as appropriate almost automatically, without undesirable pauses and with confidence. By doing so, they are performing with fluency.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are recited herein. Note that titles or subtitles may be used in the examples for convenience of a reader, which is in no way intended to limit the scope of the disclosure. Unless otherwise defined, all technical and scientific terms used herein have the same meaning as commonly understood by one of ordinary skill in the art to which this disclosure pertains. In the case of conflict, the present document, including definitions will control.

In one or more example embodiments, the functions, methods, algorithms, and techniques described herein may be implemented in hardware, software, firmware (e.g., including code segments), or any combination thereof. If implemented in software, the functions may be stored on or transmitted over as one or more instructions or code on a computer-readable medium. Tables, data structures, formulas, and so forth may be stored on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For a hardware implementation, one or more processing units at a transmitter and/or a receiver may be implemented within one or more computing devices including, but not limited to, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques described herein may be implemented with code segments (e.g., modules) that perform the functions described herein. The software codes may be stored in memory units and executed by processors. The memory unit may be implemented within the processor or external to the processor, in which case it can be communicatively coupled to the processor via various means as is known in the art. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A training system configured to train a user, comprising:
 a server;
 a network interface coupled to the server;
 a tangible computer-readable medium having computer-executable instructions stored thereon that, when executed by a computing device, cause the computing device to perform a method comprising:

receiving an identification of a training module, the module including at least a first set of challenges including a plurality of challenges that include a statement or question by a character in the training module regarding a subject that a user is to be trained to verbally respond to as if in conversation with the character in the training module;

transmitting for presentation on a user terminal a table of contents including an entry for each of the plurality of challenges, where the user can navigate to a selected one of the plurality of challenges via the table of contents, for each of the plurality of challenges, in response to a user action, transmitting for presentation on the user terminal user interfaces associated with a learning session and user interfaces associated with a practice session, wherein:

the learning session includes a reading section configured to train the user in how to respond to the challenge using text, and a watching section, configured to train the user to respond to the challenge using an audio video presentation, wherein the reading section includes a reading user interface configured to present via text and without a video component:

the challenge;

a plurality of guideline language constructs that provide a model answer to the challenge, wherein the guideline constructs are in the form of text positioned so that each guideline language construct is spaced apart from at least one other guideline language construct, and wherein each of the guideline language constructs includes:

a key element which the user is to memorize; and contextual language in which the key element is embedded, wherein computer-executable instructions are configured to cause the key element to be visually distinguished via an attribute not present in the contextual language;

wherein the watching section includes a watching user interface configured to present:

a textual representation of the key elements previously presented via the reading user interface, wherein the key elements are not embedded in the guideline language constructs;

an audio video presentation of a first avatar audibly presenting the guideline language constructs, including the key elements, presented via the reading user interface and/or audibly presenting the key elements without the guideline language constructs, wherein the first avatar has lip motions at least substantially synchronized with the audible guideline language;

wherein the practice session user interfaces include:

a performing user interface, wherein the performing user interface includes an audio video presentation of a second avatar, wherein the second avatar has a different appearance then the first avatar, wherein the second avatar audibly presents the challenge presented via the reading and watching user interfaces, wherein the user is to verbally provide a response to the challenge, the response including each of the key elements presented via the watching user interface and the reading user interface for that challenge;

a review user interface configured and arranged to include at least a textual representation of key elements previously presented via the watching user interface;

in response to at least one user action, transmitting for presentation on the user terminal user interfaces associated with a scored challenge session configured to test the user with respect to the challenges included in the module, wherein for each challenge on which the user is to be tested the scored challenge user interface includes:
  the second avatar audibly presenting a randomly selected challenge from the plurality of challenges, wherein the second avatar has lip motions at least substantially synchronized with the audible randomly selected challenge, and wherein the user is to audibly respond to the randomly selected challenge by at least presenting corresponding key elements;
  a scoring interface for the randomly selected challenge, the scoring interface configured to receive and/or provide at least the following scoring information:
    how accurately the user audibly presented the key elements corresponding to the randomly selected challenge audibly presented by the second avatar;
    how fast the user began substantively responding verbally to the randomly selected challenge audibly presented by the second avatar
    how confident the user seemed when verbally responding to the randomly selected challenge audibly presented by the second avatar;
  using a formula to calculate a cumulative score based at least in part on the scoring information corresponding to:
    how accurately the user audibly presented the key elements corresponding to the randomly selected challenge audibly presented by the second avatar;
    how quickly the user began substantively responding verbally to the randomly selected challenge audibly presented by the second avatar;
    how confident the user seemed when verbally responding to the randomly selected challenge audibly presented by the second avatar;
  transmitting for presentation on the user terminal at least one navigation control via which the user can provide navigational instructions that enable the user to navigate to a desired user interface.

2. The system as defined in claim 1, wherein the system is further configured to present each key element associated with a first challenge in bullet form via the watching user interface.

3. The system as defined in claim 1, wherein the system is configured to train the user with respect to sales, influencing behavior of a person or entity, providing service, responding to complaints, coaching, management, assessment, certification, recruiting, using software and/or hardware, compliance with rules or guidelines, time management, and/or academic subjects.

4. The system as defined in claim 1, wherein the system is configured to inhibit scoring when the performing user interface is displayed.

5. The system as defined in claim 1, wherein the system is configured to size and position the plurality of guideline language constructs displayed via the reading user interface so that they are displayed at the same time.

6. The system as defined in claim 1, wherein the system is configured to:
  transmit for display on the user terminal a notes field in association with the reading user interface, the watching user interface, the reviewing user interface, and/or the scored challenge session; and
  store for later retrieval user notes entered via the notes field.

7. The system as defined in claim 1, wherein the system is configured to receive an avatar specification, the avatar specification specifying an appearance of at least one avatar, a background to be displayed behind the avatar, and audio content to be audibly presented by the avatar.

8. The system as defined in claim 1, wherein the system is configured to receive an instruction to inhibit the random selection of challenges and to present the plurality of challenges in a predetermined order during the scored challenge session.

9. The system as defined in claim 1, wherein the system is configured to synchronize what is displayed on the user terminal with what is displayed on at least one other terminal.

10. The system as defined in claim 1, wherein the selected module includes no more than twelve challenges.

11. The system as defined in claim 1, wherein no more than nine key elements are displayed for a given challenge.

12. A tangible non-transitory computer-readable medium having computer-executable instructions stored thereon that, when executed by a computing device, cause the computing device to perform operations comprising:
  for each of a plurality of challenges in a training module, wherein a challenge is a statement or question that a user is to respond to, transmitting for presentation on a user terminal user interfaces associated with a learning session and user interfaces associated with a practice session, wherein:
  the learning session includes a reading section configured to train the user in how to respond to the challenge using text, and a watching section, configured to train the user to respond to the challenge using an audio video presentation,
  wherein the reading section includes a reading user interface configured to present via text:
    the challenge;
    a plurality of guideline language constructs that provide a model answer to the challenge, wherein each of the plurality of guideline language constructs includes:
      a key element; and
      contextual language in which a corresponding key element is embedded, wherein computer-executable instructions are configured to cause the corresponding key element to be visually distinguished via an attribute not present in the contextual language;
  wherein the watching section includes a watching user interface configured to present:
    a textual representation of the key elements previously presented via the reading user interface, wherein the key elements are not embedded in the guideline language constructs;
    an audio video presentation of a first character audibly presenting the guideline language constructs, including the key elements, and/or audibly presenting the key elements without the guideline language constructs, wherein the first character has lip motions at least substantially synchronized with the audio presentation;
  wherein the practice session user interfaces include:
    a performing user interface, wherein the performing user interface includes an audio video presentation of a second character, wherein the second character has a different appearance then the first character, wherein the second character audibly presents the challenge presented via the reading and watching user interfaces, wherein the user is to verbally provide a response to the challenge, the response including key elements presented via the watching user interface for that challenge;

a review user interface configured and arranged to include at least a textual representation of key elements previously presented via the watching user interface;

in response to at least one user action, transmitting for presentation on the user terminal user interfaces associated with a scored challenge session configured to test the user with respect to challenges included in the module, wherein for a challenge on which the user is to be tested the scored challenge user interface includes:

at least one character audibly presenting a randomly selected challenge from the plurality of challenges, wherein the at least one character has lip motions at least substantially synchronized with the audible randomly selected challenge, and wherein the user is to audibly respond to the randomly selected challenge by at least presenting corresponding key elements;

a scoring interface for the randomly selected challenge, the scoring interface configured to receive and/or provide at least the following scoring information:

how accurately and/or completely the user audibly presented the key elements;

generating and providing for display a cumulative score using at least the following:

a score related to the correctness and/or completeness of the challenge response; and a score related to a confidence with which the user verbalized the challenge response;

transmitting for presentation on the user terminal at least one navigation control via which the user can provide navigational instructions that enable the user to navigate to a desired user interface.

13. The tangible computer-readable medium of claim 12, the method further comprising:

transmitting for presentation on the user terminal a table of contents including an entry for each of the plurality of challenges, wherein a given entry for a challenge in the table of contents includes text of the corresponding challenge and an audio video presentation, wherein the audio video presentation presents a character that audibly presents the corresponding challenge, the character having lip motions at least substantially synchronized with the audibly presented corresponding challenge.

14. The tangible computer-readable medium of claim 13, the method further comprising automatically presenting the audio video challenge presentations included in the table of contents one at a time.

15. The tangible computer-readable medium of claim 12, wherein the first and second characters are animated avatars.

16. The tangible computer-readable medium of claim 12, wherein the at least one character is the same as the second character.

17. The tangible computer-readable medium of claim 12, wherein the reading section does not include a video presentation.

18. The tangible computer-readable medium of claim 12, wherein the guideline constructs presented via the reading user interface are in the form of text positioned so that each guideline language construct is on a different line than any other guideline language construct.

19. The tangible computer-readable medium of claim 12, the method further comprising:

providing for display a character design user interface including one or more menus of clothing and body parts via which characters can be generated via a user selection of one or more body parts and one or more articles of clothing; and providing a user interface via which a background corresponding to a real world environment can be selected to be displayed in association with at least one generated character.

20. The tangible computer-readable medium of claim 12, the method further comprising synchronizing a display of the user terminal with at least one other terminal, wherein only a portion of training related information displayed on the at least one other terminal is displayed on the user terminal.

21. The tangible computer-readable medium of claim 12, the method further comprising:

converting at least one verbal challenge response from the user to computer readable characters;

comparing the computer readable characters with the plurality of key elements; and identifying elements correctly verbally recited by user.

22. The tangible computer-readable medium of claim 12, the method further comprising:

detecting the initiation of at least one verbal challenge response by the user, wherein the verbal challenge response is made after a first challenge has been presented;

determining how long it took the user to initiate the response relative to the presentation of the first challenge; and generating a score related to how quickly the user initiated the challenge response.

23. The tangible computer-readable medium of claim 12, wherein the scoring interface for the randomly selected challenge is further configured to receive and/or provide at least the following scoring information:

how fast the user began responding to the randomly selected challenge; and how confident the user seemed when responding to the randomly selected challenge.

24. The tangible computer-readable medium of claim 23, wherein the cumulative score is calculated further using:

a score related to how quickly the user initiated the challenge response; and a score related to a style with which the user verbalized the challenge response.

25. The tangible computer-readable medium of claim 12, the method further comprising providing a user-accessible control configured to receive a user input indicating whether the audio video presentation of the first character in the watching user interface is to audibly present the guideline language constructs, including the key elements, or is to audibly present the key elements without the guideline language constructs.

26. The tangible computer-readable medium of claim 12, the method further comprising presenting each key element associated with a first challenge in bullet form via the watching user interface.

27. The tangible computer-readable medium of claim 12, the method further comprising inhibiting scoring when the performing user interface is displayed.

28. The tangible computer-readable medium of claim 12, the method further comprising providing an option of displaying the key elements embedded in the guideline language constructs displayed in the reader user interface via the watching user interface.

29. The tangible computer-readable medium of claim 12, the method further comprising sizing and positioning the plurality of guideline language constructs displayed via the reading user interface so that they are displayed at the same time.

30. The tangible computer-readable medium of claim 12, the method further comprising:
  transmitting for display on the user terminal a notes field in association with the reading user interface, the watching user interface, the reviewing user interface, and/or the scored challenge session; and
  storing for later retrieval user notes entered via the notes field.

31. The tangible computer-readable medium of claim 12, the method further comprising:
  receiving an instruction to inhibit the random selection of challenges; and
  presenting the plurality of challenges in a predetermined order during the scored challenge session.

32. The tangible computer-readable medium of claim 12, wherein the module includes more than one challenge directed to the module subject matter, but no more than twelve challenges.

33. The tangible computer-readable medium of claim 12, wherein no more than nine key elements are displayed for a given challenge.

34. A tangible non-transitory computer-readable medium having computer-executable instructions stored thereon that, when executed by a computing device, cause the computing device to perform a method comprising:
  for a first challenge in a training module, wherein the first challenge is a statement or question that a user is to respond to, transmitting for presentation on a user terminal user interfaces associated with a learning session and user interfaces associated with a practice session, wherein:
  the learning session includes a reading section configured to train the user using text in how to respond to the first challenge, and a watching section, configured to train the user using an audio video presentation to respond to the first challenge,
  wherein the reading section includes a reading user interface configured to present via text:
  the first challenge;
  a guideline language construct that provides a model answer to the first challenge, wherein the guideline language construct includes:
    a key element; and
    contextual language in which the key element is embedded,
  wherein the key element is caused to be visually distinguished from the contextual language;
  wherein the watching section includes a watching user interface configured to present:
  a textual representation of the key element;
  an audio video presentation of a first character audibly presenting the guideline language construct, including the key element, and/or audibly presenting the key element without the guideline language construct, wherein the first character has lip motions at least substantially synchronized with the audio presentation;
  wherein the practice session user interfaces include:
    a performing user interface, wherein the performing user interface includes an audio video presentation of a second character, wherein the second character audibly presents the first challenge, wherein the user is to verbally provide a response to the first challenge, the response including at least the key element;
    a review user interface configured and arranged to include at least a textual representation of the key element;
  in response to at least one user action, transmitting for presentation on the user terminal user interfaces associated with a scored challenge session configured to test the user with respect to at least the first challenge, wherein the scored challenge user interface includes:
    at least one character visually and audibly presenting the first challenge, wherein the at least one character has lip motions at least substantially synchronized with the audible first challenge, and wherein the user is to audibly respond to the first challenge by at least presenting the key element;
    a scoring interface, the scoring interface configured to receive and/or provide at least the following scoring information:
      how accurately and/or completely the user audibly presented the key element; and
    generating and providing for display a cumulative score using at least the following:
      a score related to the correctness and/or completeness of the challenge response to the first challenge; and
      a score related to a confidence with which the user verbalized the challenge response to the first challenge;
  transmitting for presentation on the user terminal at least one navigation control via which the user can provide navigational instructions that enable the user to navigate to a desired user interface.

35. The tangible computer-readable medium of claim 34, the method further comprising:
  transmitting for presentation on the user terminal a table of contents including an entry for each of a plurality of challenges,
  wherein a given entry includes text of the corresponding challenge and an audio video presentation, wherein the audio video presentation presents a character that audibly presents the corresponding challenge, the character having lip motions at least substantially synchronized with the audibly presented corresponding challenge.

36. The tangible computer-readable medium of claim 34, wherein the first and second characters are animated avatars.

37. The tangible computer-readable medium of claim 34, wherein the first and second characters are different characters.

38. The tangible computer-readable medium of claim 34, wherein the first and second characters are the same character.

39. The tangible computer-readable medium of claim 34, wherein the at least one character is the same as the second character.

40. The tangible computer-readable medium of claim 34, wherein the reading section does not include a video presentation.

41. The tangible computer-readable medium of claim 34, the method further comprising:
  providing for display a character design user interface including one or more menus of clothing and body parts via which characters can be generated via a user selection of one or more body parts and one or more articles of clothing; and
  providing a user interface via which a background corresponding to a real world environment can be selected to be displayed in association with at least one generated character.

42. The tangible computer-readable medium of claim 34, the method further comprising synchronizing a display of the user terminal with at least one other terminal, wherein only a portion of training related information displayed on the at least one other terminal is displayed on the user terminal.

43. The tangible computer-readable medium of claim 34, the method further comprising:
converting at least one verbal challenge response from the user to computer readable characters;
comparing the computer readable characters with the key element; and
identifying elements correctly verbally recited by user.

44. The tangible computer-readable medium of claim 34, the method further comprising:
detecting the initiation of a verbal challenge response by the user, wherein the verbal challenge response is made after the first challenge has been presented;
determining how long it took the user to initiate the response relative to the presentation of the first challenge; and
generating a score related to how quickly the user initiated the challenge response.

45. The tangible computer-readable medium of claim 44, the method further comprising identifying a speech disfluency at the beginning of the verbal challenge response, wherein the act of determining how long it took the user to initiate the response relative to the presentation of the first challenge does not include the time at which the user articulated the speech disfluency as the initiation of the response.

46. The tangible computer-readable medium of claim 34, wherein the scoring interface for the first challenge is further configured to receive and/or provide at least the following scoring information:
how fast the user began responding to the first challenge; and
how confident the user seemed when responding to the first challenge.

47. The tangible computer-readable medium of claim 46, the method further comprising generating the cumulative score further using at least the following:
a score related to how quickly the user initiated the challenge response; and
a score related to a style with which the user verbalized the challenge response.

48. The tangible computer-readable medium of claim 34, the method further comprising providing a user-accessible control configured to receive a user input indicating whether the audio video presentation of the first character in the watching user interface is to audibly present the guideline language construct, including the key element, or is to audibly present the key elements without the guideline language construct.

49. The tangible computer-readable medium of claim 34, the method further comprising inhibiting scoring when the performing user interface is displayed.

50. The tangible computer-readable medium of claim 34, the method further comprising:
transmitting for display on the user terminal a notes field in association with the reading user interface, the watching user interface, the reviewing user interface, and/or the scored challenge session; and
storing for later retrieval user notes entered via the notes field.

51. The tangible computer-readable medium of claim 34, wherein the module includes more than one challenge directed to the module subject matter, but no more than twelve challenges.

52. The tangible computer-readable medium of claim 34, wherein no more than nine key elements are displayed for the first challenge.

53. The tangible computer-readable medium of claim 34, wherein the watching user interface configured to present the textual representation of the key element without the guideline language.

54. The tangible computer-readable medium of claim 34, wherein the watching user interface configured to present the textual representation of the key element embedded in the guideline language used in the reading user interface.

55. A computer based method of training, comprising:
for a first challenge in a training module, wherein the first challenge is a statement or question that a user is to respond to, electronically transmitting for presentation on a user terminal:
a reading user interface configured to present via text:
the first challenge;
a guideline language construct that provides a model answer to the first challenge, wherein the guideline language construct includes:
a key element; and
contextual language in which the key element is embedded, wherein the key element is caused to be visually distinguished from the contextual language;
a watching user interface configured to present:
a textual representation of the key element;
an audio video presentation of a first character audibly presenting the guideline language construct, including the key element, and/or audibly presenting the key element without the guideline language construct, wherein the first character has lip motions at least substantially synchronized with the audio presentation;
a performing user interface, wherein the performing user interface includes an audio video presentation of a second character, wherein the second character audibly presents the first challenge, wherein the user is to verbally provide a response to the first challenge, the response including at least the key element;
a review user interface configured and arranged to include at least a textual representation of the key element;
in response to at least one user action, transmitting for presentation on the user terminal user interfaces associated with a scored challenge session configured to test the user with respect to at least the first challenge, wherein the scored challenge user interface includes:
at least one character visually and audibly presenting the first challenge, wherein the at least one character has lip motions at least substantially synchronized with the audible first challenge, and wherein the user is to audibly respond to the first challenge by at least presenting the key element;
a scoring interface, the scoring interface configured to receive and/or provide at least the following scoring information:
how accurately and/or completely the user audibly presented the key element; and—
transmitting for presentation on the user terminal at least one navigation control via which the user can provide navigational instructions that enable the user to navigate to a desired user interface; and
calculating and reporting at least one score by a computing system, the at least one score reflective in part of the user's response to the first challenge during the scored challenge session including at least an indication as to how confidently the user verbalized a response to the first challenge.

56. The method of claim 55, the method further comprising:
  transmitting for presentation on the user terminal a table of contents including an entry for each of a plurality of challenges,
  wherein a given entry includes text of the corresponding challenge and an audio video presentation, wherein the audio video presentation presents a character that audibly presents the corresponding challenge, the character having lip motions at least substantially synchronized with the audibly presented corresponding challenge.

57. The method of claim 55, wherein the first and second characters are animated avatars.

58. The method of claim 55, wherein the first and second characters are different characters.

59. The method of claim 55, wherein the first and second characters are the same character.

60. The method of claim 55, wherein the at least one character is the same as the second character.

61. The method of claim 55, wherein the reading section does not include a video presentation.

62. The method of claim 55, the method further comprising:
  providing for display a character design user interface including one or more menus of clothing and body parts via which characters can be generated via a user selection of one or more body parts and one or more articles of clothing; and
  providing a user interface via which a background corresponding to a real world environment can be selected to be displayed in association with at least one generated character.

63. The method of claim 55, the method further comprising synchronizing a display of the user terminal with at least one other terminal, wherein only a portion of training related information displayed on the at least one other terminal is displayed on the user terminal.

64. The method of claim 55, the method further comprising:
  converting at least one verbal challenge response from the user to computer readable characters;
  comparing the computer readable characters with the key element; and
  identifying if the user correctly recited the key element.

65. The method of claim 55, the method further comprising:
  detecting the initiation of a verbal challenge response by the user, wherein the verbal challenge response is made after the first challenge has been presented;
  determining how long it took the user to initiate the response relative to the presentation of the first challenge; and
  generating a score related to how quickly the user initiated the challenge response.

66. The method of claim 55, wherein the scoring interface for the first challenge is further configured to receive and/or provide at least the following scoring information:
  how fast the user began responding to the first challenge; and
  how confident the user seemed when responding to the first challenge.

67. The method of claim 66, the method further comprising generating a cumulative score using at least the following:
  a score related to the correctness and/or completeness of the challenge response;
  a score related to how quickly the user initiated the challenge response; and
  a score related to a confidence and/or style with which the user verbalized the challenge response.

68. The method of claim 55, the method further comprising providing a user-accessible control configured to receive a user input indicating whether the audio video presentation of the first character in the watching user interface is to audibly present the guideline language construct, including the key element, or is to audibly present the key elements without the guideline language construct.

69. The method of claim 55, the method further comprising:
  transmitting for display on the user terminal a notes field in association with the reading user interface, the watching user interface, the reviewing user interface, and/or the scored challenge session; and
  storing for later retrieval user notes entered via the notes field.

70. The method of claim 55, wherein the module includes more than one challenge directed to the module subject matter, but no more than twelve challenges.

71. The method of claim 55, wherein no more than nine key elements are displayed for the first challenge.

72. A training system configured to train a user, comprising:
  a server;
  a network interface coupled to the server;
  a non-transitory tangible computer-readable medium having computer-executable instructions stored thereon that, when executed by a computing device, cause the computing device to perform a method comprising:
  for a first challenge in a training module, wherein the first challenge is a statement or question that a user is to respond to, electronically transmitting for presentation on a user terminal:
    a reading user interface configured to present via text:
      the first challenge;
      a guideline language construct that provides a model answer to the first challenge, wherein the guideline language construct includes:
        a key element; and
        contextual language in which the key element is embedded, wherein the key element is caused to be visually distinguished from the contextual language;
    a watching user interface configured to present:
      a textual representation of the key element;
      an audio video presentation of a first character audibly presenting the guideline language construct, including the key element, and/or audibly presenting the key element without the guideline language construct, wherein the first character has lip motions at least substantially synchronized with the audio presentation;
    a performing user interface, wherein the performing user interface includes an audio video presentation of a second character, wherein the second character audibly presents the first challenge, wherein the user is to verbally provide a response to the first challenge, the response including at least the key element;
    a review user interface configured and arranged to include at least a textual representation of the key element;
  in response to at least one user action, transmitting for presentation on the user terminal user interfaces associated with a scored challenge session configured to test the user with respect to at least the first challenge, wherein the scored challenge user interface includes:

at least one character visually and audibly presenting the first challenge, wherein the at least one character has lip motions at least substantially synchronized with the audible first challenge, and wherein the user is to audibly respond to the first challenge by at least presenting the key element;

a scoring interface, the scoring interface configured to receive and/or provide at least the following scoring information:

how accurately and/or completely the user audibly presented the key element, and how confidently the user audibly responded to the first challenge; and transmitting for presentation on the user terminal at least one navigation control via which the user can provide navigational instructions that enable the user to navigate to a desired user interface.

73. The tangible computer-readable medium of claim 72, the method further comprising:

transmitting for presentation on the user terminal a table of contents including an entry for each of a plurality of challenges, wherein a given entry includes text of the corresponding challenge and an audio video presentation, wherein the audio video presentation presents a character that audibly presents the corresponding challenge, the character having lip motions at least substantially synchronized with the audibly presented corresponding challenge.

74. The tangible computer-readable medium of claim 72, wherein the first and second characters are different animated avatars.

75. The tangible computer-readable medium of claim 72, wherein the reading section does not include a video presentation.

76. The tangible computer-readable medium of claim 72, the method further comprising synchronizing a display of the user terminal with at least one other terminal, wherein only a portion of training related information displayed on the at least one other terminal is displayed on the user terminal.

77. The tangible computer-readable medium of claim 72, the method further comprising:

converting at least one verbal challenge response from the user to computer readable characters;

comparing the computer readable characters with the key element; and identifying if the user correctly articulated the key element.

78. The tangible computer-readable medium of claim 72, the method further comprising:

detecting the initiation of a verbal challenge response by the user, wherein the verbal challenge response is made after the first challenge has been presented;

determining how long it took the user to initiate the response relative to the presentation of the first challenge; and generating a score related to how quickly the user initiated the challenge response.

79. The tangible computer-readable medium of claim 72, wherein the scoring interface for the first challenge is further configured to receive and/or provide at least the following scoring information:

how fast the user began responding to the first challenge.

80. The tangible computer-readable medium of claim 72, the method further comprising:

transmitting for display on the user terminal a notes field in association with the reading user interface, the watching user interface, the reviewing user interface, and/or the scored challenge session; and storing for later retrieval user notes entered via the notes field.

81. The system as defined in claim 1, wherein a given entry for a challenge in the table of contents includes text of the corresponding challenge and an audio video presentation, wherein a given entry in the table of contents' audio video presentation presents an animated avatar that audibly presents the corresponding challenge, the animated avatar having lip motions at least substantially synchronized with the audibly presented corresponding challenge;

wherein the audio video challenge presentations included in the table of contents are automatically presented one at a time in a predetermined order.

\* \* \* \* \*

UNITED STATES PATENT AND TRADEMARK OFFICE
CERTIFICATE OF CORRECTION

PATENT NO. : 8,597,031 B2  
APPLICATION NO. : 12/510868  
DATED : December 3, 2013  
INVENTOR(S) : Cohen et al.

Page 1 of 1

It is certified that error appears in the above-identified patent and that said Letters Patent is hereby corrected as shown below:

In the Drawings

Sheet 10 of 22, FIG. 21 at line 7, Change "disd" to --did--.

In the Specification

In column 11 at line 20, Change "over with out" to --over with without--.

In column 22 at line 52, Change "that that" to --that--.

In column 23 at line 2, Change "recoding" to --recording--.

In column 29 at line 60, Change "otherwise" to --otherwise.--.

In column 30 at line 46, Change "littlie" to --little--.

In column 31 at line 25, Change "the" to --what--.

In column 33 at line 60, Change "Leadership" to --Leadership,--.

In column 49 at lines 32-48, Delete "challenge,.....mastered." and insert the same on Col. 49, Line 31 as a continuation of the paragraph.

In column 54 at line 17, After "to" delete "a".

In column 55 at line 23, Change "an a" to --a--.

In column 60 at line 1, Change "and or" to --and/or--.

Signed and Sealed this  
Twenty-fourth Day of June, 2014

Michelle K. Lee  
*Deputy Director of the United States Patent and Trademark Office*